United States Patent
Zawistowski

(10) Patent No.: US 12,344,347 B2
(45) Date of Patent: Jul. 1, 2025

(54) VEHICLE SUSPENSION LINKAGE

(71) Applicant: YETI CYCLING, LLC, Golden, CO (US)

(72) Inventor: Peter Zawistowski, Lakewood, CO (US)

(73) Assignee: YETI CYCLING, LLC, Golden, CO (US)

( * ) Notice: Subject to any disclaimer, the term of this patent is extended or adjusted under 35 U.S.C. 154(b) by 0 days.

(21) Appl. No.: 18/118,588

(22) Filed: Mar. 7, 2023

(65) Prior Publication Data
US 2023/0219650 A1    Jul. 13, 2023

Related U.S. Application Data

(63) Continuation of application No. 29/770,257, filed on Feb. 10, 2021, which is a continuation of application
(Continued)

(51) Int. Cl.
*B62K 25/28*    (2006.01)
*B62K 19/38*    (2006.01)
(Continued)

(52) U.S. Cl.
CPC ............ *B62K 25/286* (2013.01); *B62K 19/38* (2013.01); *B62K 19/42* (2013.01); *B62K 25/30* (2013.01)

(58) Field of Classification Search
CPC ...... B62K 25/286; B62K 19/38; B62K 19/42; B62K 25/30
See application file for complete search history.

(56) References Cited

U.S. PATENT DOCUMENTS

| 421,748 A | 2/1890 | Mcerlain |
| 519,855 A | 5/1894 | Whitaker |

(Continued)

FOREIGN PATENT DOCUMENTS

| CA | 2293366 A1 | 12/1998 |
| CA | 2453046 A1 | 6/2005 |

(Continued)

OTHER PUBLICATIONS

European Patent Office, "Extended European Search Report" mailed Feb. 5, 2021, for European Patent Application No. 18828926.8, 9 pages.

(Continued)

*Primary Examiner* — James A English
*Assistant Examiner* — Michael R Stabley
(74) *Attorney, Agent, or Firm* — Dorsey & Whitney LLP

(57) ABSTRACT

A two-wheel vehicle suspension linkage, including a shock and a shock extension assembly, is provided. The shock may include first and second mounting axes operably connected to two linkage bodies. The shock may provide linear resistance between the two linkage bodies. The shock extension assembly may include first and second extension bodies. Each of the first and second extension bodies may include a first mounting axis and a second mounting axis positioned in a non-parallel mounting orientation. The extension bodies may be pivotally connected to the suspension linkage with the first mounting axis of the first extension body being collinear with the first mounting axis of the second extension body. The second mounting axis of the first extension body may be collinear to the second mounting axis of the second extension body and the first or second mounting axis defining a non-effective shock damper axis.

27 Claims, 31 Drawing Sheets

Related U.S. Application Data

No. 16/029,014, filed on Jul. 6, 2018, now Pat. No. 10,926,830.

(60) Provisional application No. 62/635,446, filed on Feb. 26, 2018, provisional application No. 62/540,942, filed on Aug. 3, 2017, provisional application No. 62/529,852, filed on Jul. 7, 2017.

(51) Int. Cl.
  *B62K 19/42* (2006.01)
  *B62K 25/30* (2006.01)

(56) References Cited

U.S. PATENT DOCUMENTS

| | | |
|---|---|---|
| 591,306 A | 10/1897 | Tolson |
| 630,232 A | 8/1899 | Hughes et al. |
| 712,784 A | 11/1902 | Ellis |
| 724,871 A | 4/1903 | Hunter |
| 944,795 A | 12/1909 | Leet et al. |
| 1,043,269 A | 11/1912 | Stephenson |
| 1,068,583 A | 7/1913 | Harley |
| 1,168,702 A | 1/1916 | Babis, Jr. |
| 1,220,606 A | 3/1917 | Chelstrom |
| 1,261,440 A | 4/1918 | Rigby |
| 1,283,030 A | 10/1918 | Ashton |
| 1,369,356 A | 2/1921 | Rigby |
| 2,173,520 A | 9/1939 | Klatt |
| 3,803,933 A | 4/1974 | Huret et al. |
| 3,813,955 A | 6/1974 | Huret et al. |
| 3,847,028 A | 11/1974 | Bergles |
| 3,917,313 A | 11/1975 | Smith et al. |
| 3,977,697 A | 8/1976 | Macpike et al. |
| 4,058,181 A | 11/1977 | Buell |
| 4,076,271 A | 2/1978 | Doncque |
| 4,114,918 A | 9/1978 | Lutz |
| 4,241,617 A | 12/1980 | Fujimoto et al. |
| 4,265,329 A | 5/1981 | De Cortanze |
| 4,279,172 A | 7/1981 | Nagano et al. |
| 4,322,088 A | 3/1982 | Miyakoshi et al. |
| 4,360,214 A | 11/1982 | Isono |
| 4,408,674 A | 10/1983 | Boyesen |
| 4,410,196 A | 10/1983 | Ribi |
| 4,415,057 A | 11/1983 | Yamaguchi |
| 4,429,760 A | 2/1984 | Koizumi et al. |
| 4,433,747 A | 2/1984 | Offenstadt |
| 4,463,824 A | 8/1984 | Boyesen |
| 4,463,964 A | 8/1984 | Takayanagi et al. |
| 4,485,885 A | 12/1984 | Fukuchi |
| 4,500,302 A | 2/1985 | Crepin |
| 4,506,755 A | 3/1985 | Tsuchida et al. |
| 4,540,193 A | 9/1985 | Noda et al. |
| 4,544,044 A | 10/1985 | Boyesen |
| RE32,059 E | 12/1985 | Nagano |
| 4,558,761 A | 12/1985 | Boyesen |
| 4,561,519 A | 12/1985 | Omori |
| 4,574,909 A | 3/1986 | Ribi |
| 4,582,343 A | 4/1986 | Waugh |
| 4,586,913 A | 5/1986 | Nagano |
| 4,596,302 A | 6/1986 | Suzuki et al. |
| 4,619,633 A | 10/1986 | Nagano |
| 4,621,706 A | 11/1986 | Boyesen |
| 4,671,525 A | 6/1987 | Ribi |
| 4,673,053 A | 6/1987 | Tanaka et al. |
| 4,679,811 A | 7/1987 | Shuler |
| 4,702,338 A | 10/1987 | Trema |
| 4,735,277 A | 4/1988 | Prince |
| 4,744,434 A | 5/1988 | Miyakoshi et al. |
| 4,789,042 A | 12/1988 | Pitts |
| 4,789,174 A | 12/1988 | Lawwill |
| RE32,924 E | 5/1989 | Nagano |
| 4,830,391 A | 5/1989 | Silk |
| 4,878,884 A | 11/1989 | Romano |
| 4,951,791 A | 8/1990 | Creixell |
| 5,011,459 A | 4/1991 | Van De Vel |
| 5,121,937 A | 6/1992 | Lawwill |
| 5,205,572 A | 4/1993 | Buell et al. |
| 5,226,674 A | 7/1993 | Buell et al. |
| 5,244,224 A | 9/1993 | Busby |
| 5,259,637 A | 11/1993 | Busby |
| 5,282,517 A | 2/1994 | Prince |
| 5,295,702 A | 3/1994 | Buell |
| 5,299,820 A | 4/1994 | Lawwill |
| 5,306,036 A | 4/1994 | Busby |
| 5,332,246 A | 7/1994 | Buell |
| 5,335,929 A | 8/1994 | Takagaki et al. |
| 5,354,085 A | 10/1994 | Gally |
| 5,356,165 A | 10/1994 | Kulhawik et al. |
| 5,360,078 A | 11/1994 | Rifenburg et al. |
| 5,370,411 A | 12/1994 | Takamiya et al. |
| 5,409,248 A | 4/1995 | Williams |
| 5,409,249 A | 4/1995 | Busby |
| 5,417,445 A | 5/1995 | Smart |
| 5,429,380 A | 7/1995 | Lawwill |
| 5,435,584 A | 7/1995 | Buell |
| 5,441,292 A | 8/1995 | Busby |
| 5,452,910 A | 9/1995 | Harris |
| 5,474,318 A | 12/1995 | Castellano |
| 5,498,013 A | 3/1996 | Hwang |
| 5,509,679 A | 4/1996 | Leitner |
| 5,553,881 A | 9/1996 | Klassen et al. |
| 5,570,896 A | 11/1996 | Collins |
| 5,597,366 A | 1/1997 | Ozaki |
| 5,607,367 A | 3/1997 | Patterson |
| 5,611,557 A | 3/1997 | Farris et al. |
| 5,628,524 A | 5/1997 | Klassen et al. |
| 5,658,001 A | 8/1997 | Blanchard |
| 5,678,837 A | 10/1997 | Leitner |
| 5,688,200 A | 11/1997 | White |
| 5,772,228 A | 6/1998 | Owyang |
| 5,791,674 A | 8/1998 | D'Aluisio et al. |
| 5,816,966 A | 10/1998 | Yang et al. |
| 5,826,899 A | 10/1998 | Klein et al. |
| 5,899,480 A | 5/1999 | Leitner |
| 5,957,473 A | 9/1999 | Lawwill |
| 6,012,999 A | 1/2000 | Patterson |
| 6,076,845 A | 6/2000 | Lawwill et al. |
| 6,086,080 A | 7/2000 | Scheffer |
| 6,102,421 A | 8/2000 | Lawwill et al. |
| 6,131,934 A | 10/2000 | Sinclair |
| 6,206,397 B1 | 3/2001 | Klassen et al. |
| 6,244,610 B1 | 6/2001 | Kramer-Massow |
| 6,439,593 B1 | 8/2002 | Tseng |
| 6,450,520 B1 | 9/2002 | Girard |
| 6,488,301 B2 | 12/2002 | Klassen et al. |
| 6,543,799 B2 | 4/2003 | Miyoshi |
| 6,629,903 B1 | 10/2003 | Kondo |
| 6,712,374 B2 | 3/2004 | Assier |
| 6,793,230 B1 | 9/2004 | Cheng |
| 6,843,494 B2 | 1/2005 | Lam |
| 6,845,998 B2 | 1/2005 | Probst |
| 6,871,867 B2 | 3/2005 | Parigian |
| 6,877,591 B1 | 4/2005 | Hso |
| 6,886,846 B2 | 5/2005 | Carroll |
| 6,902,504 B2 | 6/2005 | Fukuda |
| 6,926,298 B2 | 8/2005 | Ellsworth et al. |
| 6,955,373 B2 | 10/2005 | Chang |
| 6,969,081 B2 | 11/2005 | Whyte |
| 7,025,698 B2 | 4/2006 | Wickliffe |
| 7,048,292 B2 | 5/2006 | Weagle |
| 7,066,481 B1 | 6/2006 | Soucek |
| RE39,159 E | 7/2006 | Klassen et al. |
| D527,991 S | 9/2006 | Chiang |
| 7,100,930 B2 | 9/2006 | Saiki |
| 7,104,908 B2 | 9/2006 | Nagano |
| 7,128,329 B2 | 10/2006 | Weagle |
| 7,131,511 B2 | 11/2006 | Arnold |
| 7,210,695 B2 | 5/2007 | Griffiths |
| 7,216,883 B2 | 5/2007 | Oconnor |
| 7,350,797 B2 | 4/2008 | Carroll |
| 7,377,535 B2 | 5/2008 | Chamberlain |
| 7,392,999 B2 | 7/2008 | Oconnor |
| 7,413,208 B2 | 8/2008 | Weng |

(56) References Cited

U.S. PATENT DOCUMENTS

| | | |
|---|---|---|
| 7,427,077 B2 | 9/2008 | Lesage et al. |
| 7,467,803 B2 | 12/2008 | Buckley |
| 7,494,146 B2 | 2/2009 | Tseng |
| 7,581,743 B2 | 9/2009 | Graney |
| 7,635,141 B2 | 12/2009 | Oconnor |
| 7,658,394 B1 | 2/2010 | Huang |
| 7,677,347 B2 | 3/2010 | Brawn |
| 7,703,785 B2 | 4/2010 | Colegrove et al. |
| 7,703,788 B2 | 4/2010 | Tanouye et al. |
| D616,286 S | 5/2010 | Foresman |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| D634,247 S | 3/2011 | Confer et al. |
| 7,909,347 B2 | 3/2011 | Earle |
| 7,914,407 B2 | 3/2011 | Fukushima et al. |
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,376,382 B2 | 2/2013 | Twers |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| D694,158 S | 11/2013 | Dunlap et al. |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudák |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,359,039 B2 * | 6/2016 | Lumpkin ............... B62K 19/02 |
| 9,376,156 B2 | 6/2016 | Chamberlain |
| 9,376,162 B2 | 6/2016 | Colegrove et al. |
| D762,536 S | 8/2016 | Wurzer et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,561,834 B2 | 2/2017 | Zawistowski |
| 9,598,131 B2 | 3/2017 | Zusy et al. |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,919,765 B2 | 3/2018 | Wickliffe et al. |
| 10,363,988 B2 | 7/2019 | Buckley |
| D867,223 S | 11/2019 | Deltour |
| 10,661,855 B2 * | 5/2020 | McDonald ............. B62K 25/10 |
| 10,766,563 B2 * | 9/2020 | Hoogendoorn ...... B62K 25/286 |
| D935,948 S | 11/2021 | Stafford et al. |
| D947,002 S | 3/2022 | Xueyuan |
| D950,357 S | 5/2022 | Zumbrum et al. |
| D958,702 S | 7/2022 | Segerer et al. |
| D959,336 S | 8/2022 | Liang |
| D966,075 S | 10/2022 | Jones et al. |
| 2001/0024024 A1 | 9/2001 | Klassen et al. |
| 2003/0038450 A1 | 2/2003 | Lam |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0057018 A1 | 3/2005 | Saiki |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0001686 A1 | 1/2009 | Currie |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0261557 A1* | 10/2009 | Beale .................... B62K 19/18 |
| | | 280/284 |
| 2009/0278331 A1 | 11/2009 | Graney |
| 2009/0283986 A1 | 11/2009 | Falke |
| 2010/0007113 A1* | 1/2010 | Earle .................... B62K 25/286 |
| | | 280/284 |
| 2010/0059965 A1 | 3/2010 | Earle |
| 2010/0102531 A1 | 4/2010 | Graney et al. |
| 2010/0109282 A1 | 5/2010 | Weagle |

(56) References Cited

U.S. PATENT DOCUMENTS

| | | |
|---|---|---|
| 2010/0127473 A1 | 5/2010 | Cocalis et al. |
| 2010/0156066 A1 | 6/2010 | Oconnor |
| 2010/0244402 A1 | 9/2010 | Hoogendoorn |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0018228 A1 | 1/2011 | Beale et al. |
| 2011/0025015 A1 | 2/2011 | Colegrove et al. |
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0126506 A1 | 5/2012 | Zawistowski |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |
| 2013/0001918 A1 | 1/2013 | Graney et al. |
| 2013/0001919 A1 | 1/2013 | Graney et al. |
| 2013/0093160 A1 | 4/2013 | Alsop |
| 2013/0096781 A1 | 4/2013 | Reichenbach et al. |
| 2013/0214503 A1 | 8/2013 | Chiuppani |
| 2013/0249181 A1 | 9/2013 | Becker et al. |
| 2013/0249188 A1 | 9/2013 | Beale |
| 2013/0285346 A1 | 10/2013 | Wimmer |
| 2014/0001729 A1 | 1/2014 | Hudec |
| 2014/0015220 A1 | 1/2014 | Talavasek |
| 2014/0060950 A1 | 3/2014 | Beutner |
| 2014/0109728 A1 | 4/2014 | Mcrorie |
| 2014/0217697 A1 | 8/2014 | Buckley |
| 2014/0318306 A1 | 10/2014 | Tetsuka |
| 2015/0001829 A1 | 1/2015 | Berthold |
| 2015/0054250 A1 | 2/2015 | Hu |
| 2015/0115569 A1 | 4/2015 | Matheson et al. |
| 2015/0175238 A1 | 6/2015 | Lumpkin |
| 2015/0183487 A1 | 7/2015 | Tsai |
| 2015/0191213 A1 | 7/2015 | Beale |
| 2015/0251724 A1 | 9/2015 | Hudec |
| 2015/0360743 A1 | 12/2015 | Oconnor |
| 2016/0083042 A1 | 3/2016 | Voss |
| 2016/0272273 A1 | 9/2016 | Colegrove et al. |
| 2016/0280317 A1 | 9/2016 | Hoogendoorn |
| 2016/0311493 A1 | 10/2016 | Scheffer |
| 2018/0099723 A1 | 4/2018 | Rojo Vidal |
| 2018/0229798 A1 | 8/2018 | Hoogendoorn et al. |
| 2018/0265165 A1 | 9/2018 | Zawistowski |
| 2018/0297661 A1 | 10/2018 | Beale |
| 2019/0039682 A1 | 2/2019 | Zawistowski |
| 2019/0300096 A1 | 10/2019 | Chamberlain et al. |
| 2019/0308688 A1 | 10/2019 | Chamberlain et al. |

FOREIGN PATENT DOCUMENTS

| | | |
|---|---|---|
| CA | 2980086 A1 | 6/2005 |
| CN | 302371900 | 3/2013 |
| DE | 692011 C | 6/1940 |
| DE | 9405076 U1 | 5/1994 |
| DE | 9416803 U1 | 12/1994 |
| DE | 4435482 A1 | 4/1996 |
| EP | 0422324 A1 | 4/1991 |
| EP | 0723907 B1 | 7/1998 |
| EP | 0941917 A2 | 9/1999 |
| EP | 1060979 A2 | 12/2000 |
| EP | 2540609 A1 | 1/2013 |
| FR | 541520 A | 7/1922 |
| FR | 933079 A | 4/1948 |
| FR | 2774966 A1 | 8/1999 |
| FR | 3018062 | 9/2015 |
| GB | 17336 | 10/1913 |
| GB | 2087934 A | 11/1999 |
| JP | H0725378 A | 1/1995 |
| WO | 9422710 A1 | 10/1994 |
| WO | 9803390 A1 | 1/1998 |
| WO | 9818671 A1 | 5/1998 |
| WO | 9856645 A1 | 12/1998 |
| WO | 199944880 | 9/1999 |
| WO | 9965760 A1 | 12/1999 |
| WO | 9944880 A9 | 1/2000 |
| WO | 03010042 A1 | 2/2003 |
| WO | 03018392 A1 | 3/2003 |
| WO | 03021129 A1 | 3/2003 |
| WO | 2004045940 A2 | 6/2004 |
| WO | 2005030564 A2 | 4/2005 |
| WO | 2005030565 A1 | 4/2005 |
| WO | 2005090149 A1 | 9/2005 |
| WO | 2006005687 A1 | 1/2006 |
| WO | 2006032052 A2 | 3/2006 |
| WO | 2006061052 A1 | 6/2006 |
| WO | 2008025950 A1 | 3/2008 |
| WO | 2008130336 A1 | 10/2008 |
| WO | 2009121936 A1 | 10/2009 |
| WO | 2010033174 A1 | 3/2010 |
| WO | 2010103057 A1 | 9/2010 |
| WO | 2010121267 A1 | 10/2010 |
| WO | 2012024697 A1 | 2/2012 |
| WO | 2012027900 A1 | 3/2012 |
| WO | 2012063098 A1 | 5/2012 |
| WO | 2012122634 A1 | 9/2012 |
| WO | 2013028138 A2 | 2/2013 |
| WO | 2013078436 A1 | 5/2013 |
| WO | 2013119616 A1 | 8/2013 |
| WO | 2013142855 A2 | 9/2013 |
| WO | 2013192622 A1 | 12/2013 |
| WO | 2014009019 A1 | 1/2014 |
| WO | 2014029759 A1 | 2/2014 |
| WO | 2014202890 A1 | 12/2014 |
| WO | 2015196242 A1 | 12/2015 |
| WO | 2016036237 A1 | 3/2016 |
| WO | 2016097433 A1 | 6/2016 |
| WO | 2016134471 A1 | 9/2016 |

OTHER PUBLICATIONS

Aston, "Canyon Sender—Review," https://www.pinkbike.com/news/canyon-sender-review-2017.html, Mar. 13, 2017, 33 pages.

Aston, "Robot Bike Co R160—First Look," https://www.pinkbike.com/news/robot-bike-co-r160-first-look-2016.html (Accessed Jun. 30, 2020), May 27, 2016, 39 pages.

Author Unknown, "Sarrus Linkage," Wikipedia, http://en.wikipedia.org/wiki/Sarrus_linkage, 1 page, at least as early as Aug. 20, 2010.

Chen, "Design of Structural Mechanisms", A dissertation submitted for the degree of Doctor of Philosophy in the Department of Engineering Science at the University of Oxford, St Hugh's College, 2003, 160 Pages.

Cunningham, "First Look: Felt 2014," https://www.pinkbike.com/news/First-Look-Felt-2014.html (Accessed Jun. 20, 2020), Aug. 7, 2013, 20 pages.

DB Bikes, "Felt Compulsion 50 Mountain Bike 2017," https://downhillbikesforsale.com/products/Felt-Compulsion-50-Mountain-Bike-2017.html, (Accessed Jun. 30, 2020), 9 pages.

Dweekiy, "Shock Absorber Riser, 2PCs Motorcycle Rear Shock Absorber Riser 5cm Heightening Device Pad for Chassis (With Screw)," Amazon.com, posted Jun. 20, 2019, https://www.amazon.com/Absorber-Motorcycle-Heightening-Device-Chassis/dp/B07TDMD334/ref, 3 pages.

European Patent Office, "European Extended Search Report," mailed May 28, 2015, for European Patent Application No. 12851566.5, 7 pages.

European Patent Office, "Extended European Search Report," mailed Sep. 15, 2015, for European Patent Application No. 11818903.4, 8 pages.

European Patent Office, "Supplementary Search Report," mailed Dec. 11, 2009, for European Patent Application No. 05798319.9, 1 page.

Giant Bicycles, "Anthem Advanced Pro 29 1," https://www.giant-bicycles.com/us/anthem-advanced-pro-29-1-2021, (Accessed Sep. 14, 2020), 8 pages.

(56) References Cited

OTHER PUBLICATIONS

Kavik Bicycles, "Kavik Regen Suspension," (Accessed Jun. 30, 2020), 2 pages.
I, "Movable Spatial 6R Linkages," XP055249075, Retrieved from the Internet on Oct. 13, 2016: URL:http://people.ricam.oeaw.ac.at/z.li/pu blications/talks/6.pdf, Oct. 2, 2013, 48 Pages.
Mcrae et al., "NSMB, 2019 Yeti SB 150—First Impressions," posted Nov. 29, 2018, https://nsmb.com/articles/2019-yeti-sb-150-first-impressions/, 21 pages.
Mountain Bike Action, "Bike Test: Felt Compulsion 1 27.5," https://mbaction.com/oct-felt-compulsion-1-27-5/, (Accessed Jun. 30, 2020), 10 pages.
Off Road, "First Ride: 2019 Yeti SB150, News, Aug. 27, 2018," https://off.road.cc/content/news/first-ride-2019-yeti-sb150-2805, 23 pages.
Overholt, Bikerumor, "IB17: Tantrum Cycles makes it to production, gets noticed by Adventure Capitalists," https://bikerumor.com/2017/09/26/ib17-tantrum-cycles-makes-it-to-production-gets-noticed-by-adventure-capitalists/ (Accessed Jun. 30, 2020), Sep. 26, 2017, 8 pages.
PCT, "International Search Report and Written Opinion," mailed Jan. 18, 2013, for PCT Application No. PCT/US2012/066427, 12 pages.
PCT, "International Search Report and Written Opinion," mailed Nov. 29, 2006, for PCT Application No. PCT/US2005/33410, 5 pages.
PCT, "International Search Report and Written Opinion," mailed Dec. 14, 2011, for PCT Application No. PCT/US2011/048696, 10 pages.
PCT, "International Search Report and Written Opinion," mailed Feb. 12, 2016, for PCT Application No. PCT/US2015/065090, 11 pages.
PCT, "International Search Report and Written Opinion," mailed Aug. 2, 2018, for PCT Application No. PCT/US2018/023124, 14 pages.
PCT, "International Search Report and Written Opinion," mailed Sep. 28, 2018, for PCT Application No. PCT/US2018/041054, 12 pages.
Ridemonkey, "how many links could a dw link if a dw could link links?", https://ridemonkey.bikemag.com/threads/how-many-links-could-a-dw-link-if-a-dw-could-link-links.276645/ (Accessed Jun. 30, 2020), May 27, 2016, 8 pages.
Roberts, "First Ride: 2021 Canyon Sender CFR," https://www.pinkbike.com/news/first-ride-2021-canyon-sender-cfr.html, Aug. 11, 2020, 23 pages.
Sarrut, "Note Sur La Transformation Des Mouvements Rectilignes Alternatifs," Académie des Sciences, 36, 1036-1038, 1853, 5 Pages.
Zawistowski, "Quantifying Wheel Path," Think Turquoise, http://www.yeticycles.com/blog/?p=237 [Retrieved from the Internet on Jul. 27, 2011], Jul. 18, 2010, 4 Pages.
Cunningham, "Introducing the 2016 Pivot Mach 6—Aluminum," Pinkbike, Aug. 24, 2015, 26 pages.
Flow Mountain Bike, "Flow's First Bite: Pivot Mach 429 Trail," Nov. 17, 2016, 1 page.
Lapierre, "2015 Lapierre Spicy 527 Bike—Reviews, Comparisons, Specifications, Vital MTB," waybackmachine, Mar. 6, 2015, 6 pages.

* cited by examiner

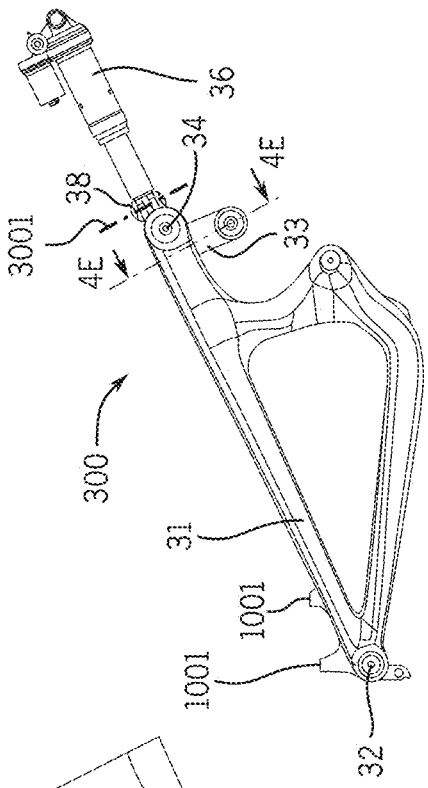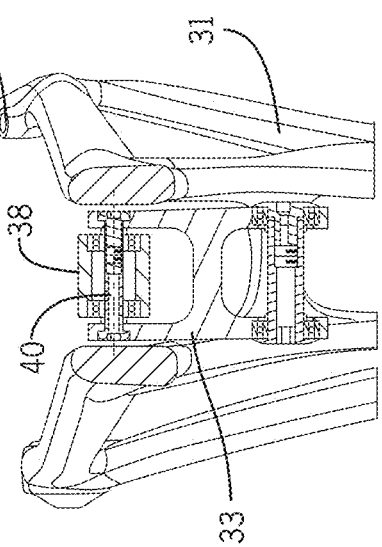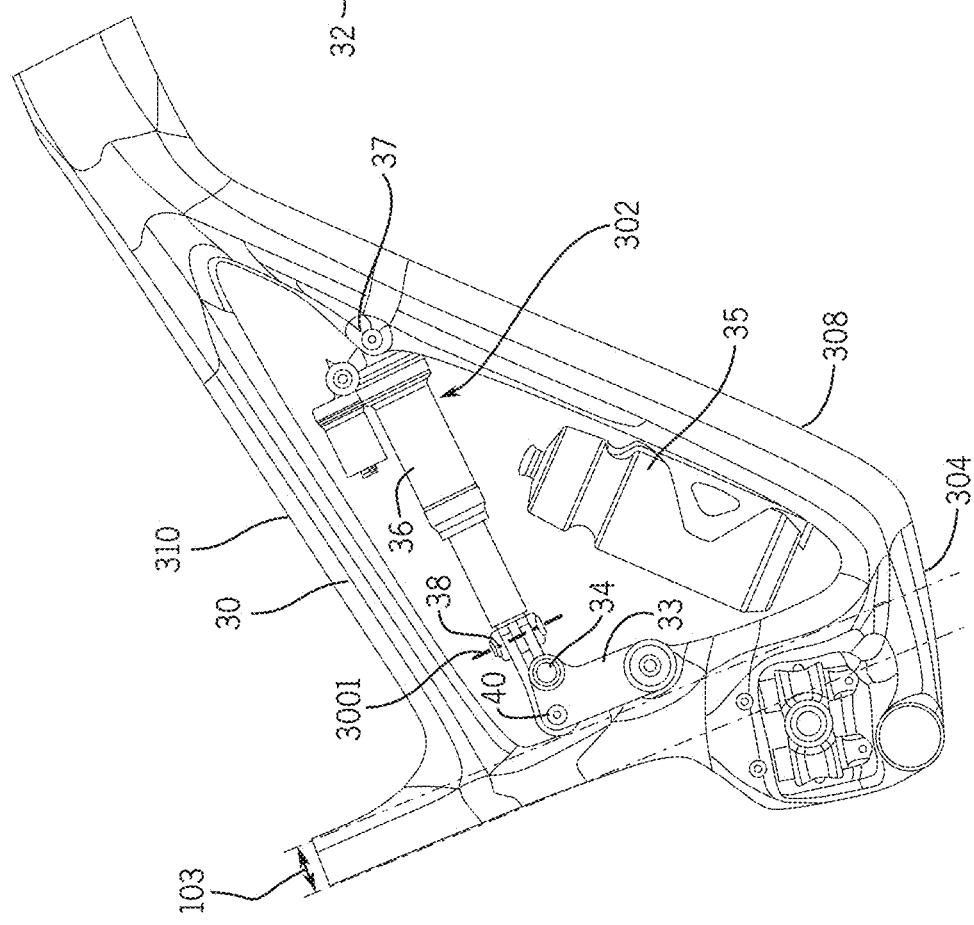
FIG. 4D
FIG. 4E
FIG. 4C

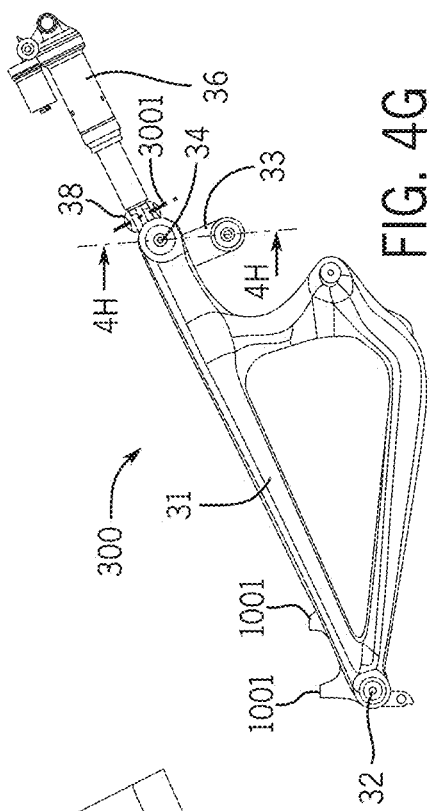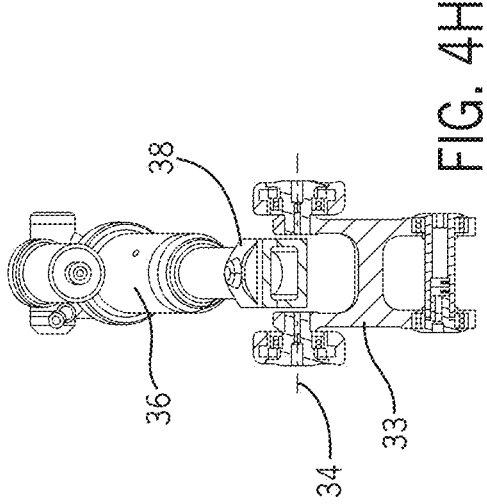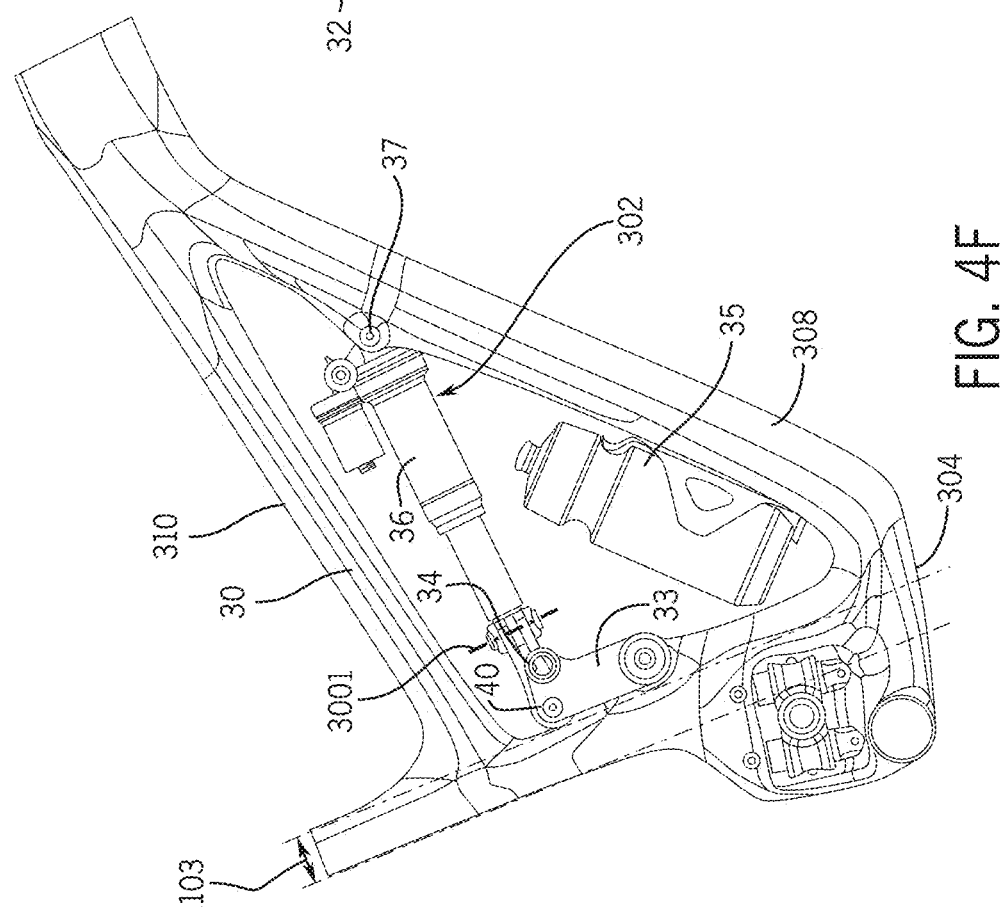

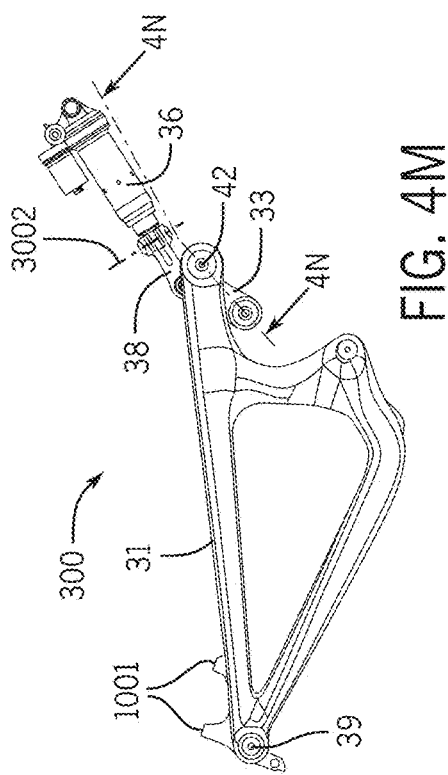
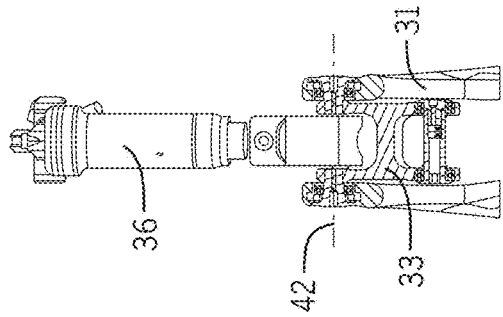
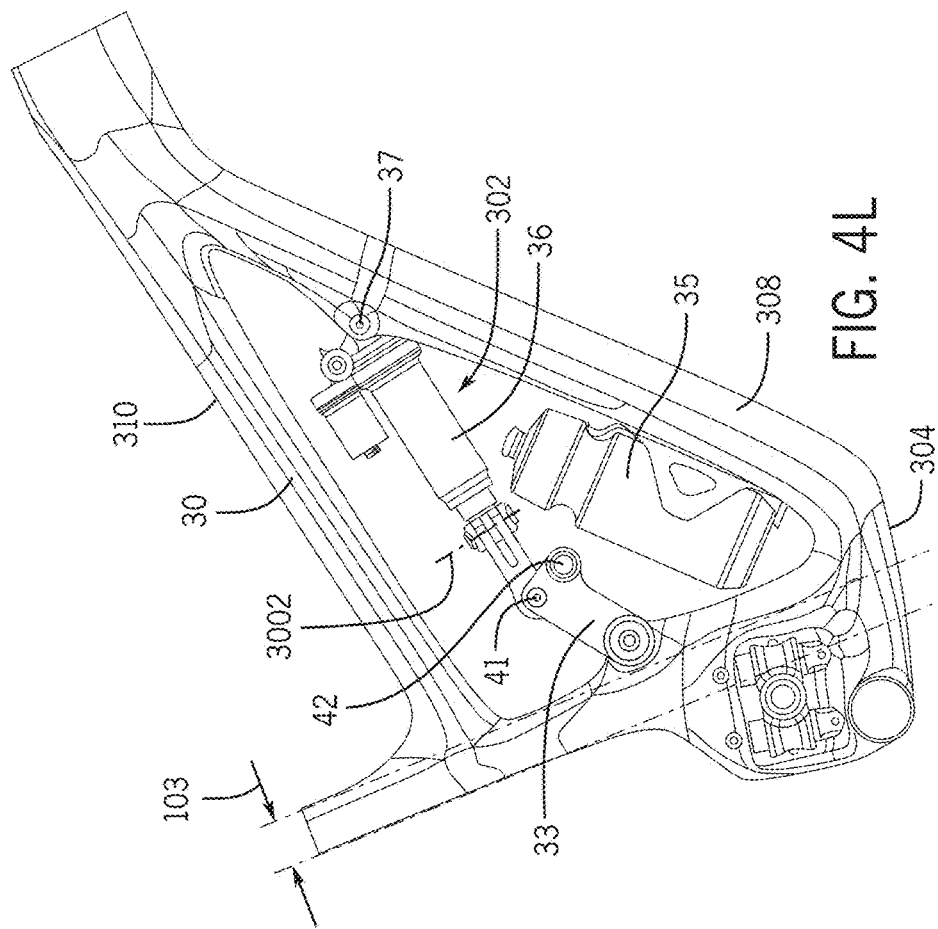
FIG. 4M
FIG. 4N
FIG. 4L

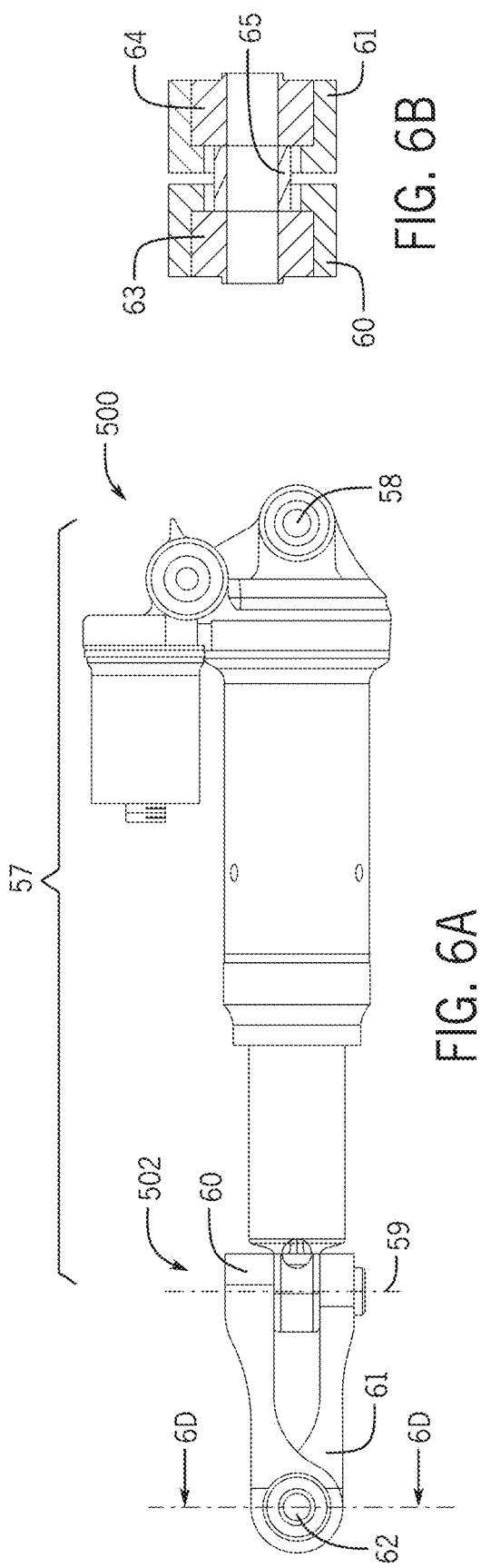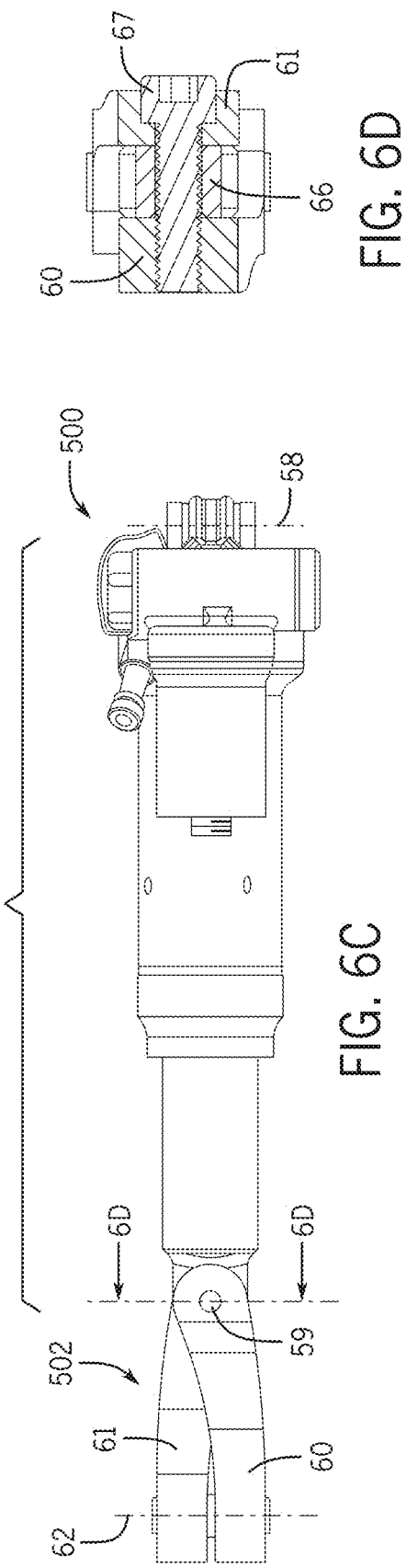

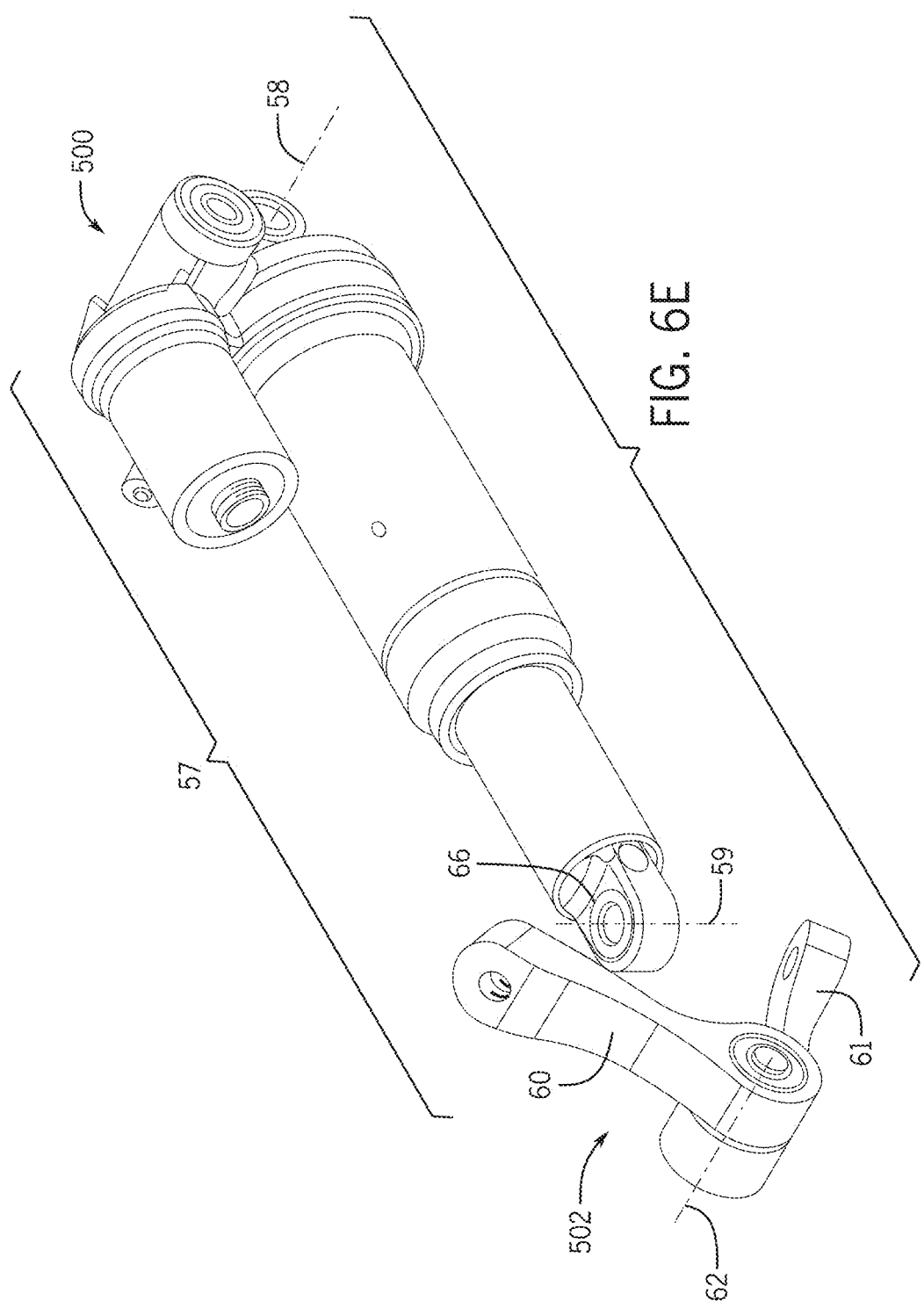

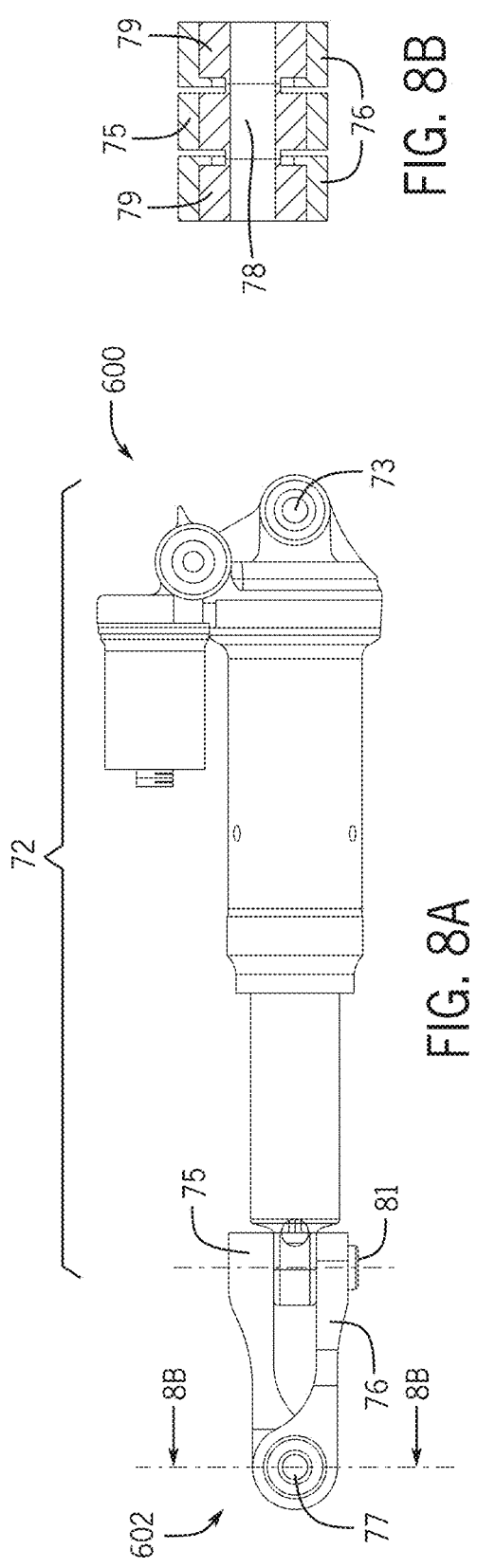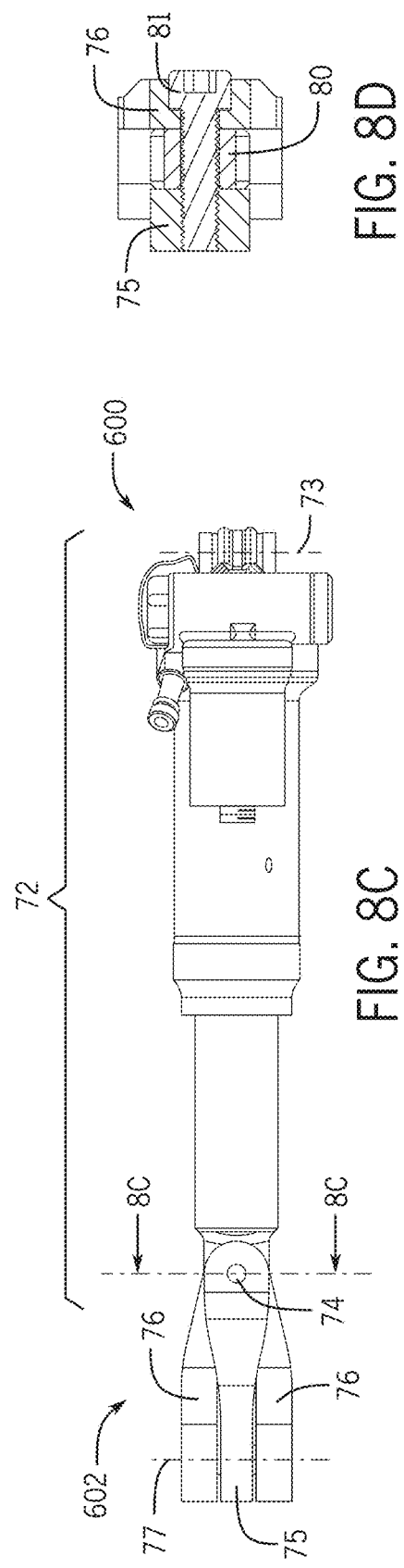

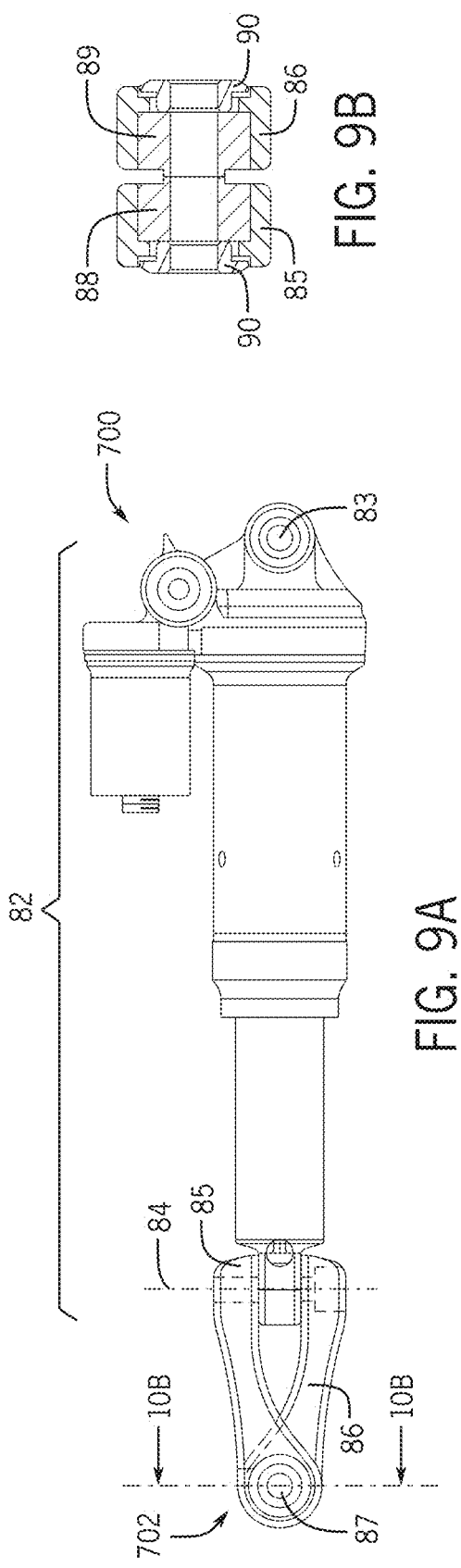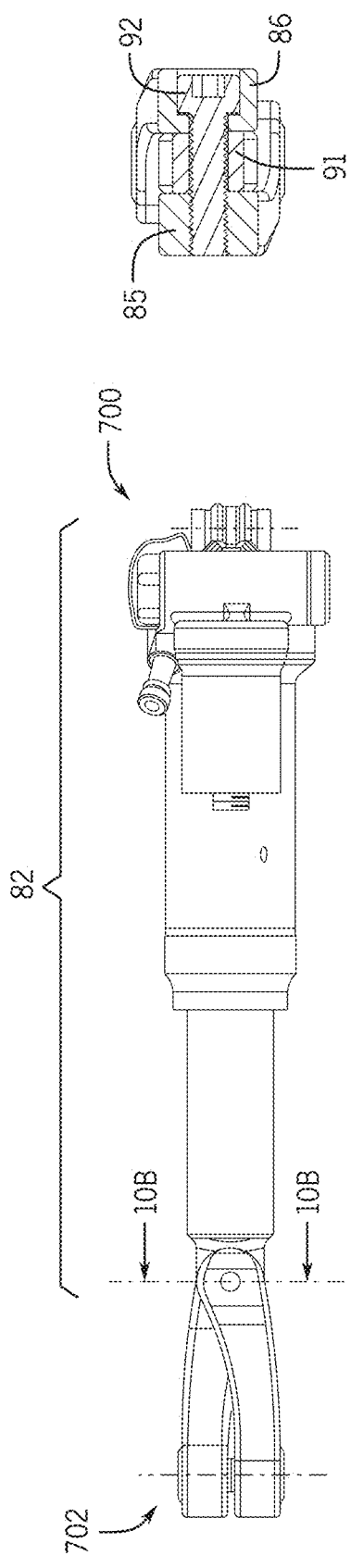

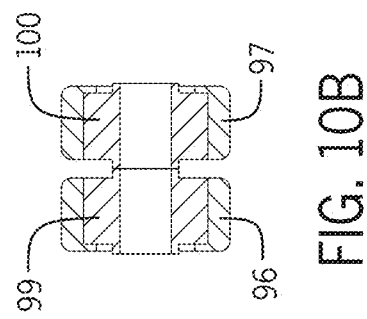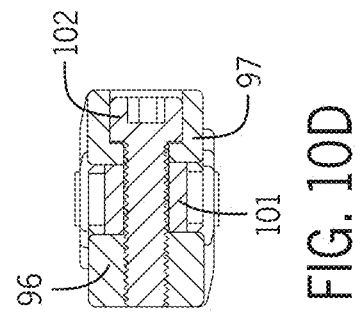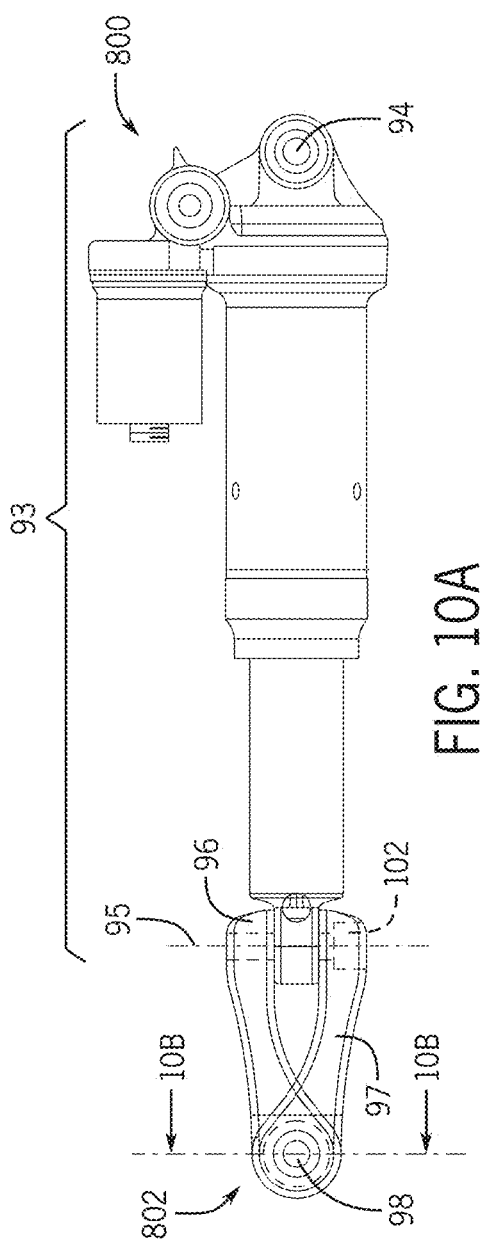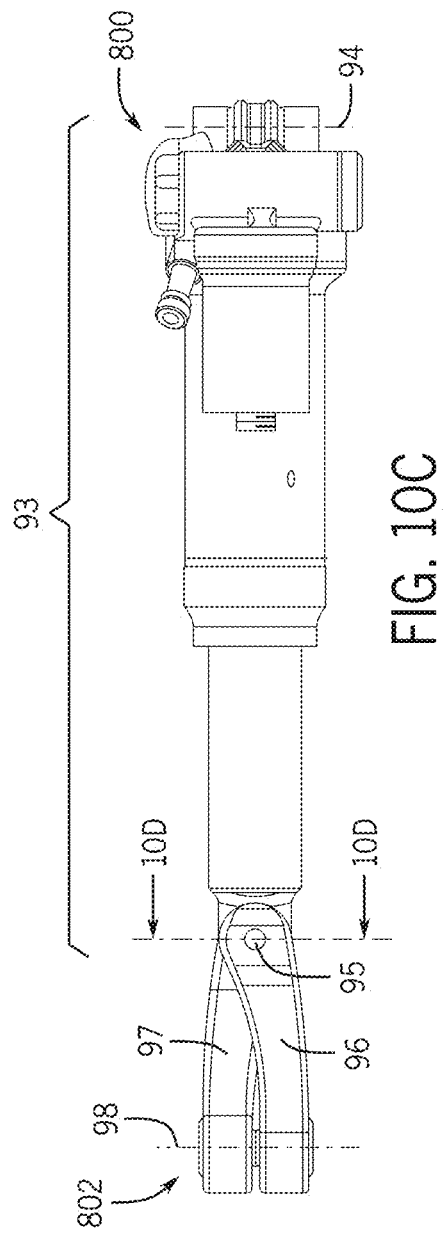
FIG. 10A
FIG. 10B
FIG. 10C
FIG. 10D

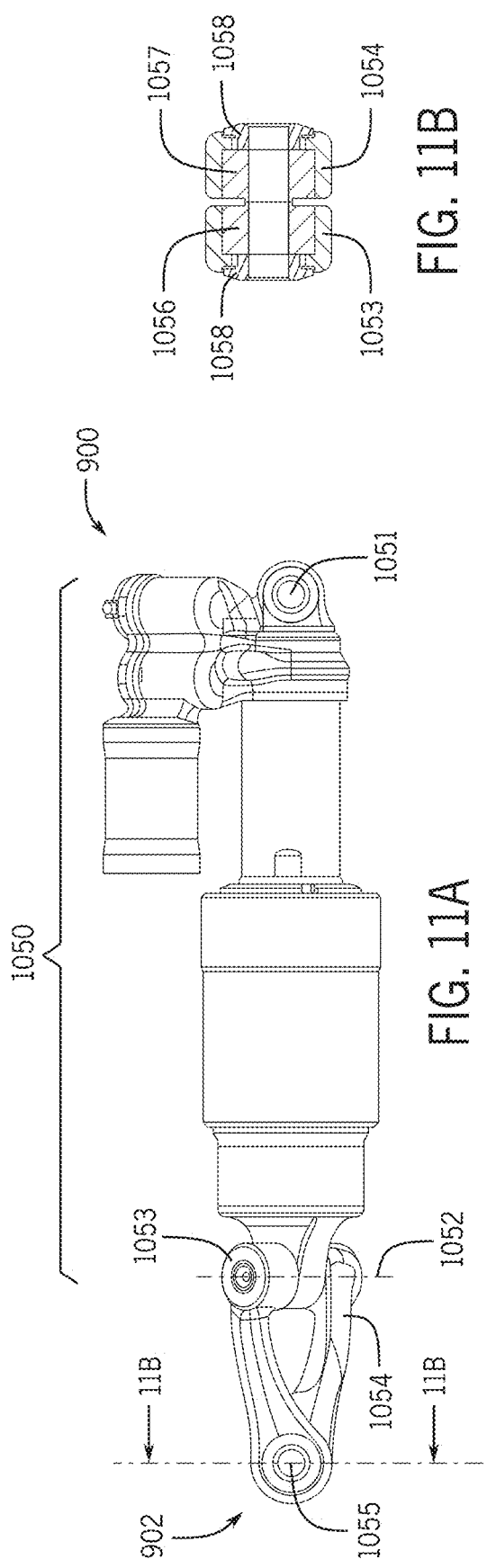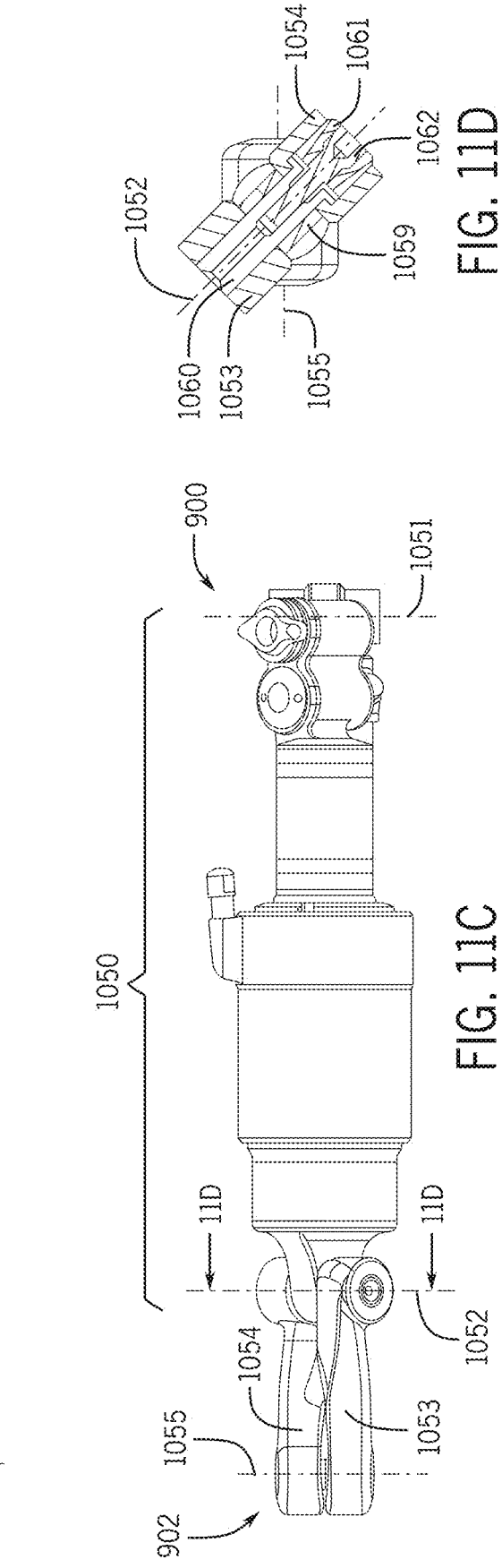

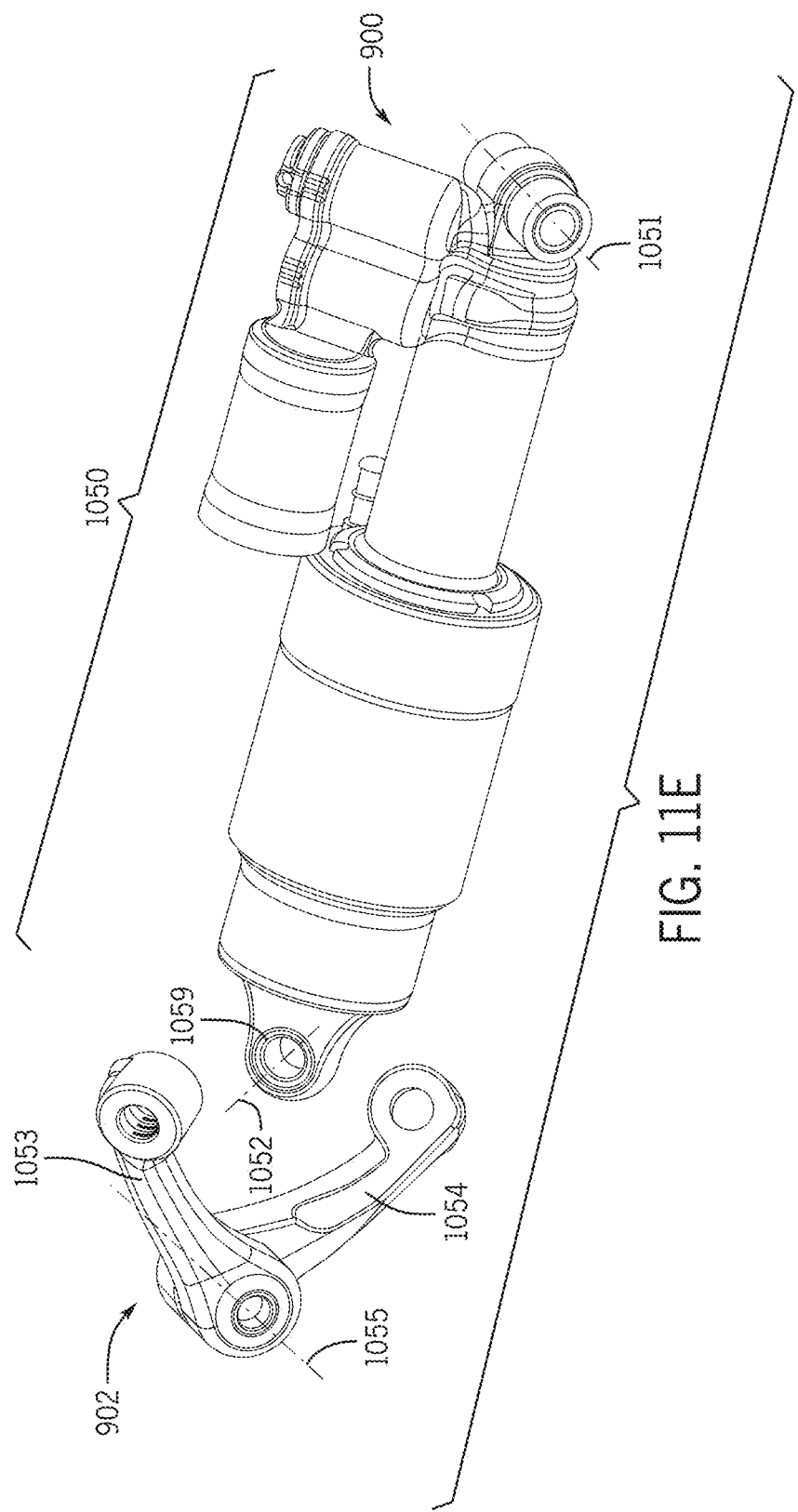

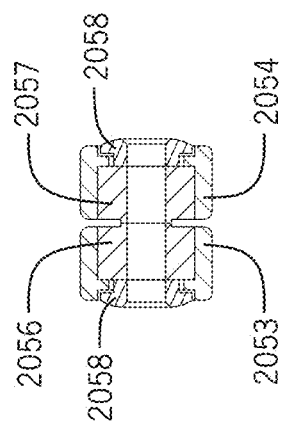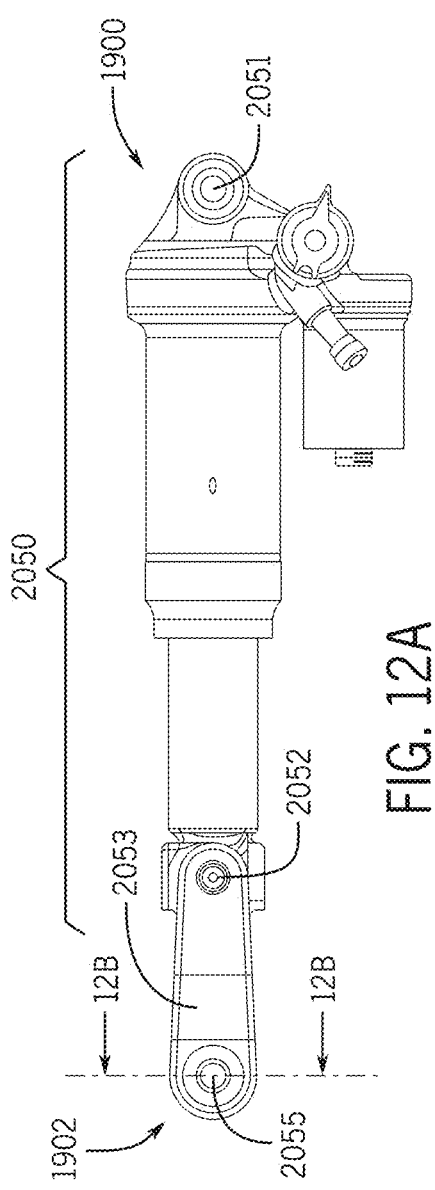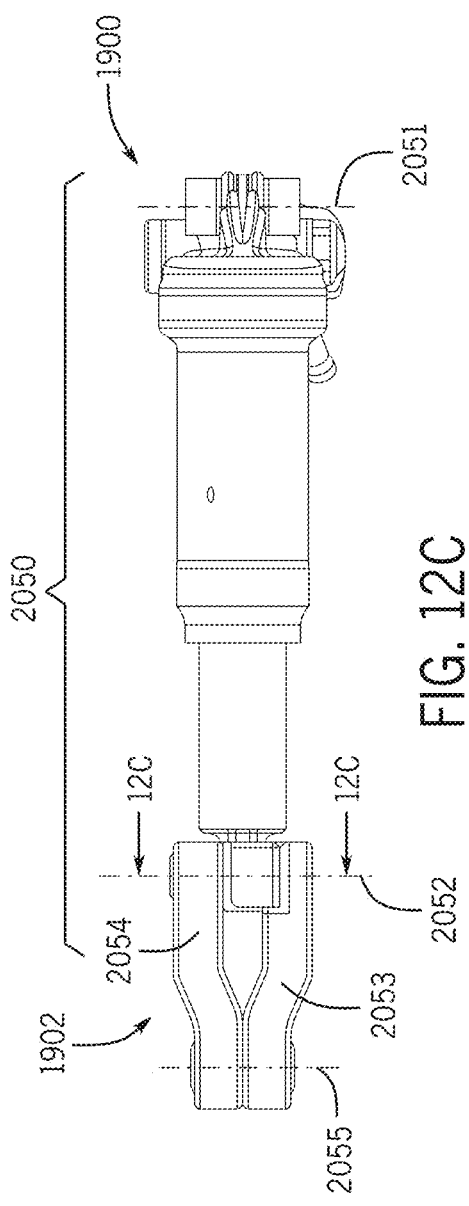

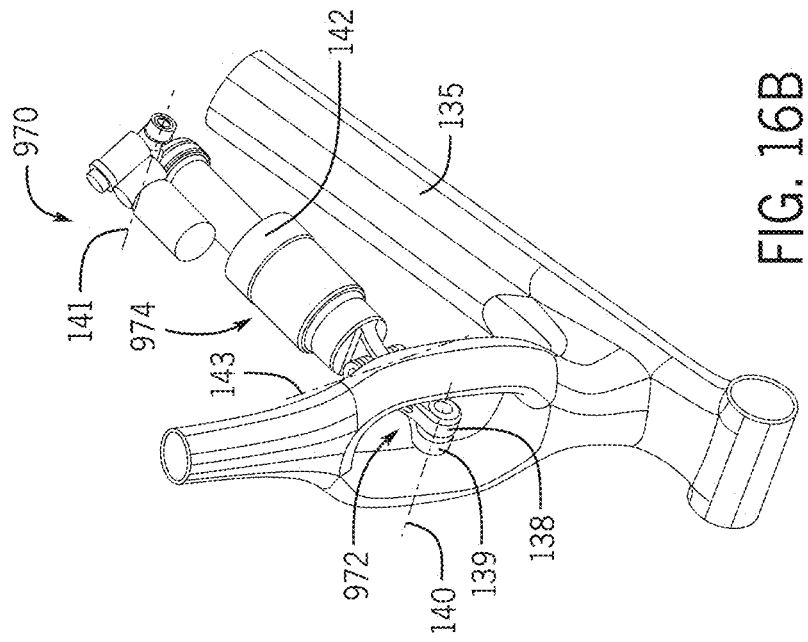
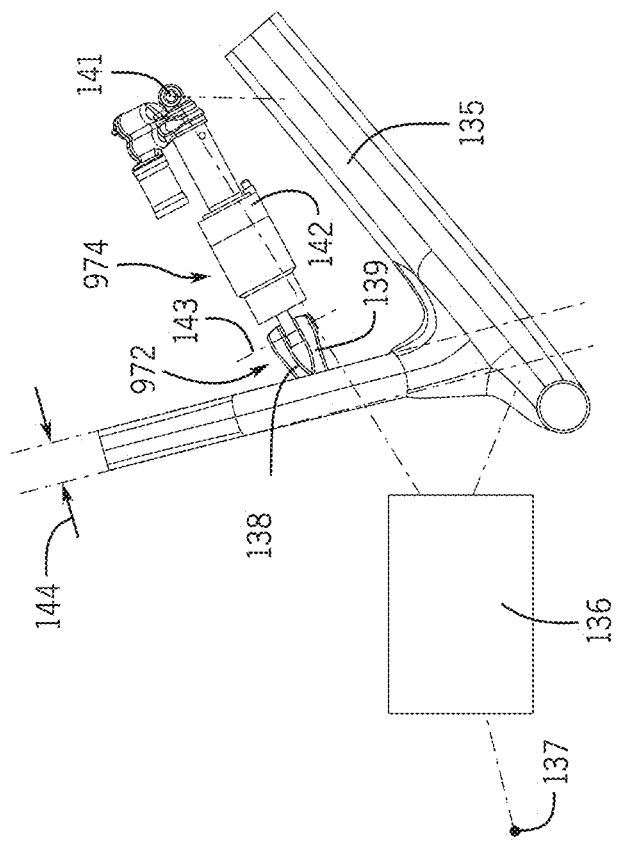

VEHICLE SUSPENSION LINKAGE

CROSS REFERENCE TO RELATED APPLICATIONS

This application claims priority to and is a continuation of U.S. patent application Ser. No. 29/770,257, filed Feb. 10, 2021, and entitled "Shock Extension;" which claims priority to and is a continuation of U.S. patent application Ser. No. 16/029,014, filed Jul. 6, 2018 (now U.S. Pat. No. 10,926,830, issued Feb. 23, 2021), and entitled "Vehicle Suspension Linkage;" which claims the benefit of priority pursuant to 35 U.S.C. § 119(e) of U.S. Provisional Patent Application No. 62/529,852, filed Jul. 7, 2017, and entitled "Vehicle Suspension Linkage;" U.S. Provisional Patent Application No. 62/540,942, filed Aug. 3, 2017, and entitled "Vehicle Suspension Linkage;" and U.S. Provisional Patent Application No. 62/635,446, filed Feb. 26, 2018, and entitled "Vehicle Suspension Linkage;" all of which are hereby incorporated by reference in their entirety for all purposes.

TECHNICAL FIELD

The technology described herein relates to vehicle suspension systems, specifically, to a shock for a vehicle suspension system.

BACKGROUND

Vehicle suspension terminology depends upon the reference frame considered. Consider a static vehicle that has two wheels, each of which are supported by the ground and a suspended body which is operatively coupled to each wheel. In a two-wheel vehicle, such as a bicycle, electric bicycle or pedelec, or motorcycle, etc., there is typically one rear wheel known as the driven wheel which includes a driven cog. There is also one front wheel. A driving cog is operatively coupled to the suspended body. A driving chain or belt connects the driven cog and the driving cog. The driving cog, which is connected to the driven cog via the driving chain/belt, is rotated by a crank under human power, by a motor, or by combined motor and human power. The reaction of the driven wheel and the ground causes the vehicle to accelerate forward, or in the general direction from the rear wheel to the front wheel. Rearward is then defined as the general direction from the front wheel to the rear wheel.

A suspension linkage operatively couples the suspended body and the driven wheel. A linkage may be composed of multiple bodies (often referred to as links or members) that are operatively coupled to each other in a manner that allows the bodies to flex, cam, rotate, or translate relative to one another. The linkage constrains the movement in which the driven wheel and brake may travel relative to the suspended body. One or more damper(s), shock(s), and/or spring(s) are typically arranged to react to relative motion between the suspended body and the driven wheel. The linkage and mechanical advantage of the shock or damper provide the vehicle with a dynamic response to acceleration and deceleration.

Existing shocks often have wide designs and are cumbersome, making it difficult to install and remove the shocks from suspension linkage systems. Further, conventional shock designs and placement within a suspension linkage system limit space within the suspension linkage system, often resulting in shock interference and reduced shock capability. The limited space also reduces the ability of the system to accommodate accessories such as tools and water bottles.

The information included in this background section of the specification, including any references cited herein and any description or discussion thereof, is included for technical reference purposes only and is not to be regarded as subject matter by which the scope of the invention as defined in the claims is to be bound.

SUMMARY

The technology disclosed herein relates to a vehicle suspension linkage system that includes a suspension frame and a shock. In some embodiments, the shock may include an extension body that operatively couples the shock to the suspension frame. The shock may be oriented in a forward position on the suspension frame. The extension body may include multiple bodies pivotally coupled to one another to open and close relative to one another, facilitating installation and disassembly of the shock to the suspension frame.

In accordance with one embodiment, a two-wheel vehicle suspension linkage includes a shock and a shock extension assembly. The shock may include first and second mounting axes operably connected to two linkage bodies. The shock may be positioned to provide linear resistance between the two linkage bodies having relative motion with respect to one another.

The shock extension assembly may include a first extension body and a second extension body. Each of the first extension body and the second extension body may include a first mounting axis and a second mounting axis positioned with respect to one another in a non-parallel mounting orientation. The extension bodies may be pivotally connected to the suspension linkage so that the first mounting axis of the first extension body is collinear with the first mounting axis of the second extension body. The second mounting axis of the first extension body may be collinear to both the second mounting axis of the second extension body and to one of the shock mounting axes defining a non-effective shock damper axis.

In accordance with one embodiment, a vehicle suspension linkage system includes a suspended body, a link body, a dynamic body (DB), and a seat tube. The link body may be coupled to the dynamic body defining an instantaneous velocity center (IVC[link body][DB]). The link body may additionally or alternatively be coupled to the suspended body defining a stationary instantaneous velocity center (SIVC[suspended body][link body]). The vehicle suspension linkage may additionally or alternatively include a shock assembly including a shock and an extension body attached thereto. The shock assembly may include a first effective axis and a second effective axis positioned such that the first effective axis and the second effective axis are both in front of the seat tube when virtually extended in both directions axially. At least one effective axis may be positioned rearward of the IVC[link body][DB] in an extended state. The SIVC[suspended body][link body] may be located below IVC[link body][DB] in an extended state.

In accordance with one embodiment, a vehicle suspension linkage system may include a suspended body, a link body, a dynamic body (DB), and a seat tube. The link body may be coupled to the dynamic body defining an instantaneous velocity center (IVC[link body][DB]). The link body may be coupled to the suspended body defining a stationary instantaneous velocity center (SIVC[suspended body][link body]). The vehicle suspension linkage may additionally or alternatively include a shock assembly with a first effective axis and a second effective axis positioned such that the first effective axis and the second effective axis are both in front of the seat tube when virtually extended in both directions axially. At least one effective axis may be positioned rearward of an IVC[link body][DB] in an extended state. The SIVC[suspended body] [link body] may be located below IVC[link body][DB] in an extended state. The shock may have a ratio that is greater than or equal to 4.25.

In accordance with one embodiment, a two-wheel vehicle suspension linkage may include a shock and a shock extension. The shock may have first and second mounting axes operably connected to two linkage bodies. The shock may be positioned to provide linear resistance between the two linkage bodies having relative motion with respect to one another. The shock extension assembly may include a first extension body and a second extension body. Each of the first extension body and the second extension body may have a first mounting axis and a second mounting axis positioned with respect to one another in a parallel mounting orientation. The extension bodies may be pivotally connected to the suspension linkage so that the first mounting axis of the first extension body is collinear with the first mounting axis of the second extension body. The second mounting axis of the first extension body may be collinear to both the second mounting axis of the second extension body and to one of the shock mounting axes defining a non-effective shock damper axis. The first extension body engages the top of a shock mounting surface and the second extension body engages the bottom of the shock mounting surface limiting relative rotation between shock and the first and second extension bodies.

Any one or more of the above embodiments additionally or alternatively include any one or more of the below elements, features, aspects, systems, or methods.

For example each of the embodiments of the present disclosure may include a two-wheel vehicle suspension linkage. The suspension linkage may include a shock or damper with both effective axes located in front of the seat tube virtually extended in both directions axially and a shock ratio that is greater than or equal to 4.25. An effective axis may be located behind an IVC[linkage body][DB] in the extended state. A portion of the effective shock envelope may be mounted inside of the linkage body.

The suspension linkage may include an actual rear shock eyelet axis. The eyelet axis may be in front of an IVC [linkage body][DB] in the extended state.

The suspension linkage may have at least 6 IVCs. Alternatively, the suspension linkage may have at least 15 IVCs.

The suspension linkage may have a "dynamic body" (DB). The DB may include the wheel carrier body and the brake carrier body. The DB may be the brake carrier body. The DB may be the wheel carrier body. The DB may also be known as a swingarm.

Other embodiments of the present disclosure may include a two-wheel vehicle suspension linkage. The suspension linkage may include a shock or damper with both effective axes located in front of the seat tube and a shock ratio that is greater than or equal to 4.25.

The suspension linkage may include an effective rear shock eyelet axis. The effective rear shock eyelet axis may be located behind an IVC[linkage body][DB] in the extended state. The suspension linkage may include a non-effective shock or damper axis. The non-effective shock or damper axis may be in front of an IVC[linkage body][DB] in the extended state.

The suspension linkage may have a DB. The DB may include the wheel carrier body and the brake carrier body. The DB may be the brake carrier body. The DB may be the wheel carrier body.

The suspension linkage may have at least 1 IVC. Alternatively, the suspension linkage may have at least 6 IVCs. Alternatively, the suspension linkage may have at least 15 IVCs.

Other embodiments of the present disclosure may include a two-wheel vehicle suspension linkage. The suspension linkage may include an extension body mated to a shock or damper to form a rigid non-rotating connection. The suspension linkage may also include two effective rear shock or damper axes. The effective rear shock or damper axes may be located in front of the seat tube virtually extended in both directions axially. The suspension linkage may also include an effective shock or damper axis. The effective shock or damper axis may be located behind an IVC[linkage body] [DB] in the extended state. The suspension linkage may also include a non-effective shock damper axis. The non-effective shock damper axis may be in front of the IVC[linkage body][DB] in the extended state.

The suspension linkage may have at least 1 IVC. Alternatively, the suspension linkage may have at least 6 IVCs. Alternatively, the suspension linkage may have at least 15 IVCs.

The suspension linkage may have a DB. The DB may include the wheel carrier body and the brake carrier body. The DB may be the brake carrier body. The DB may be the wheel carrier body.

Other embodiments of the present disclosure may include a two-wheel vehicle suspension linkage. The suspension linkage may include an extension body rigidly coupled to a shock or damper. The shock or damper may store at least one accessory.

The stored accessory may be a tool. The accessory may be related to inflating a tube or tire. The accessory may be a $CO_2$ cartridge. The accessory may be a $CO_2$ inflator valve. The accessory may be a spare part.

In accordance with one embodiment, a two-wheel vehicle suspension linkage may include a shock and a shock extension. The shock may have first and second mounting axes operably connected to two linkage bodies. The shock may be positioned to provide linear resistance between the two linkage bodies having relative motion with respect to one another. The shock extension assembly may include a first extension body and a second extension body. Each of the first extension body and the second extension body may have a first mounting axis and a second mounting axis positioned with respect to one another in a parallel mounting orientation. The extension bodies may be pivotally connected to the suspension linkage so that the first mounting axis of the first extension body is collinear with the first mounting axis of the second extension body. The second mounting axis of the first extension body may be collinear to both the second mounting axis of the second extension body and to one of the shock mounting axes defining a non-effective shock damper axis. The first extension body engages the top of a shock mounting surface and the second extension body engages the bottom of the shock mounting surface limiting relative rotation between shock and the first and second extension bodies.

The extension bodies and the shock may be pivotally connected on the first side. The extension bodies may be pivotally connected on the second side. The axis of the pivotal connection on the first side and the axis of the pivotal connection on the second side may be substantially non-parallel and, in some cases, perpendicular. Non-parallel axes allow for a rigid, non-rotating connection to the shock therefore effectively increasing the eye-eye mounting length of the shock. There may be two extension bodies.

The extension bodies and the shock may be pivotally connected on the first side. The extension bodies may be pivotally connected on the second side. The axis of the pivotal connection on the first side and the axis of the pivotal connection on the second side may be substantially parallel. The first extension body may engage the top of a shock mounting surface and the second extension body may engage the bottom of the shock mounting surface limiting relative rotation between shock and the first and second extension bodies.

The suspension linkage may include an accessory. The accessory may be stored on at least one of the extension bodies. The accessory may be a tool. The accessory may be related to inflating a tube or tire. The accessory may be a $CO_2$ cartridge. The accessory may be a $CO_2$ inflator valve. The accessory may be a spare part.

Other embodiments of the present disclosure may include a two-wheel vehicle suspension linkage. The suspension linkage may include a plurality of extension bodies. The extension bodies may be operatively connected to a shock or damper on a first side of the extension bodies. The extension bodies may be operatively connected to each other on a second side of the extension bodies. The shock or damper and the extension bodies may be constrained in a rigid non-rotating connection with one another when the shock or damper and the extension bodies are mounted to a suspension mechanism. At least a portion of the shock extension bodies may be located behind a portion of uninterrupted seat tube virtually extended in both directions axially when the suspension is fully extended. Each extension body may mounted to either the top or bottom of the shock or damper.

The extension bodies and the shock may be pivotally connected on the first side. The extension bodies may be pivotally connected on the second side. The axis of the pivotal connection on the first side and the axis of the pivotal connection on the second side may be substantially non-parallel and, in some cases, perpendicular. Non-parallel axes allow for a rigid, non-rotating connection to the shock therefore effectively increasing the eye-eye mounting length of the shock. There may be two extension bodies.

The extension bodies and the shock may be pivotally connected on the first side. The extension bodies may be pivotally connected on the second side. The axis of the pivotal connection on the first side and the axis of the pivotal connection on the second side may be substantially parallel. The first extension body may engage the top of a shock mounting surface and the second extension body may engage the bottom of the shock mounting surface limiting relative rotation between shock and the first and second extension bodies.

The suspension linkage may include an accessory. The accessory may be stored on at least one of the extension bodies. The accessory may be a tool. The accessory may be related to inflating a tube or tire. The accessory may be a $CO_2$ cartridge. The accessory may be a $CO_2$ inflator valve. The accessory may be a spare part.

Other embodiments of the present disclosure may include a two-wheel vehicle suspension linkage. The vehicle suspension linkage may include a plurality of extension bodies. The extension bodies may be operatively connected to the shock or damper on a first side of the extension bodies. The extension bodies may be operatively connected to each other on a second side of the extension bodies. The shock or damper and the extension bodies may be constrained in a rigid non-rotating connection with one another when the shock or damper and the extension bodies are mounted to a suspension mechanism. At least a portion of the shock extension bodies may be located behind a portion of interrupted seat tube virtually extended in both directions axially when the suspension is fully extended. Each extension body is distinctly mounted to either the top or bottom of the shock or damper.

The extension bodies and the shock may be pivotally connected on the first side. The extension bodies may be pivotally connected on the second side. The axis of the pivotal connection on the first side and the axis of the pivotal connection on the second side may be substantially non-parallel and, in some cases, perpendicular. Non-parallel axes allow for a rigid, non-rotating connection to the shock therefore effectively increasing the eye-eye mounting length of the shock. There may be two extension bodies.

The extension bodies and the shock may be pivotally connected on the first side. The extension bodies may be pivotally connected on the second side. The axis of the pivotal connection on the first side and the axis of the pivotal connection on the second side may be substantially parallel. The first extension body may engage the top of a shock mounting surface and the second extension body may engage the bottom of the shock mounting surface limiting relative rotation between shock and the first and second extension bodies.

The suspension linkage may include an accessory. The accessory may be stored on at least one of the extension bodies. The accessory may be a tool. The accessory may be related to inflating a tube or tire. The accessory may be a $CO_2$ cartridge. The accessory may be a $CO_2$ inflator valve. The accessory may be a spare part.

Other embodiments of the present disclosure may include a two-wheel vehicle suspension linkage. The suspension linkage may include a plurality of extension bodies. The extension bodies may be operatively connected to the shock or damper on a first side of the extension bodies. The extension bodies may be operatively connected to each other on a second side of the extension bodies. The shock or damper and the extension bodies may be constrained in a rigid non-rotating connection with one another when the shock or damper and the extension bodies are mounted to a suspension mechanism. At least a portion of the shock extension bodies may be located within a portion of uninterrupted seat tube virtually extended in both directions axially when the suspension is fully extended. Each extension body may be distinctly mounted to either the top or bottom of the shock or damper end mounting surfaces.

The extension bodies and the shock may be pivotally connected on the first side. The extension bodies may be pivotally connected on the second side. The axis of the pivotal connection on the first side and the axis of the pivotal connection on the second side may be substantially non-parallel and, in some cases, perpendicular. Non-parallel axes allow for a rigid, non-rotating connection to the shock therefore effectively increasing the eye-eye mounting length of the shock. There may be two extension bodies.

The extension bodies and the shock may be pivotally connected on the first side. The extension bodies may be pivotally connected on the second side. The axis of the pivotal connection on the first side and the axis of the pivotal connection on the second side may be substantially parallel. The first extension body may engage the top of a shock mounting surface and the second extension body may engage the bottom of the shock mounting surface limiting relative rotation between shock and the first and second extension bodies.

The suspension linkage may include an accessory. The accessory may be stored on at least one of the extension bodies. The accessory may be a tool. The accessory may be related to inflating a tube or tire. The accessory may be a $CO_2$ cartridge. The accessory may be a $CO_2$ inflator valve. The accessory may be a spare part.

Other embodiments of the present disclosure may include a two-wheel vehicle suspension linkage. The suspension linkage may include a plurality of extension bodies. The extension bodies may be operatively connected to the shock or damper on a first side of the extension bodies. The extension bodies may be operatively connected to each other on a second side of the extension bodies. The shock or damper and the extension bodies may be constrained in a rigid non-rotating connection with one another when the shock or damper and the extension bodies are mounted to a suspension mechanism. At least a portion of the shock extension bodies may be located within a portion of interrupted seat tube virtually extended in both directions axially when the when the suspension is fully extended. Each extension body may be distinctly mounted to either the top or bottom of the shock or damper.

The extension bodies and the shock may be pivotally connected on the first side. The extension bodies may be pivotally connected on the second side. The axis of the pivotal connection on the first side and the axis of the pivotal connection on the second side may be substantially non-parallel and, in some cases, perpendicular. Non-parallel axes allow for a rigid, non-rotating connection to the shock therefore effectively increasing the eye-eye mounting length of the shock. There may be two extension bodies.

The extension bodies and the shock may be pivotally connected on the first side. The extension bodies may be pivotally connected on the second side. The axis of the pivotal connection on the first side and the axis of the pivotal connection on the second side may be substantially parallel. The first extension body may engage the top of a shock mounting surface and the second extension body may engage the bottom of the shock mounting surface limiting relative rotation between shock and the first and second extension bodies.

The suspension linkage may include an accessory. The accessory may be stored on at least one of the extension bodies. The accessory may be a tool. The accessory may be related to inflating a tube or tire. The accessory may be a $CO_2$ cartridge. The accessory may be a $CO_2$ inflator valve. The accessory may be a spare part.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 4C-E shows various views depicting different attachments of the shock or damper with the suspension linkage assembly of FIG. 4A in the extended state.

FIG. 4F-H shows various views depicting different attachments of the shock or damper with the suspension linkage assembly of FIG. 4A in the extended state.

FIGS. 4L-4N show various views depicting different attachments of the shock or damper with the suspension linkage assembly of FIG. 4A in the compressed state.

FIG. 6A shows a side elevation view and cross-section of a shock or damper including a shock extension with two bodies in the closed position.

FIG. 6B shows a cross-section of a shock or damper of FIG. 6A.

FIG. 6C shows a top plan view of the shock of FIG. 6A with the shock extension bodies in the closed position.

FIG. 6D shows a cross-section of a shock or damper of FIG. 6C.

FIG. 6E shows an isometric perspective view of the shock of FIG. 6A with the shock extension bodies in the open position.

FIG. 8A shows a side elevation view of a shock or damper including a shock extension with two bodies in the closed position.

FIG. 8B shows a cross-section of a shock or damper of FIG. 8A.

FIG. 8C shows a top plan view of the shock of FIG. 8A with the extension bodies in a closed position.

FIG. 8D shows a cross-section of a shock or damper of FIG. 8C.

FIG. 9A shows a side elevation view of a shock or damper including a shock extension with two bodies in the closed position.

FIG. 9B shows a cross-section of a shock or damper of FIG. 9A.

FIG. 9C shows a top plan view of the shock of FIG. 9A with the shock extension bodies in a closed position.

FIG. 9D shows a cross-section of a shock or damper of FIG. 9C.

FIG. 10A shows a side elevation view of a shock or damper including a shock extension with two bodies in the closed position.

FIG. 10B shows a cross-section of a shock or damper of FIG. 10A.

FIG. 10C shows a top plan view of the shock of FIG. 10A with the shock extension bodies in the closed position.

FIG. 10D shows a cross-section of a shock or damper of FIG. 10C.

FIG. 11A shows a side elevation view and cross-section of a shock or damper including a shock extension with two bodies in the closed position.

FIG. 11B shows a cross-section of a shock or damper of FIG. 15A.

FIG. 11C shows a top plan view and cross-section of the shock of FIG. 15A with the extension bodies in a closed position.

FIG. 11D shows a cross-section of a shock or damper of FIG. 15C.

FIG. 11E shows an isometric perspective view of the shock of FIG. 15A with the extension bodies in an open position.

FIG. 12A shows a side elevation view and cross-section of a shock or damper including a shock extension with two bodies in the closed position.

FIG. 12B shows a cross-section of a shock or damper of FIG. 16A.

FIG. 12C shows a top plan view and cross-section of the shock of FIG. 16A with the extension bodies in a closed position.

FIG. 12D shows a cross-section of a shock or damper of FIG. 16C.

FIG. 16A shows a side elevation view of a suspension system with a multi-body shock or damper extension in the extended state positioned within a portion of interrupted seat tube.

FIG. 16B shows an isometric view of a suspension system with a multi-body shock or damper extension in the extended state positioned within a portion of interrupted seat tube.

DETAILED DESCRIPTION

Figure 1A:
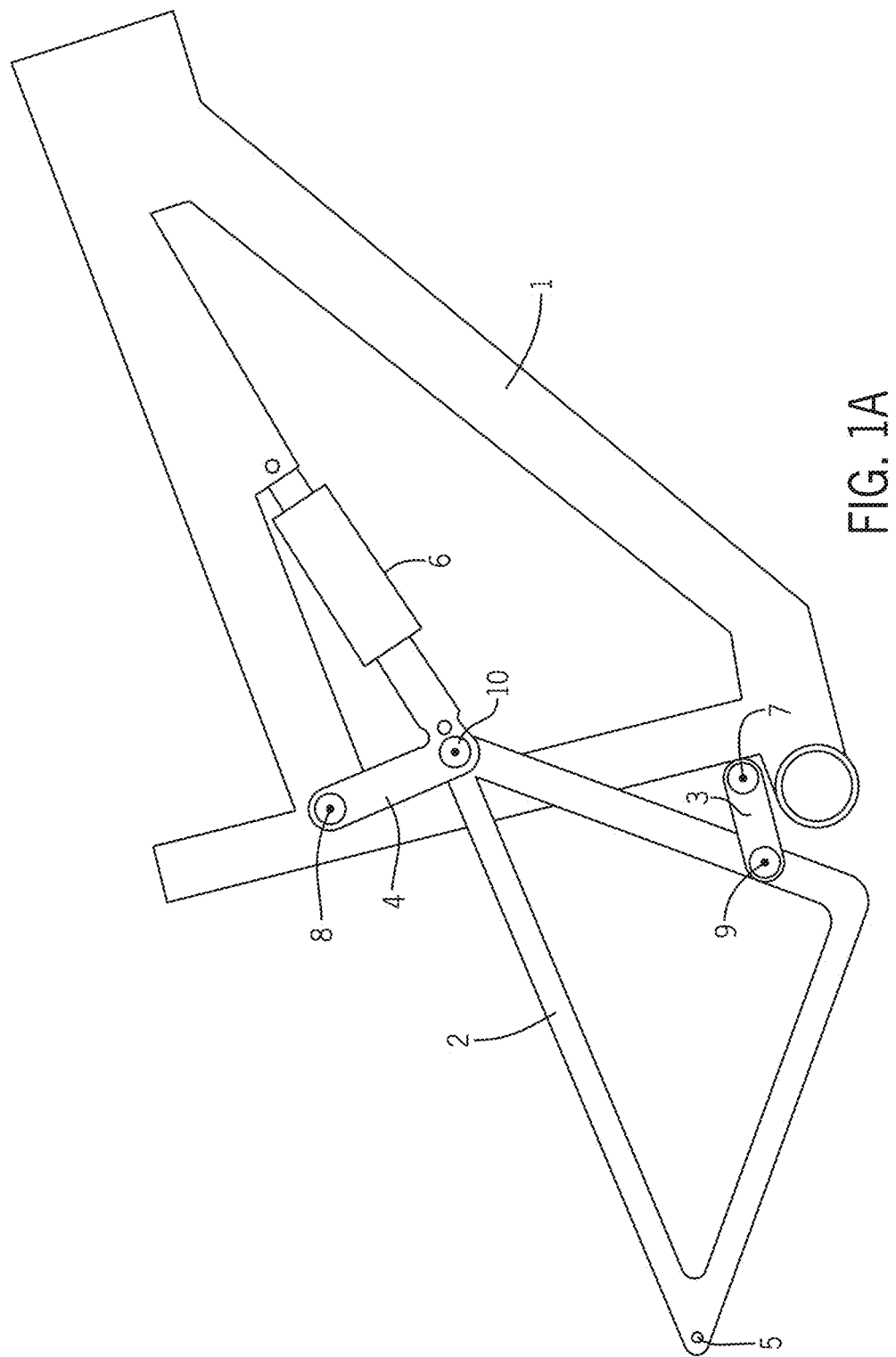
FIG. 1A shows a 4-bar linkage bicycle suspension system in the extended state.

Disclosed herein is a vehicle suspension linkage system that includes a suspension frame and a shock or damper. In some embodiments, the shock may include a shock body and an extension body that operatively couple the shock to the suspension frame. The extension body may include one or more bodies. In an embodiment with multiple extension bodies, the extension bodies may be pivotally coupled to one another to open and close relative to one another, facilitating installation and disassembly of the shock to the suspension frame.

In several embodiments, the shock may be coupled to a link body in the suspension linkage system. In one example, the extension body may be pivotally coupled to the link body. This may allow the shock to transition between an extended and compressed state, moving as the link body moves relative to the suspension frame. The transition between the extended and compressed states is reflected by a change in the angle of the shock relative to the suspension frame. In one example, as the system moves from the extended state to the compressed state, the angle of the shock relative to the suspension frame decreases. While the shock may move relative to the suspension frame, the shock body and the extension bodies may be constrained in a rigid, non-rotating connection with one another.

In several embodiments, the disclosed shock may be positioned further forward within a suspension linkage system than the positioning of traditional shocks. The movement of the shock between different states and the more forward positioning of the shock within the suspension system may allow for a narrower shock design and narrower suspension frame, creating more space within the suspension system to allow for improved shock capability, easier assembly and disassembly of the shock, and room for accessories, such as, for example, tools and spare parts.

It is contemplated that the disclosed shock may be used in various suspension systems. For example, the disclosure may apply to suspension systems with any number of linkages, such as, for example, 4-bar or 6-bar linkage systems. The relationship of various linkages may be described with respect to characteristics of those linkages. One analysis system useful for assessing these relationships is the Mobility Analysis of Mechanisms. The Mobility Analysis of Mechanisms (Kutzbach (or Grübler) mobility criterion) may be used to describe the mobility, or output degree of freedom of a linkage. This system may be used to describe the mobility m of a planar linkage composed of n links that are coupled with p flexible joints/pivots. In the various embodiments of suspension linkage systems discussed herein, the links can be connected via these flexible joints/pivots allowing some degree of freedom between one another. Additionally, the relationships of the links via the joints may define various characteristics, such as instantaneous velocity centers (IVCs). In various examples, the flexible joints/pivots can include revolute, slider or cam joints, or any other suitable flexible joints or pivots that allow one degree of freedom of movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real world accuracy of the characteristics discussed herein while allowing for real world variance in the characteristics. Note that if bodies are coupled as one and not considered completely rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

mobility=$m=3(n-1-p)+p$ n=number of bodies (or links or members)
p=number of joints
$\Sigma f$=sum of the kinetic variables in the mechanism As an example, this equation may be applied to a "single pivot" linkage. The following solves the equation for a 4-bar linkage:
p=n=1
m=3(n−1−p)+p
m=3(1−1−1)+4
m=3(−1)+4
m=−3+4
m=1

As an example, this equation may be applied to a 4-bar linkage. The following solves the equation for a 4-bar linkage:
p=n=4
m=3(n−1−p)+p
m=3(4−1−4)+4
m=3(−1)+4
m=−3+4
m=1

As another example, this equation may be applied to a 6-bar linkage. The following solves the equation for a 6-bar linkage:
n=6
p=7
m=3(n−1−p)+p
m=3(6−1−7)+7
m=3(−2)+7
m=−6+7
m=1

In noted single pivot, 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions.

Additionally, methods of analyzing a vehicle suspension linkage design for its dynamic response is also disclosed. In one example, this method of analysis includes a collection of the system instantaneous velocity centers (IVCs), which can be determined graphically. An IVC is a point common to two linkage bodies where there is zero relative velocity. These IVCs may change location instantaneously as the suspension is cycled from its extended to compressed state. The path of each IVC migration may then be plotted graphically as a path, curve, or spline from the extended to the compressed state. These curves depend upon the reference frame considered. It is possible for an IVC, known as a stationary IVC (SIVC), to have little to no migration from the extended to the compressed state. One example would be an IVC where a link body is operatively connected to the suspended body. In various embodiments, the suspended body is considered fixed as the driven wheel moves from the extended to the compressed state. Total suspension travel (VWT[T]) may be defined as the perpendicular distance relative to the ground line at the extended state as measured between the extended suspension state point and the compressed suspension state point on the driven wheel axis path.

For reference herein, specific instantaneous velocity centers of a linkage are denoted as IVC[Body-A][Body-B]. Body-A and Body-B being the relevant bodies in the relationship. For example, IVC[1][2] is the instantaneous velocity center relative to body-1 and body-2. Additionally, IVC[1][2] is equivalent to IVC[2][1].

The structure surrounding the suspension system may include several bodies. In various examples, the structure may include a suspended body. In various embodiments, the suspended body can be suitable to be supported by suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body). The term "swingarm" is commonly used to denote a DB be it a wheel carrier body, a brake carrier body, or both a wheel and brake carrier body.

Specific IVC migrations called dynamic IVCs (DIVCs) may be utilized to determine the vehicle's dynamic response. The DIVCs depend upon the specific linkage layout but always depend upon suspended body-1, which is the body that includes a passenger or rider. DIVC[L] is the length of the DIVC migration path, spline, or curve.

In accordance with various embodiments, the body-X can be both a wheel carrier and a brake carrier body. In such an embodiment, there is a single DIVC[AD] migration, DIVC[AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z].

Based upon the number of bodies present in the structure, the total number of instantaneous velocity centers (IVCs) can be determined. The following equation can be used:

$$\text{Number of Instance Centers} = N = \frac{n(n-1)}{2}$$

n=number of bodies moving relative to one another
N=total number of instantaneous velocity centers of the linkage As an example, this equation may be applied to a 4-bar linkage. In this example, n=4. The following solves the equation for a 4-bar linkage:

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, n=6. The following solves the equation for a 6-bar linkage:

$$N_6 = \frac{6(6-1)}{2} = \frac{30}{2} = 15$$

This example shows that there are 15 total instantaneous velocity centers for a 6-bar linkage. These systems are disclosed in more detail in U.S. patent application Ser. No. 15/925,165, which is hereby incorporated herein by reference in its entirety. The various devices, systems, aspects, embodiments, and methods disclosed in U.S. patent application Ser. No. 15/925,165 may be incorporated with the various disclosures of this application and/or may utilize the various disclosures of this application in combination as is understood based on the disclosure herein.

Each of the above suspension linkage system embodiments can be applied to the embodiments of the various systems discussed in more detail below.

Figure 1B:
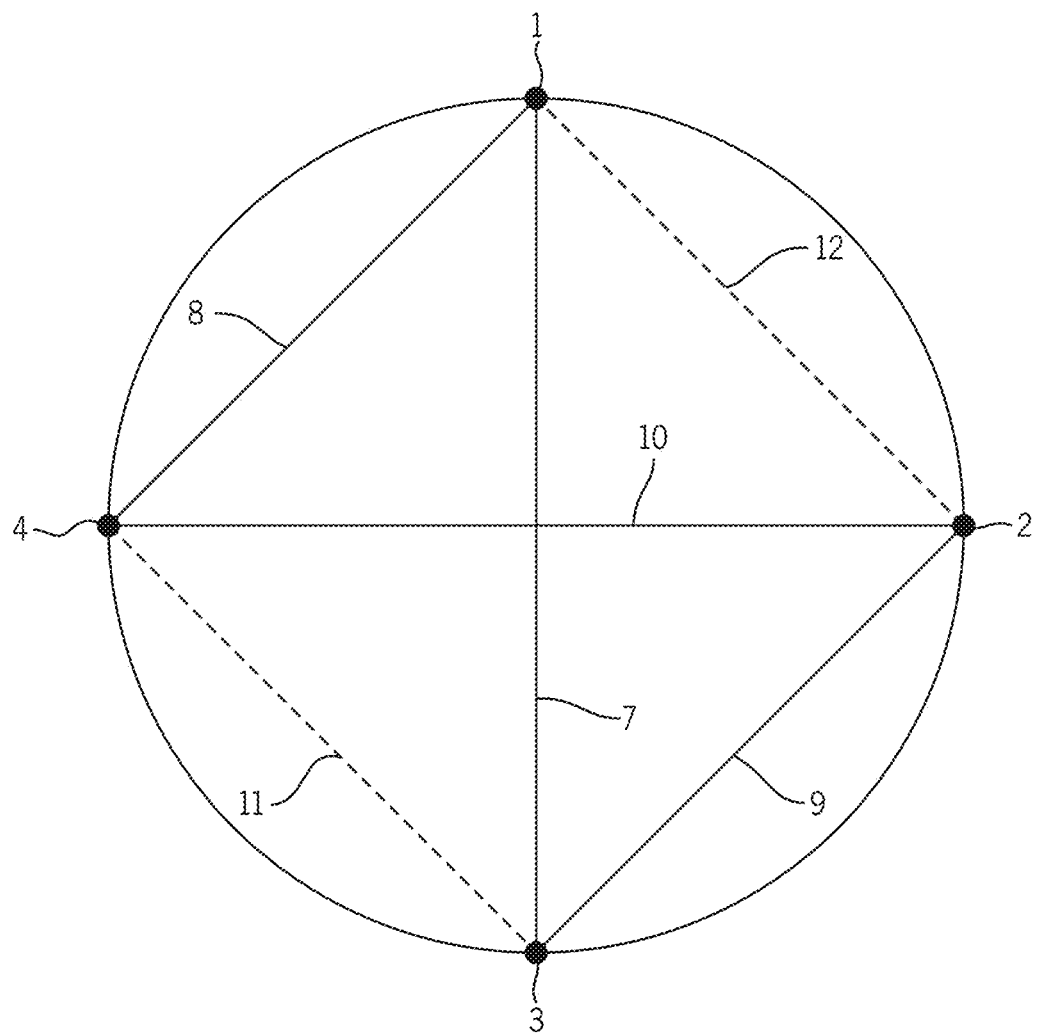
FIG. 1B is a schematic diagram representing the relationships between the various parts and IVCs of the suspension system of FIG. 1A.
Figure 1C:
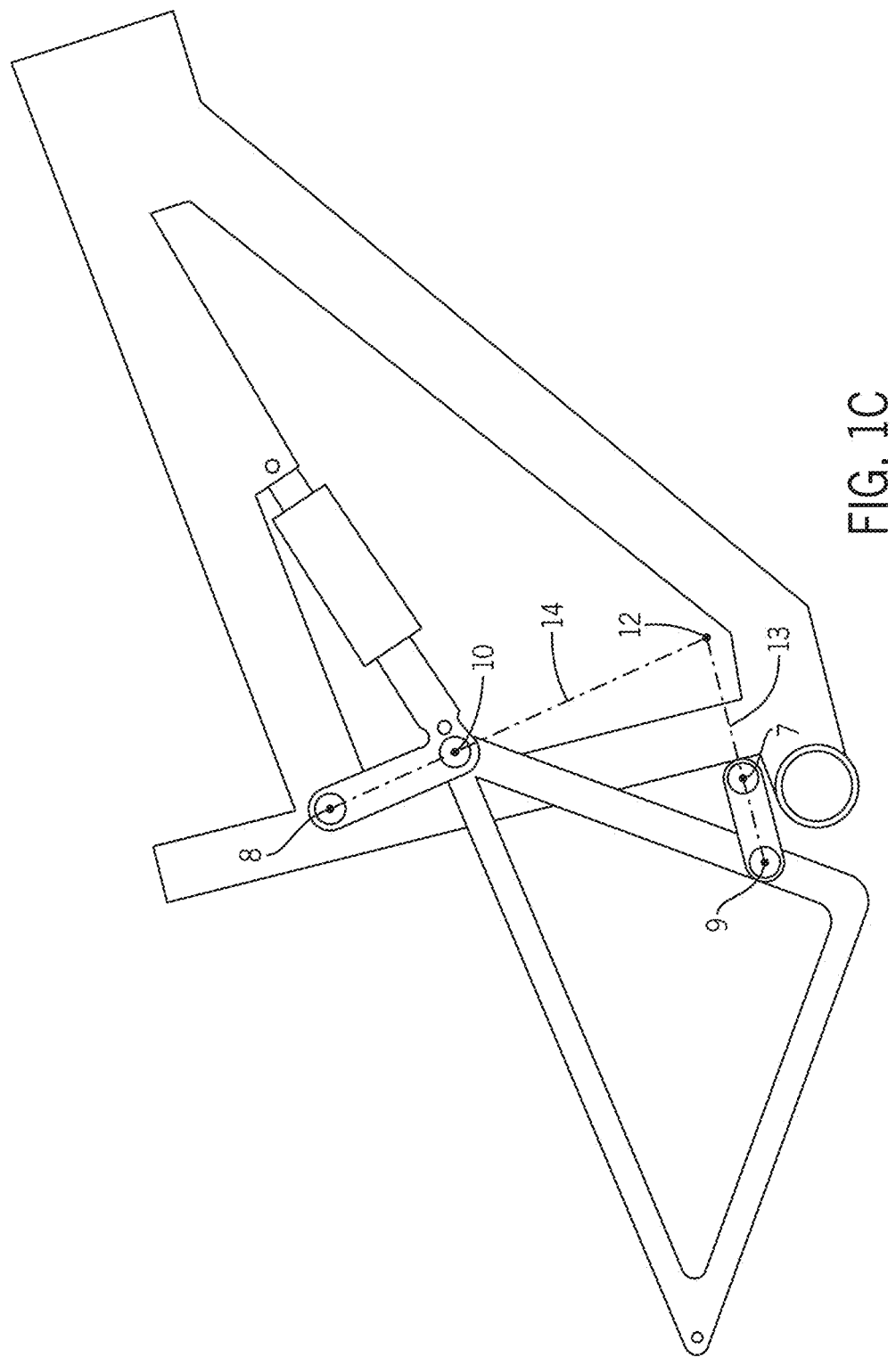
FIG. 1C shows a visual representation of a method of solving for an IVC.

Turning now to the figures, FIGS. 1A-C represent a conventional 4-bar linkage system and provide an example of an application of the analysis system discussed above. The 4-bar linkage is presented herein as an example of a suspension system that can be used with the present disclosure; however, other linkage suspension systems are contemplated. FIG. 1A shows a 4-bar linkage bicycle suspension system in the extended state. In this example, and as used herein generally, a suspended body is the frame portion of the vehicle that is configured to directly support the weight of a rider on a suspension system. The suspended body may also be referred to as the front triangle herein, however, this is not meant to be limiting of the shape of the suspended body, but merely referential of the portion of the vehicle that is suspended or supports the weight of the rider. In the example shown, the suspension system includes a suspended body 1 and a rear triangle 2. The rear triangle 2 (e.g. chain stay and seat stay) is a dynamic body (DB) and is operatively coupled to a lower link 3 and an upper link 4. Both the lower link 3 and the upper link 4 are operatively coupled to the suspended body 1. The suspension system includes a driven wheel axis 5 and a shock or damper 6. A shock or damper is a mechanical device that provides resistance between to attachment points with relative motion. The motion may be linear or non-linear. The resistance force is commonly potential energy in a mechanical device, for example, in the form of a coil spring or an air spring. Often a damper mechanism is paired with the coil or air spring to control vibrational energy of the spring force in compression or rebound. As mentioned previously, there are six IVCs in a 4-bar linkage. Four of the six WCs are shown in FIG. 1A: SIVC[1][3] 7, SIVC[1][4] 8, IVC[2][3] 9, and IVC[2][4] 10.

FIG. 1B is a schematic diagram representing the relationships between the various parts and IVCs of the suspension system of FIG. 1A. The schematic diagram operates as a simplified representation of the system useful for clarity. The suspended body 1, rear triangle 2, lower link 3, and upper link 4 are represented by points along the circumference of the analytical schematic. Lines represent the six IVCs linking each part of the suspension system. Solid lines show the four IVCs, SIVC[1][3] 7, SIVC[1][4] 8, IVC[2][3] 9, IVC[2][4] 10, depicted in FIG. 1A, while the dashed lines represent the two IVCs, IVC[3][4] 11 and DIVC[1][2] 12, not shown in FIG. 1A.

As shown by the solid lines in FIG. 1B, only the lower link 3 and the upper link 4 are operatively coupled to suspended body 1, lower link 3 is operatively coupled to rear triangle 2, and upper link 4 is operatively coupled to rear triangle 2. Any change in the linkage layout greatly affects the IVC migrations as their dependencies are also changed.

The dashed lines in FIG. 1B, IVC[3][4] 11 and DIVC[1][2] 12 are derived through graphical analysis. For example, two different triangles including IVC[1][2] 12 may be used to solve for IVC[1][2] 12. In this example, DIVC[1][2] 12 may be derived using known SIVC[1][4] 8 and IVC[2][4] 10 (which form a triangle with DIVC[1][2] 12) and known SIVC[1][3] 7 and IVC[2][3] 9 (which form a separate triangle with DIVC[1][2] 12).

FIG. 1C shows a visual representation of a method of solving for IVC[1][2] 12. In this example, a first dashed line 13 is extended through IVC[1][3] 7 and IVC[2][3] 9. A second dashed line 14 is extended through IVC[1][4] 8 and IVC[2][4] 10. The first and second dashed lines 13, 14 intersect at DIVC[1][2] 12. It is contemplated that this same method may be used to determine all IVCs of a linkage system. IVC migration paths may then be drawn that connect all IVC locations from the extended to the compressed suspension states.

In accordance with various embodiments, the suspension system can include a suspension setup having more than four links. While some of the concepts discussed herein might be accomplished with four links, in several embodiments, six links may be used. It is also contemplated that more or fewer links can be used to accomplish the various concepts as discussed herein.

Figure 2A:
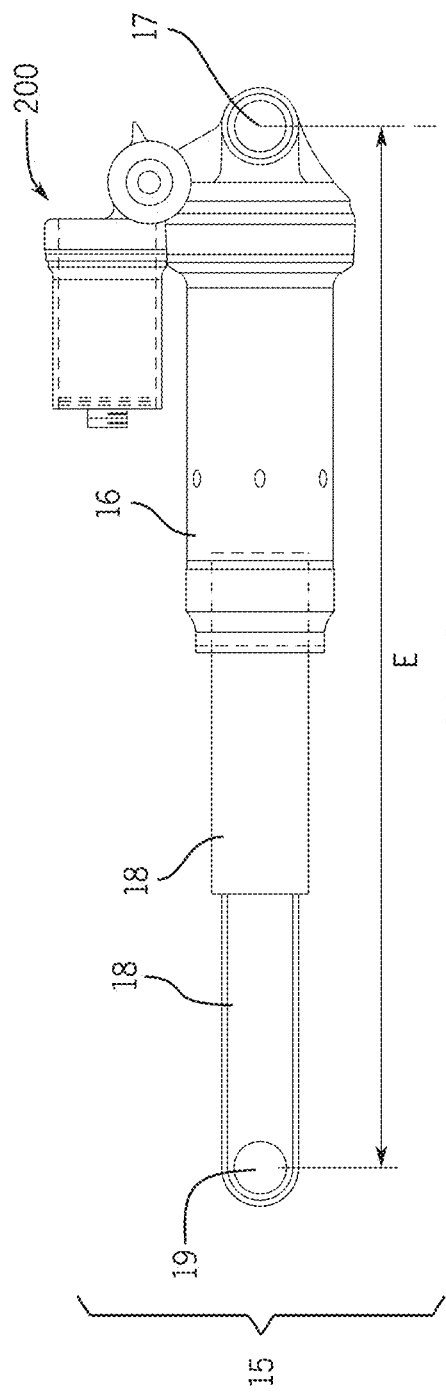
FIG. 2A-B shows an example of a shock or damper for a suspension system in both extended and compressed states.
Figure 2B:
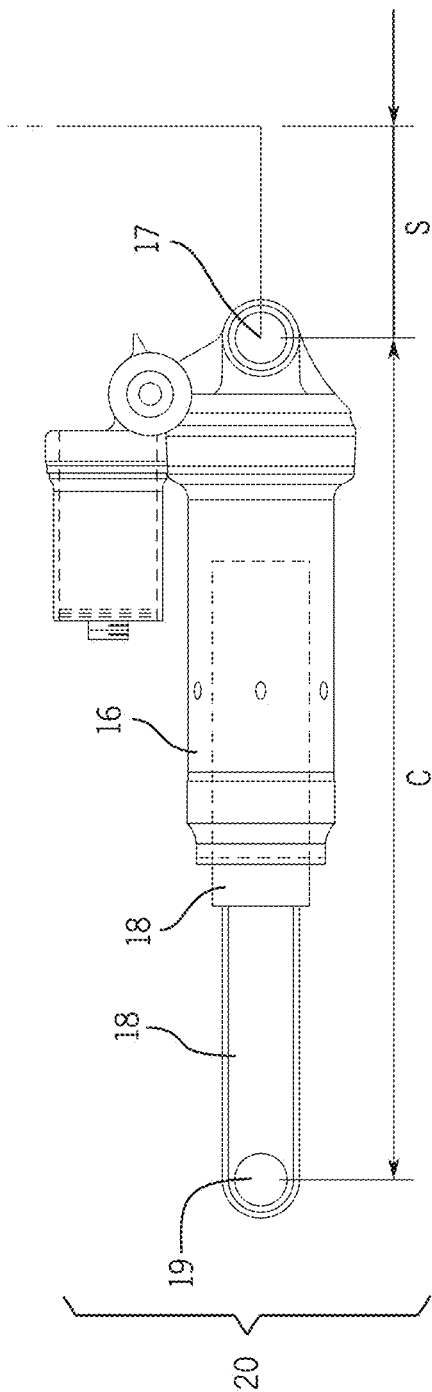

In several embodiments, a shock or damper is disclosed for a suspension system. As used herein, the terms shock and damper are interchangeable. FIGS. 2A-2B shows an example of a shock or damper 200 for a suspension system in an extended state 15 (FIG. 2A) and in a compressed state 20 (FIG. 2B). The shock 200 may include a shock body 16, a shock shaft 18, and two or more shock axes 17, 19, which may generally define a connection location for attachment to the bike frames as discussed herein in more detail. The first end of the shock shaft 18 may include a shock shaft axis 19 and the second end may include a shock body axis 17. The shock may be any shock suitable for use with a suspended two wheel vehicle (e.g. bicycle, motorcycle, etc.) Generally, the shock shaft 18 is movable within the shock body 16 forming the shock 200 with the shock body axis 17 and the shock shaft axis 19 at either end of the shock 200. However, other configurations may be suitable as well. For example, any structure suitable to provide some resistance between a change in distance between axis 17 and 19 is envisioned herein. A shock envelope may be defined by the shock body 16 and the shock shaft 18. An effective length of the shock is defined as the distance between the two shock axes 17 and 19. As shown, the effective shock length of the shock 200 in the extended state E is greater than the effective shock length of the shock 200 in the compressed state C. A shock stroke S may be calculated as the difference between the effective shock length in the extended state E and the effective shock length in the compressed state C. A shock ratio R may also be calculated as the ratio between the effective shock length in the extended state E and the shock stroke S. The following equations can be used:

$$S = E - C$$
$$R = \frac{E}{(E-C)} = \frac{E}{S}$$

Figure 3A:
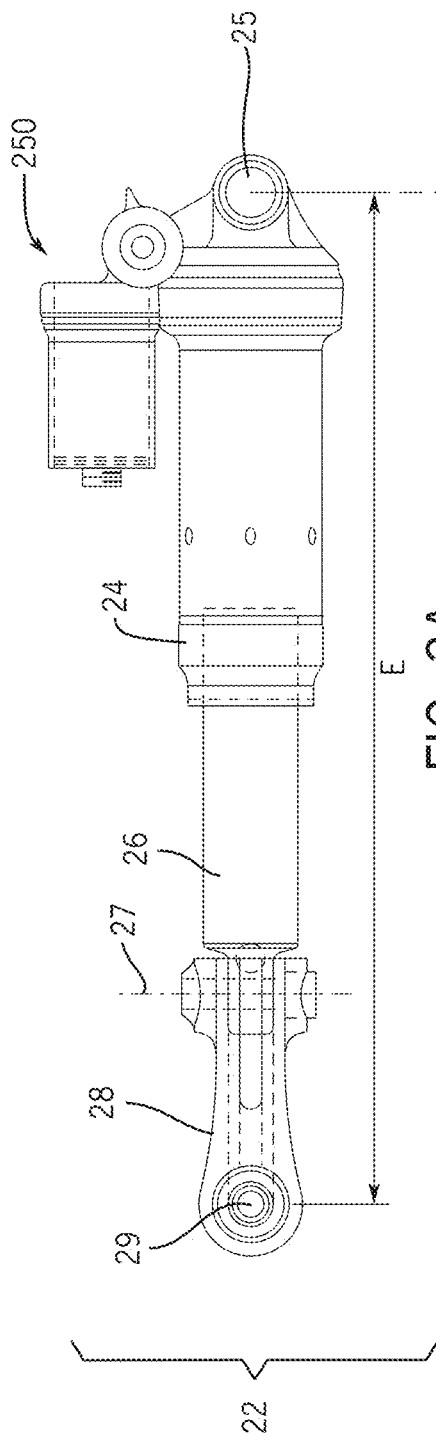
FIG. 3A-B shows another example of a shock or damper for a suspension system in both extended and compressed states.
Figure 3B:
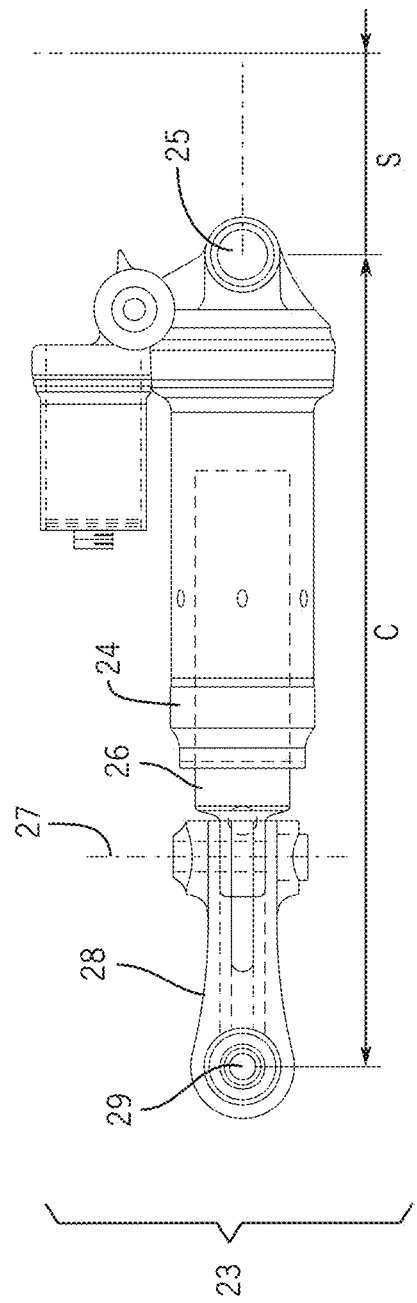

In various embodiments, a shock/damper may also include an extension body 28. The extension body may be a structure suitable to extend the length of the shock/damper or change the orientation of the axis of one end of the shock/damper. FIGS. 3A-3B shows an example of a shock 250 for a suspension system in an extended state 22 (FIG. 3A) and a compressed state 23 (FIG. 3B). The shock 250 may include a shock body 24, a shock shaft 26, an extension body 28, and three or more shock axes 25, 27, 29. The shock/dampener 250 may include shocks discussed above with regard to shock 200 and the various components of the shock itself may correspondence with the difference that shock/dampener 250 includes an assembly having the extension body 28. The shock body 24 may include a shock body axis 25 and the shock shaft 26 may include a shock shaft axis 27. The extension body 28 forms an elongated body and may include an extension body axis 29 at one end and the extension body axis 27 at the other end. In accordance with various embodiments, the shock shaft axis and the extension body axis are coaxial forming a joint at the connection between the extension body 28 and the shock. As shown in FIGS. 3A-3B, the shock 250 having the extension 28, has the shock body axis 25 at one end and the extension body axis 29 at an opposing end. However, it is contemplated that the components of the shock 250 may be in other configurations. For example, the extension body 28 may be coupled to the shock body axis 25 instead or in addition to being coupled to the shock shaft axis 27.

In the depicted embodiment in FIGS. 3A-3B, an effective shock envelope may be defined by the shock body 24, shock shaft 26, and extension body 28. In this embodiment, an effective length of the shock 250 is defined as the distance between the shock body axis 25 and the extension body axis 29. As shown, the effective shock length of the shock 250 in the extended state E is greater than the effective shock length of the shock 250 in the compressed state C. A shock stroke S may be calculated as the difference between the effective shock length in the extended state E and the effective shock length in the compressed state C. A shock ratio R may also be calculated as the ratio between the effective shock length in the extended state E and the shock stroke S. The following equations, as mentioned previously, can be used:

$$S = E - C$$
$$R = \frac{E}{(E-C)} = \frac{E}{S}$$

It is common for stock shocks or dampers offered for sale to have a shock ratio R of less than 4.25. As described herein, the shock or damper of the disclosed suspension system may include a shock ratio that is greater or equal to 4.25. A greater shock ratio may result in a more linear suspension leverage rate which is desirable for both suspension feel and ease of shock tuning. It also may allow for greater flexibility in positioning the shock or damper to clear items such as a water bottle. These are discussed in detail below. In other embodiments, the suspension system may include a shock ratio that is greater or equal to 4.5. In other embodiments, the suspension system may include a shock ratio that is greater or equal to 4.75. In other embodiments, the suspension system may include a shock ratio that is greater or equal to 5.0. In various embodiments, it is preferred that the shock ratio is between 4.25 and 5.0.

Figure 4A:
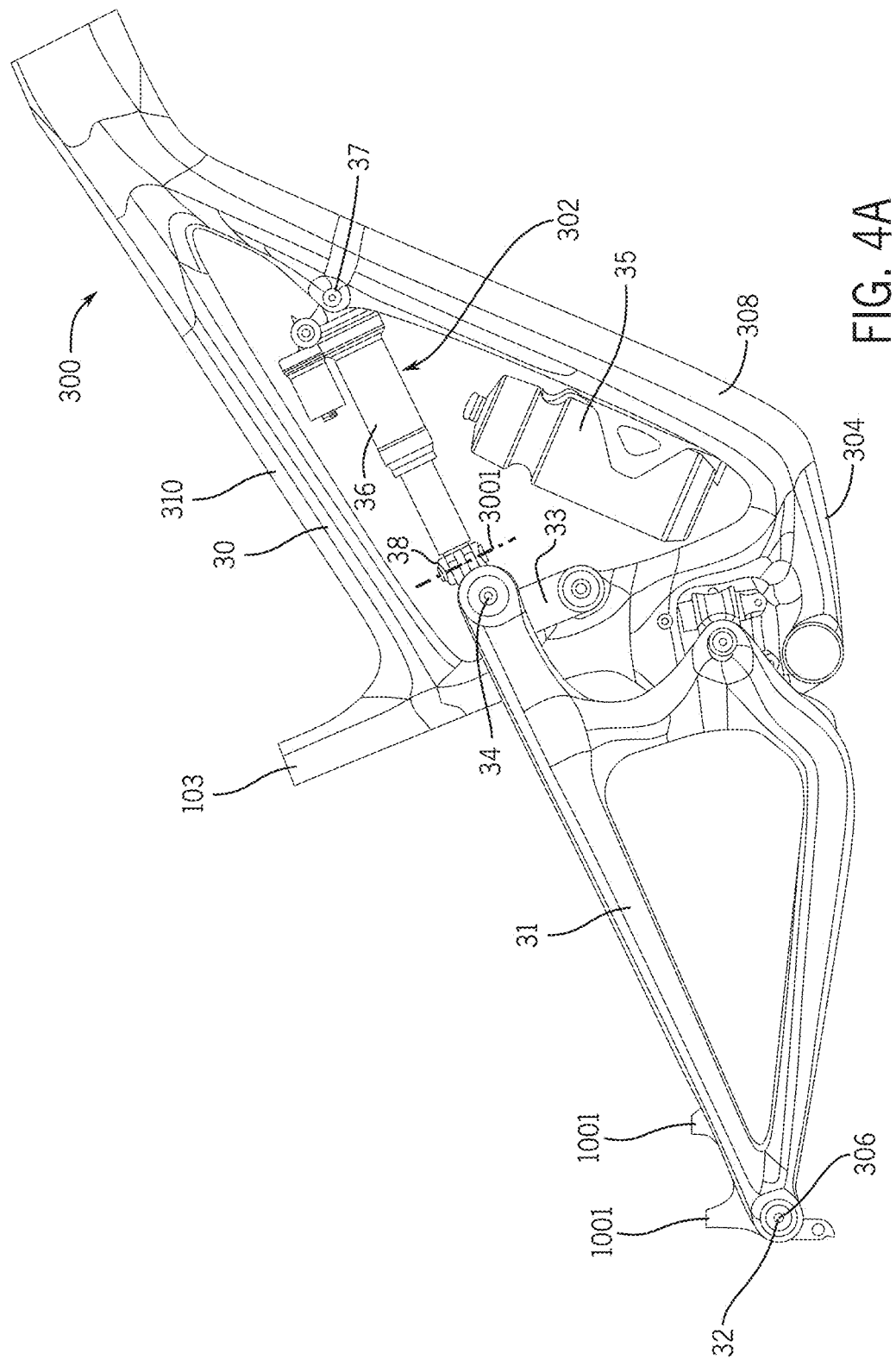
FIG. 4A shows one embodiment of a suspension linkage assembly with a shock or damper in an extended state.

In several embodiments, a shock may be included in a suspension system. FIGS. 4A-N show one embodiment of a suspension linkage assembly 300 with a shock 302 coupled to a front portion of a suspension frame 304. FIG. 4A shows the suspension linkage assembly 300 with a shock or damper 302 in an extended state. The suspension frame 304 may include a front triangle body 30, a swingarm body 31, and a link body 33. Swingarm body 31 is also a DB. Swingarm body includes disc brake caliper mounts 1001. In this embodiment, the DB is both a wheel and brake carrier body. In other similar embodiments, the swingarm DB can be a wheel carrier only, or a brake carrier only. The suspension linkage assembly 300 can include a suspension frame 304, a seat tube 103, a driven wheel axis 306, IVC[31][33] 34, shock 302, and effective shock axis 37. Non-effective shock axis 3001 is shown in the extended state. The front triangle body 30 may be defined by the seat tube 103, a top-tube 310, and a down-tube 308. The shock 302 may include a shock body 36 and an extension body 38. In another various embodiment, the shock 302 may be direct mounted (e.g. without the extension body 38). The suspension linkage assembly 300 may also include a water bottle holder for holding a water bottle 35, which, in the depicted embodiment, may be positioned within the front triangle 30 below the shock 302. In the depicted embodiment, the swingarm body 31 is a DB, the driven wheel axis 306 is in an extended state 32, IVC[31][33] 34 is in the extended state, and the shock body 36 and extension body 38 combined define the effective shock envelope.

Depending on the embodiment, one or more shock axes on a shock may be operatively coupled to a suspension frame, such as, for example, to a linkage member, a front triangle, a rear triangle, or the like. For example, the shock 302 may be coupled to the suspension frame 304 between the front triangle body 30 and the swingarm body 31. The shock body 36 may be connected, either directly or indirectly, to the front triangle body 30. The extension body 38 may be connected, either directly or indirectly, to the swingarm body 31. In the various embodiments, the shock 302 may be coupled to the down-tube 308 of the front triangle body 30. The shock axes that couple to the suspension frame are considered effective shock axes, while the shock axes that are not directly coupled to the suspension frame are considered non-effective shock axes. As shown in the present embodiment, the effective shock axis 37 is operatively coupled to a down-tube 308 of the front triangle body 30. With reference to FIGS. 2 and 3, the shock body axis 17 and the shock shaft axis 19 of the shock 200, and the shock body axis 25 and the extension body axis 29 of the shock 250, may also be effective shock axes when coupled to a suspension frame, while the shock shaft axis 27 of the shock 250 may be considered a non-effective shock axis.

In various embodiments, the shock body 36 and the extension body 38 are coupled to the suspension linkage assembly 300, the shock body 36 and the extension body 38 are constrained in a rigid, non-rotating connection with one another. For example, the extension body axis 29 can be positioned non-parallel to shock shaft axis 27. The angle between shaft axis 27 and extension body axis 29 may be perpendicular or at an angle in other embodiments. This results in a rigid, non-rotating connection between the extension body 38 and the shock body 36.

Figure 4B:
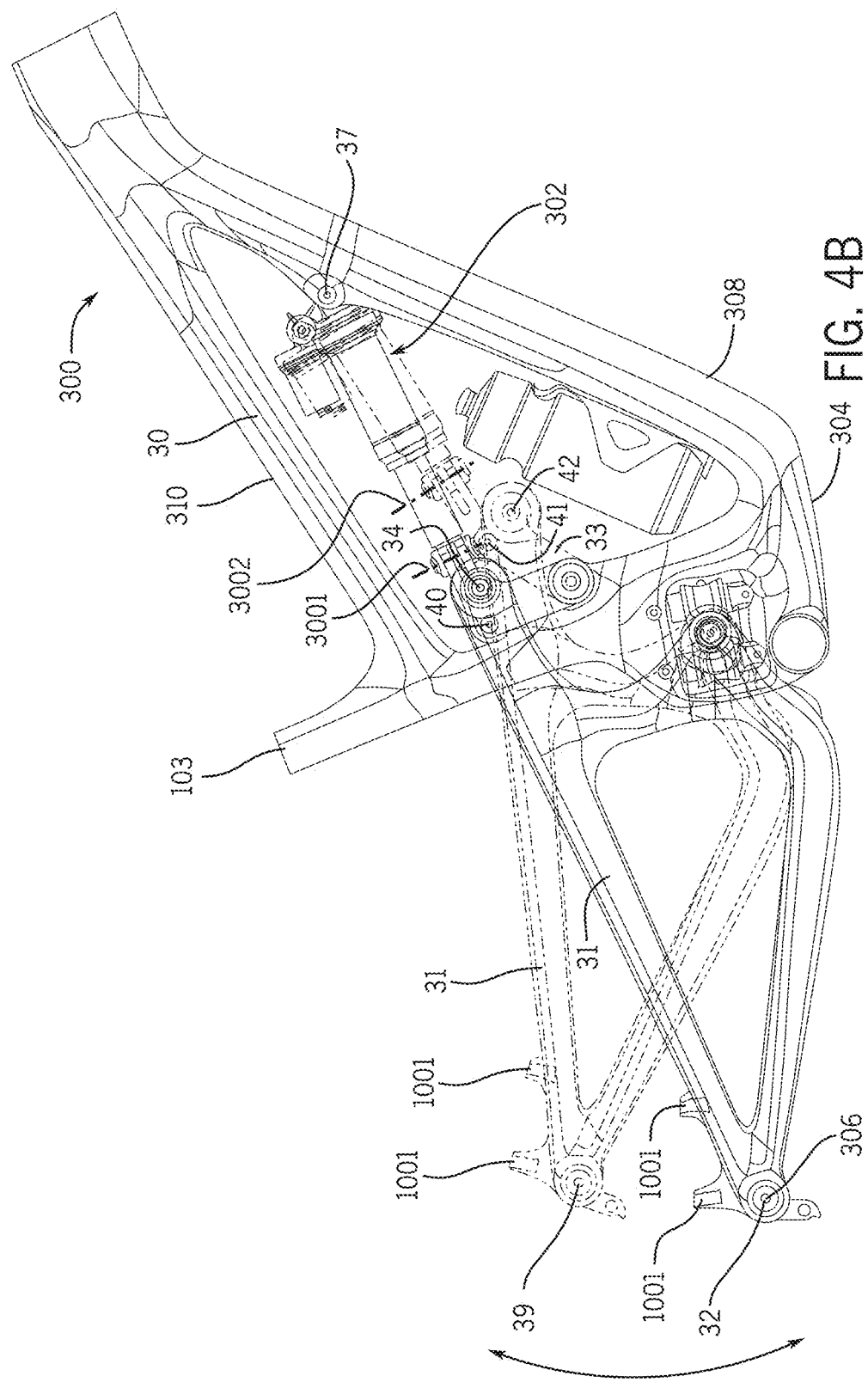
FIG. 4B shows the suspension linkage assembly of FIG. 4A with the axis of the driven wheel axis in both extended and compressed states.

FIG. 4B shows the suspension linkage assembly 300 of FIG. 4A with the axis of the driven wheel axis 306 in the extended state 32 and a compressed state 39. As shown, the suspension linkage assembly 300 includes the same or similar features depicted in FIG. 4A, and further shows IVC[31][33] 42 in the compressed state with effective shock axes 40 and 41 and non-effective shock axis 3002. The effective shock axis 40 is the location where the shock extension body 38 is operatively coupled to the link body 33 in the extended state, and the effective shock axis 41 is the location where the shock extension body 38 is operatively coupled to the link body 33 in the compressed state. As shown in FIG. 4B, as the shock 302 transitions between the extended state with the effective shock axis 40 and the compressed state with the effective shock axis 41, the angle of the shock 302 relative to the suspension frame 304 changes. In the depicted example, as the system moves from the extended state to the compressed state, the angle of the shock 302 relative to the suspension frame 304 decreases. In this example, the angle of the shock 302 relative to the down-tube 308 decreases.

FIGS. 4C-4E show various views depicting attachments of the shock or damper 302 with the suspension linkage assembly 300 of FIG. 4A in the extended state. FIG. 4C illustrates an example with the swingarm body 31 removed, showing the effective shock axis 40 where the shock extension body 38 is operatively coupled to the link body 33 in the extended state. Both of the effective shock axes 37 and 40 may be positioned in front of the seat tube 103 while both axes are virtually extended axially in both directions. Also, non-effective shock axis 3001 in the extended state may be located in front of IVC[31][33] 34. FIG. 4D shows an example of the swingarm body 31 coupled to the link body 33 and shock 302. Swingarm body 31 includes disc brake caliper mounts 1001. FIG. 4E shows a cross section taken at the dashed line shown in FIG. 4D, along the link body 33. In various embodiments, the extension body 38 may include bearings and/or bushings. Additionally, or alternatively, the link body 33 may include the bearings and/or bushings instead in order to limit friction between the link body 33 and the extension body 38. In other embodiments, there may be direct engagement (e.g., no bearings and/or bushings) at the pivotal connection between the extension body 38 and the link body 33 to minimize weight and complexity.

FIGS. 4F-4H also show various views of the damper 302 with the suspension linkage assembly 300 of FIG. 4A in the extended state. In this manner, the extension body 38 is indirectly coupled to the swingarm body 31 via link body 33. FIG. 4G illustrates the swingarm body 31 coupled to the link body 33 and shock 302. FIG. 4H illustrates a cross section taken at the dashed line in FIG. 4G. The cross section is at IVC[31][33] shown as element 34. The non-effective shock axis 3001, in the extended state, may be located in front of IVC[31][33] 34. In this example, link body 33 is positioned within swingarm body 31, and a portion of the shock envelope is positioned within the link body 33. Swingarm body includes disc brake caliper mounts 1001. Positioning in this manner may allow the swingarm to be narrower and therefore less likely to interfere with the body of the rider. It also may allow larger shocks or dampers to fit within the assembly without interfering with the linkage.

Figure 4J:
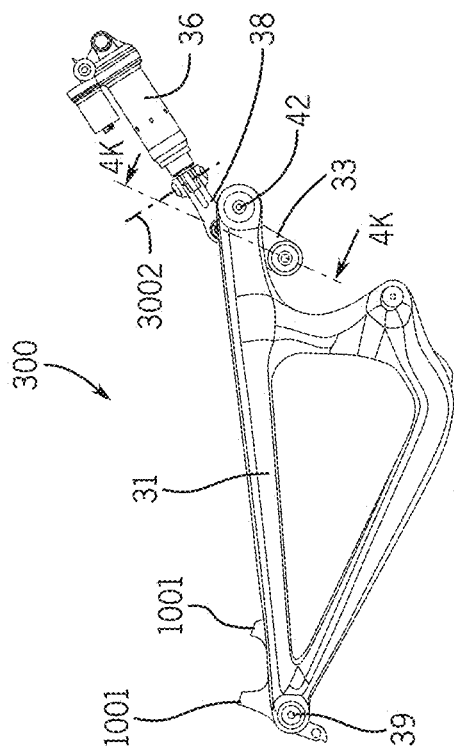
FIG. 4I-K shows various views depicting different attachments of the shock or damper with the suspension linkage assembly of FIG. 4A in the compressed state.
Figure 4K:
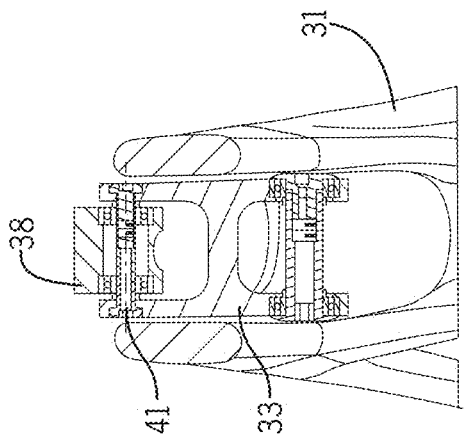
Figure 4I:
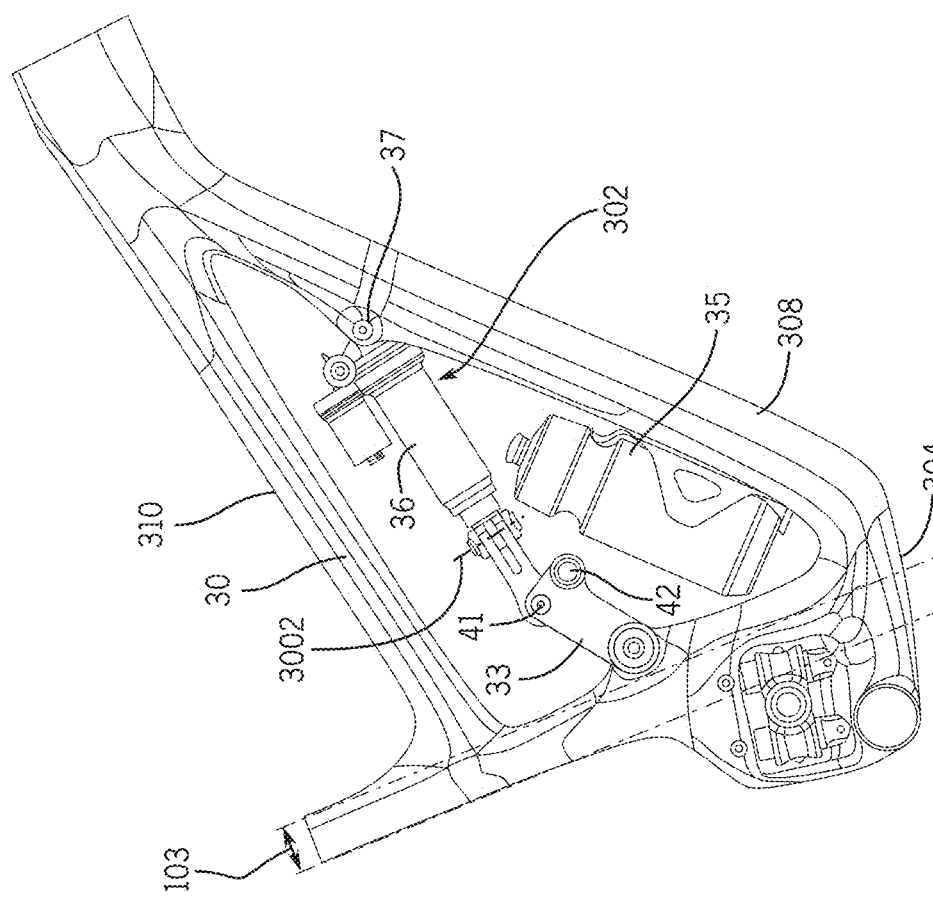

FIGS. 4I-K show various views of the shock or damper 302 with the suspension linkage assembly 300 of FIG. 4A in the compressed state. FIG. 4I illustrates an example with the swingarm body 31 removed, showing the suspension extension body 38 operatively coupled to the link body 33 in the compressed state. In this manner, the extension body 38 is indirectly coupled to the swingarm body 31. The swingarm body 31 includes disc brake caliper mounts 1001. In this example, the axis of the driven wheel is at compressed state 39 and IVC[31][33] shown as element 42 is also in the compressed state. FIG. 4J shows the swingarm body 31 coupled to the link body 33 and shock 302, but for the sake of clarity excludes the swingarm attachment. FIG. 4K shows a cross section taken at the dashed line in the top view along the link body 33.

FIGS. 4L-4N shows various views depicting different attachments of the shock or damper 302 with the suspension linkage assembly 300 of FIG. 4A in the compressed state. FIG. 4L illustrates the swingarm body 31 removed, showing the extension body 38 operatively coupled to the link body 33 in the compressed state. In this example, the axis of the driven wheel is in compressed state 39 and IVC[31][33] 42 is also in the compressed state. FIG. 4M shows the swingarm body 31 coupled to the link body 33 and shock 302. The swingarm body 31 includes disc brake caliper mounts 1001. FIG. 4N shows a cross section taken at the dashed line in the top view, between IVC[31][33] 42 and the link body 33. In this example, the link body 33 is positioned within swingarm body 31, and a portion of the shock envelope is positioned within link body 33. Positioning in this manner allows the swingarm 31 to be narrower and therefore less likely to interfere with the body of the rider. It also may allow larger shocks or dampers to fit within the assembly without interfering with the linkage.

Figure 4P:
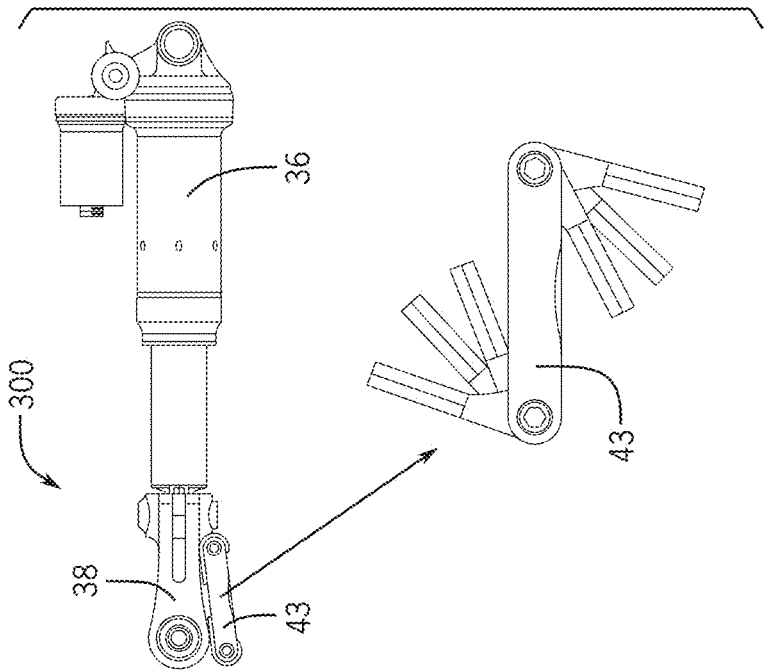
FIGS. 4O-P shows the suspension linkage assembly of FIG. 4A with an accessory tool.
Figure 4O:
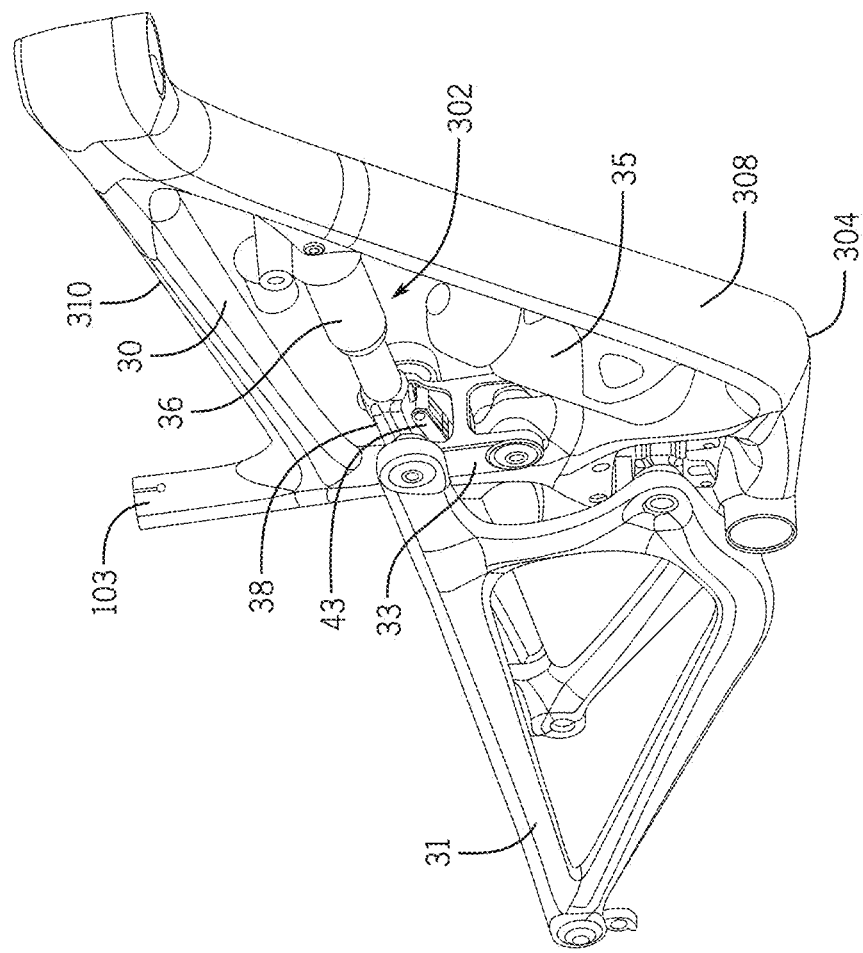

In one embodiment, the suspension linkage assembly 300 may include an accessory 43, as shown in FIGS. 4O-4P. The accessory 43 may be a tool, an inflation device (e.g., a device for inflating a tube or tire), a $CO_2$ cartridge, a $CO_2$ inflator valve, a spare part for the vehicle or suspension system, and the like. The accessory 43 may be any conventional tool for adjusting the various bicycle components, such as, for example, a screw driver, wrench, pliers, cutters, pick, and the like. The accessory tool 43 depicted in FIG. 4P is a foldable wrench set, having a plurality of adjustment arms. The accessory tool 43 may be coupled to the extension body 38. As shown in FIGS. 4O-P, the accessory tool 43 is coupled to a lower surface of the extension body 38. It is contemplated, in other embodiments, that the accessory tool 43 may be coupled anywhere on the extension body 38.

The disclosed suspension linkages, as shown in FIGS. 4A-P, effectively moves the front of the shock 302 further forward (in the direction away from the seat tube 103) within the suspended body 30 than in more traditional designs, which may provide for various advantages. As one example, the assembly associated with the front triangle body 30, the link body 33, and the effective shock envelope can accommodate a narrower design, which often poses a challenge with various traditional shock or damper designs, which may have wide volume envelopes, preventing a narrow design. The more rearward positioned shocks often require the link body and the swingarm body to have greater width to ensure clearance between the shock and the link body. As another example, the more forward positioned shock 302 may allow for greater shock capability. Since there is more room for a shock in front of the link body 33, there is less often interference. And in yet another example, shorter shock support tabs on the suspension frame 304 (e.g., extending from the top tube or down tube) can be provided, with the front of the shock 302 further forward. This arrangement may produce a lighter, yet stronger, interface. Additionally, or alternatively, linear and progressive leverage ratios can be provided. As a further example, the shock 302 may have small rotation between the extended and compressed states, which, when combined with a forward shock position, may allow more room within the suspended body 30. Additional room within the suspended body 30 may, as one example, better fit a water bottle, which may be desirable for riders. The disclosed assembly provides for easier diassembly. In conventional systems, since the effective shock axis is operatively connected to a link body, it is difficult, if not impossible, to remove a shock without disassembling any hardware operatively connecting a swingarm body to the link body. In the disclosed system, the shock 302 with the shock extension body 38 may be removed without disassembling the hardware operatively connecting the swingarm body 31 to the link body 33.

Figure 5A:
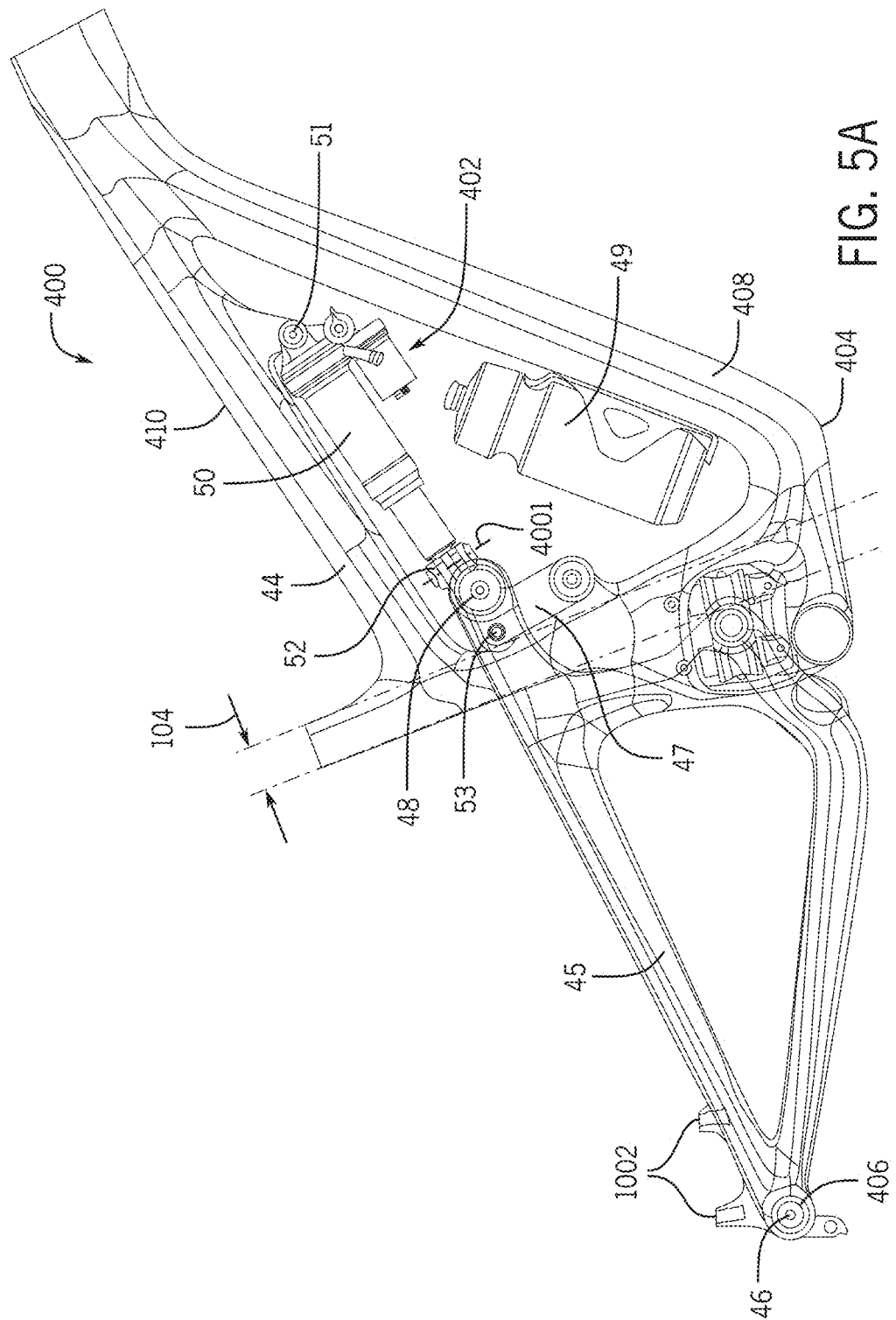
FIG. 5A shows another embodiment of a suspension system in the extended state.
Figure 5B:
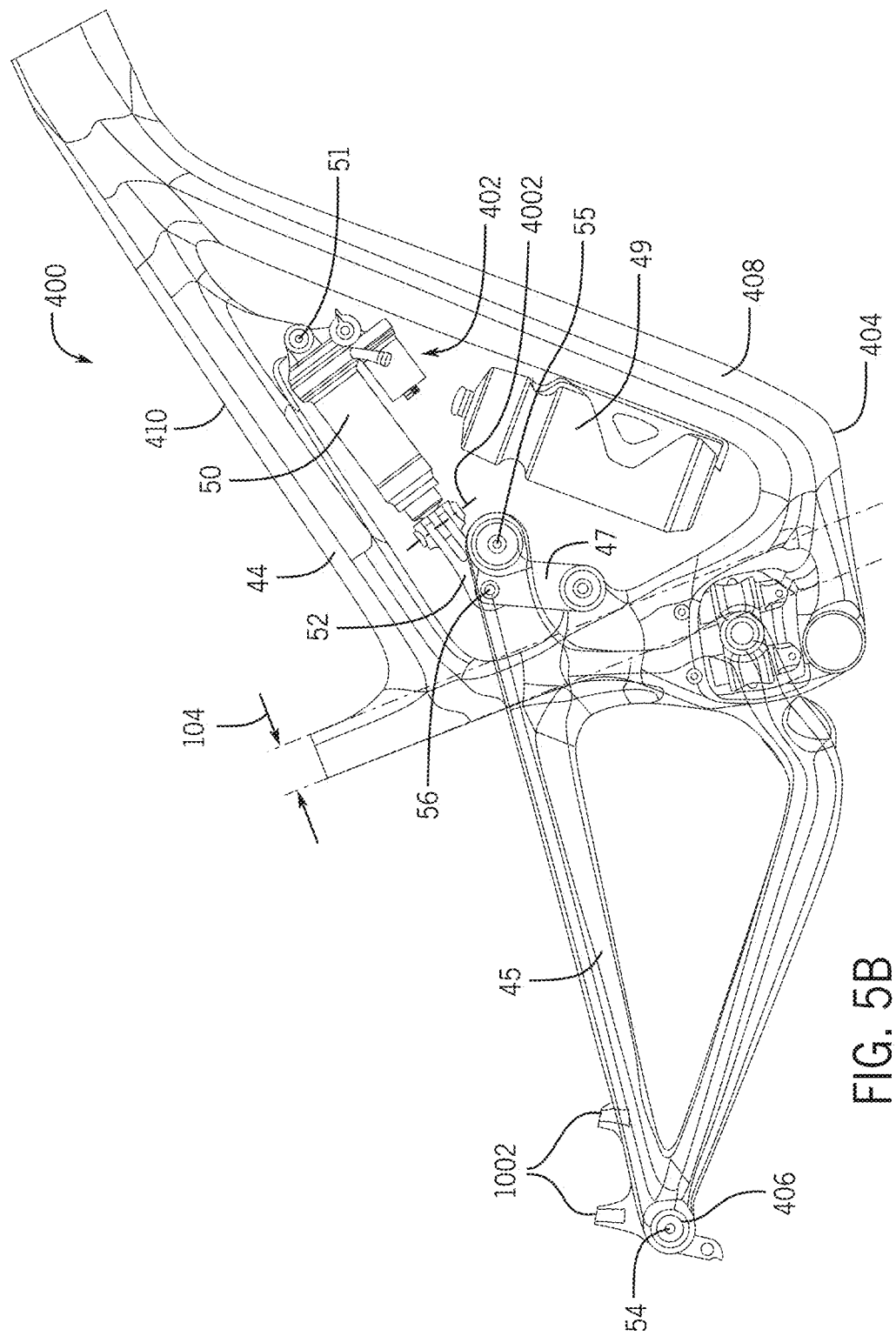
FIG. 5B shows the suspension system of FIG. 5A in the compressed state.

FIGS. 5A-B illustrate another embodiment of a suspension system 400 of the present disclosure with a shock 402 coupled to an upper portion of a suspension frame 404. FIG. 5A shows the suspension system 400 in the extended state. The system 400 components have structures that are similar to the structures of the components of the system 300 depicted in FIGS. 4A-P. With reference to FIG. 5A, the suspension system 400 includes a suspension frame 404, a driven wheel axis 406, IVC[45][47], a shock or damper 402, and effective shock or damper axes 51, 53. The non-effective shock or damper axis 4001 is shown in the extended state. The suspension frame 404 may include a front triangle body 44, a swingarm body 45, and a link body 47. Swingarm body 45 is also a DB. Swingarm body includes disc brake caliper mounts 1002. In this embodiment, the DB is both a wheel and a brake carrier body. In other similar embodiments, the swingarm DB can be a wheel carrier only or a brake carrier only. The front triangle body 44 is defined by a seat tube 104, a top-tube 410, and a down-tube 408, which define a triangular opening. The shock 402 may include a shock body 50 and an extension body 52; however, in an alternate embodiment, the shock 402 may not include the extension body 52. The embodiment may also include a water bottle holder for holding a water bottle 49, which, in the depicted embodiment, may be positioned within the front triangle body 44 below the shock 402. In the depicted embodiment, the swingarm body 45 is a DB, the driven wheel axis 406 is in an extended state 46, IVC[45][47] is in an extended state 48, the effective shock axis is also in an extended state 53, and the shock body 50 and extension body 52 combined define the effective shock envelope. The non-effective shock or damper axis 4001 may be located in front of IVC[45][47] 48.

In this embodiment, the shock 402 may be operatively coupled to the top-tube 410 of the front triangle body 44. As shown in FIG. 5A, the effective shock axis 51 is operatively coupled to the top-tube 410. Similar to the embodiments discussed above, the bearings or bushings may be housed within the shock extension body 52. However, it is also contemplated that the bearings may seat within the link body 47 instead to limit friction between the link body 47 and the shock extension body 52. In other embodiments, bearings may be omitted at the pivotal connection between the extension body 52 and the link body 47 to minimize weight and complexity. Again, in this embodiment, the effective shock axes 51, 53 are located in front of the seat tube 104 if virtually extended in both directions axially.

FIG. 5B shows the suspension system 400 of FIG. 5A in the compressed state. As shown, the suspension system 400 includes the same or similar features depicted in FIG. 5A; however, the driven wheel axis 406 is in a compressed state 54, IVC[45][47] is in a compressed state 55, and the effective shock axis is also in a compressed state 56. The non-effective shock or damper axis 4002 is shown in the compressed state. As shown in FIGS. 5A-B, as the system 400 transitions between the extended and compressed states, the shock 402 moves relative to the suspension frame 404. The angle between the shock 402 and the top-tube 410 changes with the different states. As shown in the figures, the angle between the shock 402 and the top-tube 410 increases as the system 400 moves from the extended state, depicted in FIG. 5A, to the compressed state, depicted in FIG. 5B.

It is contemplated that the embodiment depicted in FIGS. 5A-B, in which the shock 402 is operatively coupled to the top-tube 410 of the front triangle body 44, has similar advantages to those discussed above with respect to the embodiment depicted in FIGS. 4A-N, in which the shock 302 is operatively connected to the down-tube 308 of the front triangle body 30.

A shock or damper extension for a suspension system of the present disclosure will now be discussed in more detail. In the embodiments depicted in FIGS. 3-5B, the shock extension 28, 38, 52 is shown with only one integral body. It is also contemplated, however, that the shock extension may be comprised of more than one body (i.e., a multi-body shock extension). For example, the extension may be comprised of two bodies. The two extension bodies may be pivotally coupled to one another on one side of the extension bodies and pivotally coupled to a shock body on the other side. The pivotal connection may include one or more bearings or bushings to reduce friction at the pivotal connection; however, in some embodiments, the pivotal connection may not include any bearings or bushings to minimize weight and complexity. When the shock including the shock body and the extension bodies is mounted to a suspension mechanism, the shock body and the extension bodies are constrained in a rigid non-rotating connection with one another. In one example, the extension body includes a first pivoting axis and a second pivoting axis (e.g. rear shock axis 59 and effective shock axis 62 respectively). These two axes may be offset with respect to one another (e.g. not parallel). In one example, these two axes are perpendicular to one another.

In the embodiment shown in FIGS. 6A-E, a shock extension 502 for a shock or damper 500 may be comprised of two bodies 60, 61. FIG. 6A shows a side elevation view of the shock 500, including the shock extension 502 with two bodies in the closed position. The shock 500 may include a shock body 57 with a front shock axis 58 and a rear shock axis 59. The extension 502 may include an upper extension body 60 and a lower extension body 61 pivotally coupled to the upper extension body 60 about an effective shock axis 62. In various embodiments, the extension 502 may be a separate component from the shock body 57. Alternatively, it is contemplated that the two components may be a single, integral component. As shown, the upper extension body 60 and lower extension body 61 are coupled to the shock body 57 by a fastener 67. The fastener 67 can be any attachment mechanism that suitably connects the extension bodies. For example, a bolt, machine screw, pin, or the like may be used. In various embodiments, the front shock axis 58 may extend substantially parallel to the effective shock axis 62. As indicated above, in various embodiments, the rear shock axis 59 may extend substantially perpendicular to the effective shock axis 62.

FIG. 6B shows cross section A-A shown through the effective shock axis 62 of FIG. 6A. As shown in the cross section, the upper extension body 60 may house a bearing or bushing 63 and the lower extension body 61 may house a bearing or bushing 64. The bearings 63 and 64 may be separated by a spacer 65.

The clamping force of the bolt 67 may create friction between the upper extension body 60, the lower extension body 61 and the shock body 57, which may inhibit the shock body 57 from rotating about the rear shock axis 59 relative to the upper extension body 60 and the lower extension body 61. When the shock 500 is coupled to a suspension linkage assembly via the front shock axis 58 and the effective shock axis 62, the shock 500 may be constrained such that the shock body 57 cannot rotate about the rear shock axis 59 relative to the upper extension body 60 and the lower extension body 61. This constraint may result from the non-parallel positioning of the rear shock axis 59 relative to the front shock axis 58 and the effective shock axis 62.

FIG. 6C shows a top plan view of the shock 500 of FIG. 6A with the shock extension bodies 60, 61 in the closed position. FIG. 6D shows cross section B-B shown through rear shock axis 59 of FIG. 6C where bolt 67 secures the upper extension body 60 and lower extension body 61 to the shock body 57. As shown, a spacer 66 may be positioned in-between the upper extension body 60 and the lower extension body 61 and may reduce the rear shock eyelet ID to receive the bolt 67; however, it is contemplated that spacer 66 may be omitted such that the size of the bolt 67 may be increased. The spacer 66 may be an extension of the shock body 57.

FIG. 6E shows a perspective view of the shock 500 of FIG. 6A with the shock extension bodies 60, 61 in the open position. In this example, the upper extension body 60 and the lower extension body 61 are rotated open about the effective shock axis 62 to receive the shock body 57. As shown, the upper extension body 60 and the lower extension body 61 are positioned adjacent to one another along the effective shock axis 62. As shown, the upper and lower extension bodies 60, 61 may each have an aperture defined within a free end of each extension body 60, 61. The end of the shock body 57, including the rear shock axis 59, may also define an aperture. As shown, the spacer 66 defines the aperture. Each aperture on the extension bodies 60, 61 and the spacer 66 may be aligned at the rear shock axis 59. When the extension bodies 60, 61 are in the closed position with the spacer 66 therebetween, the apertures may receive the bolt 67, coupling the extension bodies 60, 61 with the shock body 57.

Figure 7:
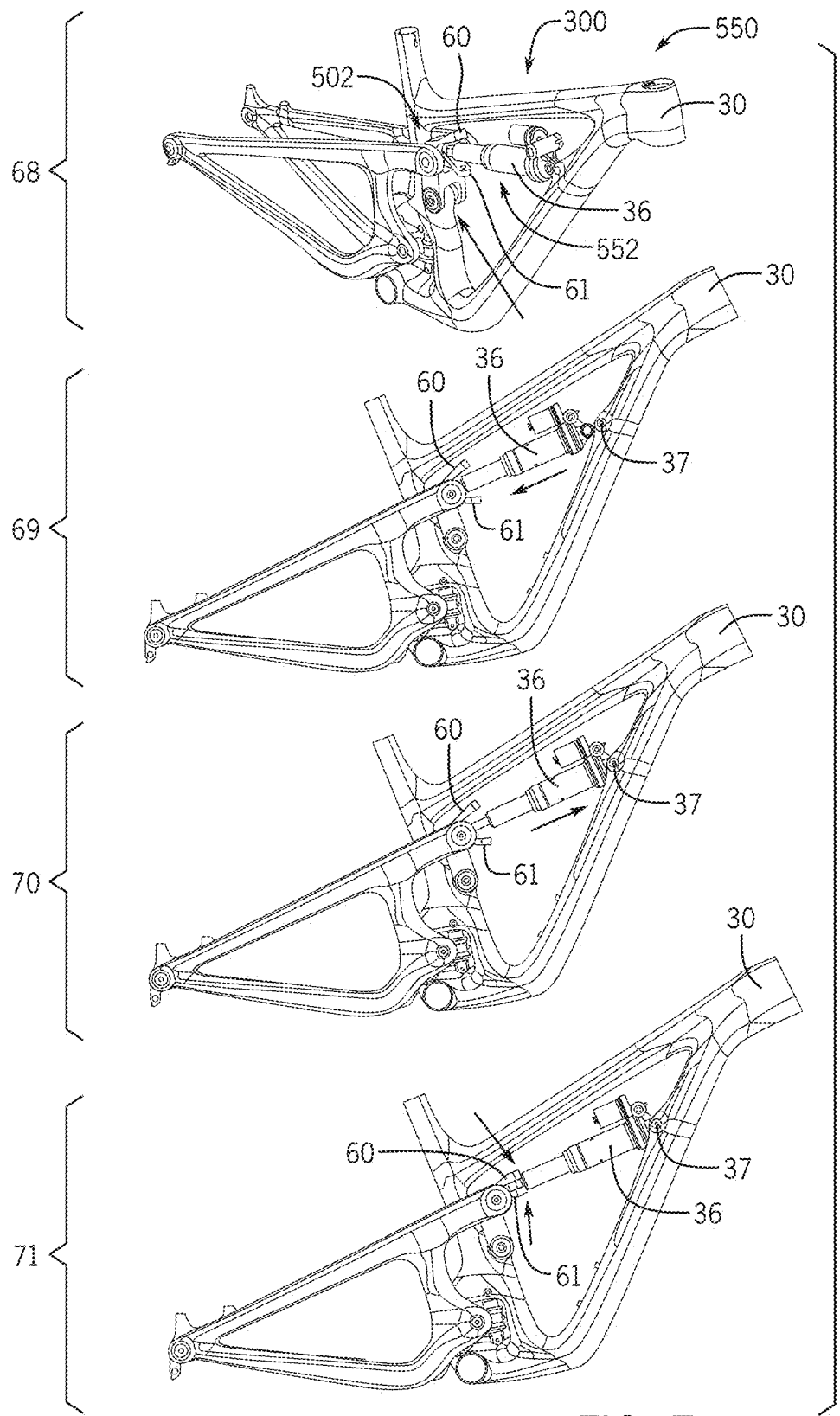
FIG. 7 shows an embodiment of a progression of assembly method steps, which are performed to install the multibody shock extension of FIG. 6A on the suspension linkage assembly of FIG. 4A.

The multi-body shock extension 502 may be assembled on a suspension linkage system in accordance with a variety of different methods. FIG. 7 shows one embodiment of an assembly method 550 to install the multi-body shock extension 502 of FIG. 6A on the suspension linkage assembly 300 of FIG. 4A. The method 550, as illustrated through the progression shown in FIG. 7 may begin with operation 68 and the upper extension body 60 and the lower extension body 61 may be positioned in the open position and pivotally mounted to the link body 33, with the shock body 36 positioned inside of the front triangle body 30. In this example, the multi-body shock extension 502 and the shock body 36 may form a shock 552. After operation 68, the method 550 may proceed to operation 69 and the shock body 36 may be positioned behind the effective shock axis 37.

After operation 69, the method 550 may proceed to operation 70 and the shock body 36 may be inserted into the shock or damper tabs of the front triangle 30. After operation 70, the method 550 may proceed to operation 71 and the shock extension bodies 60, 61 may be rotated into the closed position and fastened to the shock body 36, such as by bolting or other conventional fastening means.

As shown in the progression of FIG. 7, the multi-body shock extension 502 may facilitate installation of the shock 552 in the suspension linkage assembly 300 since the shock extension bodies 60, 61 can rotate open to provide more room for the shock 552 to be installed inside the front triangle body 30 or other linkage body. If the shock extension bodies 60, 61 were in the closed position, it may be difficult to maneuver the shock body 36 inside of the front triangle 30. The multi-body shock extension thus prevents the user from having to disassemble the parts of the suspension linkage assembly 300 to install the shock 552, which may be desirable. Because the front triangle does not require a large internal triangle for positioning the shock during installation, the multi-body shock extension may also allow for the suspension frame's stand over height (i.e., the distance from the ground to the top of the suspension frame) to be minimized. In addition, a multi-body shock extension may also allow for simpler manufacturing of the individual body parts of the shock extension.

FIG. 8A shows a side elevation view of a shock or damper 600, including a shock extension 602 with two bodies in the closed position. The shock 600 may include a shock body 72 with a front shock axis 73 and a rear shock axis 74. The extension 602 may include an upper extension body 75 and a lower extension body 76 pivotally coupled to the upper body extension 75 about an effective shock axis 77. The upper extension body 75 may be positioned above the lower extension body 76. In the depicted embodiment, the extension 602 may be a separate component from the shock body 75. Alternatively, it is contemplated that the two components may be a single, integral component. As discussed above, the upper extension body 75 and the lower extension body 76 may be coupled to the shock body 72 by a suitable fastening mechanism.

In accordance with various embodiments, the front shock axis 73 may extend substantially parallel to the effective shock axis 77, while the rear shock axis 74 may extend substantially perpendicular to the effective shock axis 77.

In the present embodiment, the extension bodies may house more than one bearing or bushing. FIG. 8B shows cross section C-C is shown through the effective shock axis 77. As shown in the cross section, the upper extension body 75 may house a bearing or bushing 78 and the lower extension body 76 may also house a bearing or bushing 79, including, as shown, multiple bearings or bushings.

The clamping force of the bolt 81 may create friction between the upper extension body 75, the lower extension body 76, and the shock body 72, which may inhibit the shock body 72 from rotating about the rear shock axis 74 relative to the upper extension body 75 and the lower extension body 76. When the shock 600 is coupled to a suspension linkage assembly via the front shock axis 73 and the effective shock axis 77, the shock 600 may be constrained such that the shock body 72 cannot rotate about the rear shock axis 74 relative to the upper extension body 75 and the lower extension body 76. This constraint may result from the non-parallel positioning of the rear shock axis 74 relative to the effective shock axis 77 and the front shock axis 73.

FIG. 8C shows a top plan view of the shock 600 of FIG. 8A with the extension bodies 75, 76 in a closed position.

FIG. 8D shows cross section D-D is shown through rear shock axis 74 where bolt 81 secures the upper extension body 75 and the lower extension body 76 to the shock body 72. A spacer 80 may be positioned in between the upper extension body 75 and the lower extension body 76 and may reduce the rear shock eyelet ID to receive bolt 81; however, the spacer 80 may be omitted, allowing for a larger sized bolt 81.

Figure 8E:
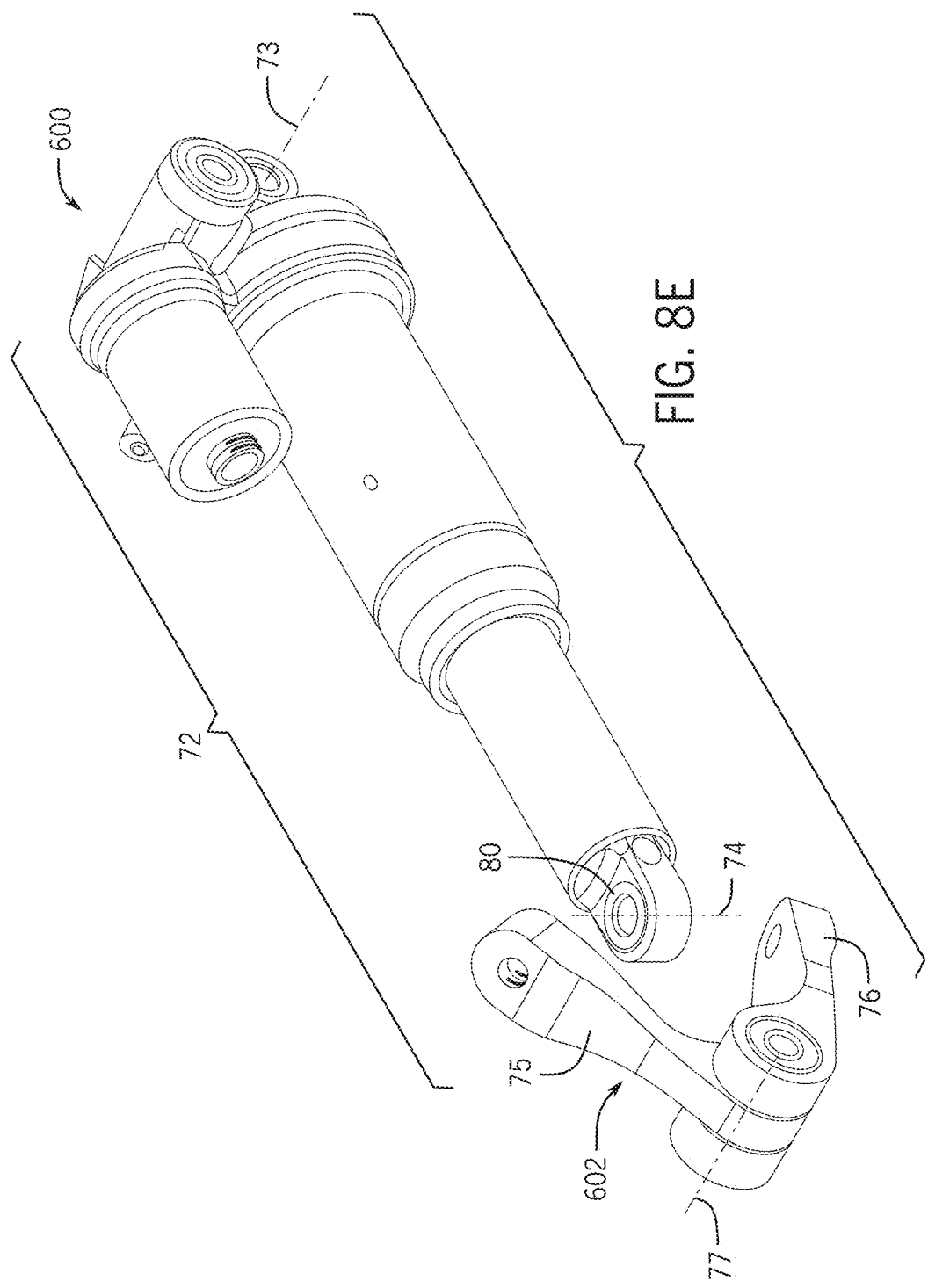
FIG. 8E shows an isometric perspective view of the shock of FIG. 8A with the extension bodies in an open position.

FIG. 8E shows a perspective view of the shock 600 of FIG. 8A with the extension bodies 75, 76 in an open position. In this example, the upper extension body 75 and the lower extension body 76 are rotated open about the effective shock axis 77 to accept the shock body 72. In this embodiment, the lower extension body 76 may surround the upper extension body 75 about the effective shock axis 77. In this example, the upper extension 75 is a single elongated component, while the lower extension body is wider and comprises two extensions at one end that extend on either side of the upper extension body 75. As shown, the upper and lower extension bodies 75, 76 may each have an aperture defined within a free end of the each extension body 75, 76. The end of the shock body 72, including the rear shock axis 74, may also define an aperture. As shown, the spacer 80 defines the aperture. Each aperture on the extension bodies 75, 76 and the spacer 80 may be aligned at the rear shock axis 74. When the extension bodies 75, 76 are in the closed position with the spacer 80 therebetween, the apertures may receive the bolt 81, coupling the extension bodies 75, 76 with the shock body 72.

FIG. 9A shows a side elevation view of a shock or damper 700, including a shock extension 702 with two bodies in the closed position. The shock 700 may also include a shock body 82 with a front shock axis 83 and a rear shock axis 84. The extension 702 may include an upper extension body 85 and a lower extension body 86 pivotally coupled to the upper extension body 85 about an effective shock axis 87. In the depicted embodiment, the extension 702 is a separate component from the shock body 82. As discussed above, the upper extension body 85 and lower extension body 86 are coupled to the shock body 82 by a fastener mechanism. The front shock axis 83 may extend substantially parallel to the effective shock axis 87, while the rear shock axis 84 may extend substantially perpendicular to the effective shock axis 87.

FIG. 9B shows cross section E-E is shown through the effective shock axis 87. As shown in the cross section, the upper extension body 85 may house a bearing or bushing 88 and the lower extension body 86 may house a bearing or bushing 89. In the depicted embodiment, one or more spacers 90 are positioned outside of the bearings 88 and 89.

The clamping force of the bolt 92 may create friction between the upper extension body 85, the lower extension body 86, and the shock body 82, which may inhibit the shock body 82 from rotating about the rear shock axis 84 relative to the upper extension body 85 and the lower extension body 86. When the shock 700 is coupled to a suspension linkage assembly via the front shock axis 83 and the effective shock axis 87, the shock 700 may be constrained such that the shock body 82 cannot rotate about the rear shock axis 84 relative to the upper extension body 85 and the lower extension body 86. This constraint may result from the non-parallel positioning of the rear shock axis 84 relative to the front shock axis 83 and the effective shock axis 87.

FIG. 9C shows a top plan view of the shock 700 of FIG. 9A with the shock extension bodies 85, 86 in a closed position.

FIG. 9D shows cross section F-F is shown through rear shock axis 84 where bolt 92 secures the upper extension body 85 and the lower extension body 86 to the shock body 82. A spacer 91 may be positioned in-between the upper extension body 85 and the lower extension body 86 and may reduce the rear shock eyelet ID to receive the bolt 92; however, it is contemplated that spacer 91 may be omitted, allowing for a larger sized bolt 92.

Figure 9E:
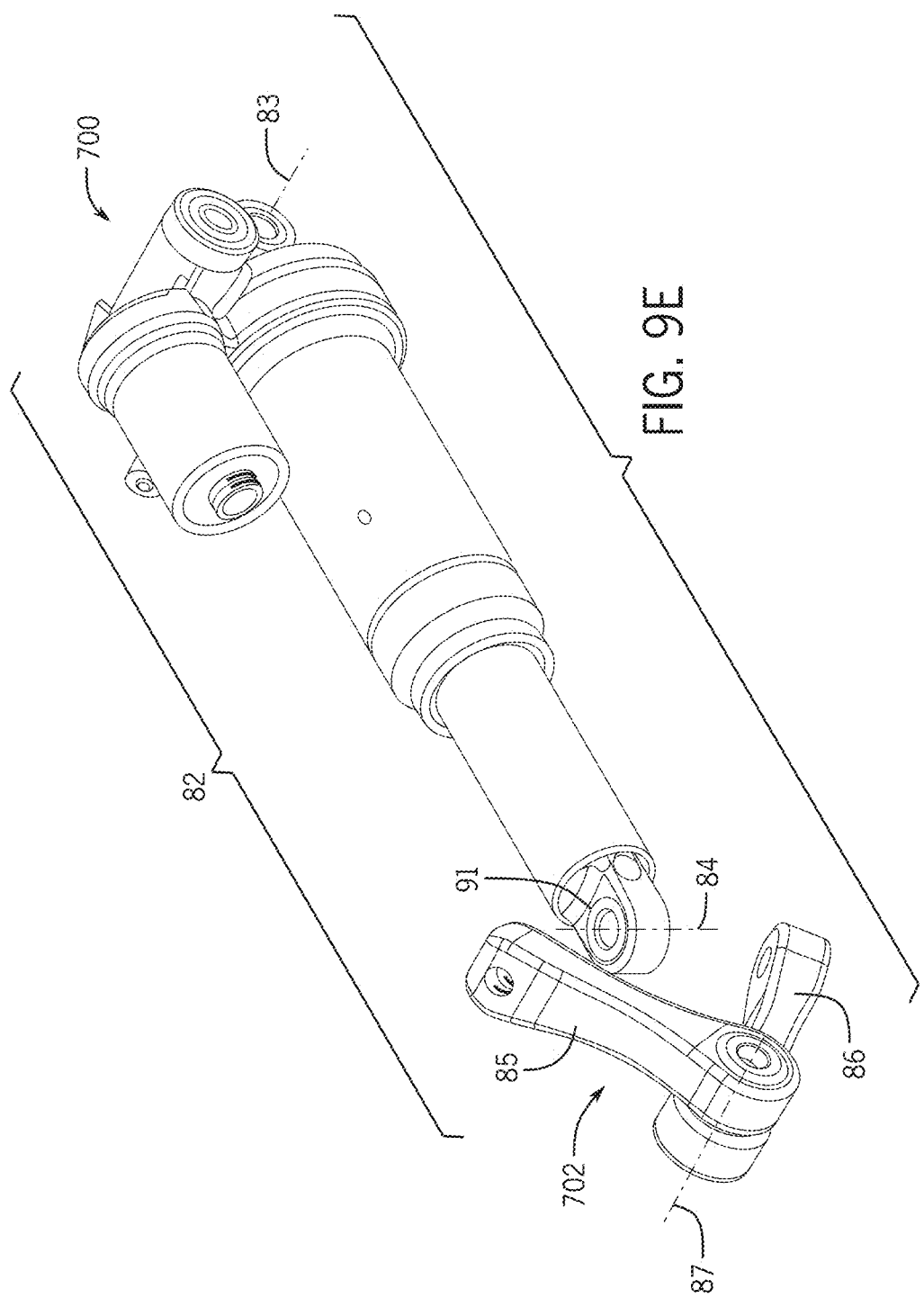
FIG. 9E shows an isometric perspective view of the shock of FIG. 9A with the extension bodies in the open position.

FIG. 9E shows a perspective view of the shock 700 of FIG. 9A with the extension bodies 85, 86 in the open position. In this example, the upper extension body 85 and the lower extension body 86 are rotated open about the effective shock axis 87 to accept the shock body 82. As shown, the upper extension body 85 and the lower extension body 86 are positioned adjacent to one another along the effective shock axis 87. As shown, the upper and lower extension bodies 85, 86 may each have an aperture defined within a free end of the each extension body 85, 86. The end of the shock body 82, including the rear shock axis 84, may also define an aperture. As shown, the spacer 91 defines the aperture. Each aperture on the extension bodies 85, 86 and the spacer 91 may be aligned at the rear shock axis 84. When the extension bodies 85, 86 are in the closed position with the spacer 81 therebetween, the apertures may receive the bolt 92, coupling the extension bodies 85, 86 with the shock body 82.

FIG. 10A shows a side elevation view of a shock or damper 800, including a shock extension 802 with two bodies in the closed position. The shock 800 may also include a shock body 93 with a front shock axis 94 and a rear shock axis 95. The extension 802 may include an upper extension body 96 and a lower extension body 97 pivotally coupled to the upper extension body 96 about an effective shock axis 98. The upper extension body 96 may be positioned above the lower extension body 97. The extension 802 may be a separate component or it may be a single, integral component with the shock body 93. As discussed above, the upper extension body 96 and the lower extension body 97 are coupled to the shock body 93 by a fastener mechanism 102. The front shock axis 94 extends substantially parallel to the effective shock axis 98, while the rear shock axis 95 extends substantially perpendicular to the effective shock axis 98.

FIG. 10B shows cross section G-G is shown through the effective shock axis 98. As shown in the cross section, the upper extension body 96 may house a bearing or bushing 99 and the lower extension body 97 may house a bearing or bushing 100.

The clamping force of the bolt 102 may create friction between the upper extension body 96, the lower extension body 97, and the shock body 93, which may inhibit the shock body 93 from rotating about the rear shock axis 95 relative to the upper extension body 96 and the lower extension body 97. When the shock 800 is coupled to a suspension linkage assembly via the front shock axis 94 and the effective shock axis 98, the shock 800 may be constrained such that the shock body 93 cannot rotate about the rear shock axis 95 relative to the upper extension body 96 and the lower extension body 97. This constraint may result from the non-parallel positioning of the rear shock axis 95 relative to the front shock axis 94 and the effective shock axis 98.

FIG. 10C shows a top plan view of the shock 800 of FIG. 10A with the shock extension bodies 96, 97 in the closed position.

FIG. 10D shows cross section H-H is shown through the rear shock axis 95 where the bolt 102 secures the upper extension body 96 and the lower extension body 97 to the shock body 93. A spacer 101 may be positioned in-between the upper extension body 96 and the lower extension body 97 and may reduce the rear shock eyelet ID to receive the fastener 102; however, it is contemplated that the spacer 101 may be omitted, allowing for a different faster type, style, etc.

Figure 10E:
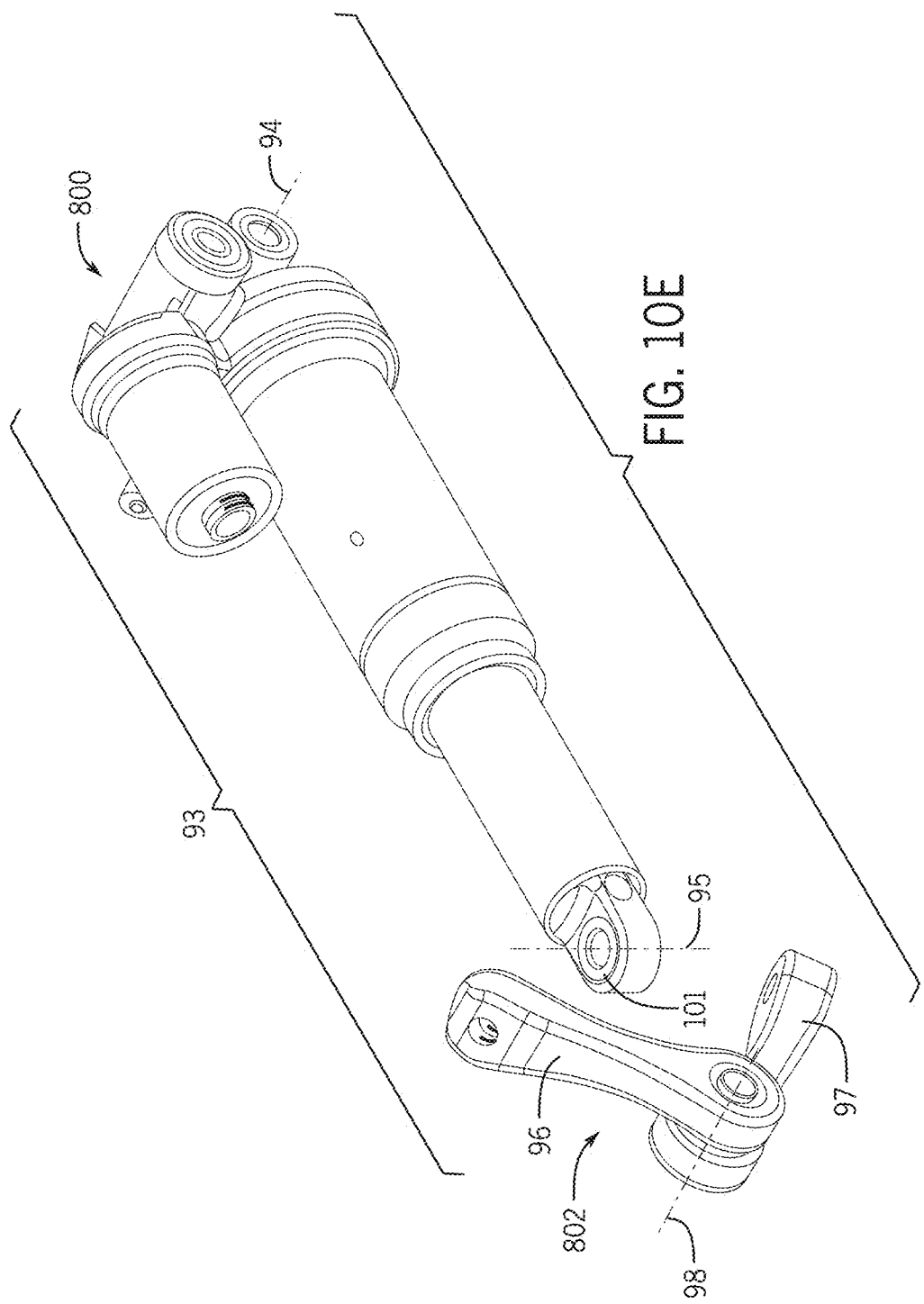
FIG. 10E shows an isometric perspective view of the shock of FIG. 10A with the extension bodies in the open position.

FIG. 10E shows an isometric perspective view of the shock 800 of FIG. 10A with the extension bodies 96, 97 in the open position. In this example, the upper extension body 96 and the lower extension body 97 are rotated open about the effective shock axis 98 to accept the shock body 93. The extension bodies 96, 97 are in a similar configuration as the extension bodies described in FIGS. 6C and 9C.

In the embodiment shown in FIGS. 11A-E, a shock extension 902 for a shock or damper 900 may be comprised of two bodies 1053, 1054. FIG. 11A shows a side elevation view of the shock 900, including the shock extension 902 with two bodies in the closed position. The shock 900 may include a shock body 1050 with a front shock axis 1051 and a rear shock axis 1052. The extension 902 may include an upper extension body 1053 and a lower extension body 1054 pivotally coupled to the upper extension body 1053 about an effective shock axis 1055. In various embodiments, the extension 902 may be a separate component from the shock body 1050. Alternatively, it is contemplated that the two components may be a single, integral component. As shown, the upper extension body 1053 and lower extension body 1054 are coupled to the shock body 1050 by a fastener 1060. The fastener 1060 can be any attachment mechanism that suitably connects the extension bodies. For example, a bolt, machine screw, pin, or the like may be used. In this example, fastener 1060 has a flexible collet head. Collet axle wedge 1062 is driven into the flexible collet head of 1060 by machine screw 1062. Collet wedge 1062 then expands the collet head of fastener 1060 outward when machine screw 1062 is tightened in order to prevent loosening of fastener 1060 from extension bodies 1053 and 1054. In various embodiments, the front shock axis 1051 may extend substantially parallel to the effective shock axis 1055. As indicated above, in various embodiments, the rear shock axis 1052 may extend substantially non-parallel and non-perpendicular to the effective shock axis 1055.

FIG. 11B shows cross section I-I is shown through the effective shock axis 1055 of FIG. 11A. As shown in the cross section, the upper extension body 1053 may house a bearing or bushing 1056 and the lower extension body 1054 may house a bearing or bushing 1057. In the depicted embodiment, one or more spacers 1058 are positioned outside of the bearings 1056 and 1057.

The clamping force of the bolt 1060 may create friction between the upper extension body 1053, the lower extension body 1054, and the shock body 1050, which may inhibit the shock body 1050 from rotating about the rear shock axis 1052 relative to the upper extension body 1053 and the lower extension body 1054. When the shock 900 is coupled to a suspension linkage assembly via the front shock axis 1051 and the effective shock axis 1055, the shock 900 may be constrained such that the shock body 1050 cannot rotate about the rear shock axis 1052 relative to the upper extension body 1053 and the lower extension body 1054. This constraint may result from the non-parallel positioning of the rear shock axis 1052 relative to the front shock axis 1051 and the effective shock axis 1055.

FIG. 11C shows a top plan view of the shock 900 of FIG. 11A with the shock extension bodies 1053, 1054 in the closed position. FIG. 11D shows cross section J-J is shown through rear shock axis 1052 of FIG. 11C where bolt 1060 secures the upper extension body 1053 and lower extension body 1054 to the shock body 1050. As shown, a spacer 1059 may be positioned in-between the upper extension body 1053 and the lower extension body 1054 and may reduce the rear shock eyelet ID to receive the bolt 1060; however, it is contemplated that spacer 1059 may be omitted such that the size of the bolt 1060 may be increased. The spacer 1059 may be an extension of the shock body 1050.

FIG. 11E shows a perspective view of the shock 900 of FIG. 11A with the shock extension bodies 1053, 1054 in the open position. In this example, the upper extension body 1053 and the lower extension body 1054 are rotated open about the effective shock axis 1055 to receive the shock body 1050. As shown, the upper extension body 1053 and the lower extension body 1054 are positioned adjacent to one another along the effective shock axis 1055. As shown, the upper and lower extension bodies 1053, 1054 may each have an aperture defined within a free end of each extension body 1053, 1054. The end of the shock body 1050, including the rear shock axis 1052, may also define an aperture. As shown, the spacer 1059 defines the aperture. Each aperture on the extension bodies 1053, 1054 and the spacer 1059 may be aligned at the rear shock axis 1052. When the extension bodies 1053, 1054 are in the closed position with the spacer 1059 therebetween, the apertures may receive the bolt 1060, coupling the extension bodies 1053, 1054 with the shock body 1050.

Figure 12E:
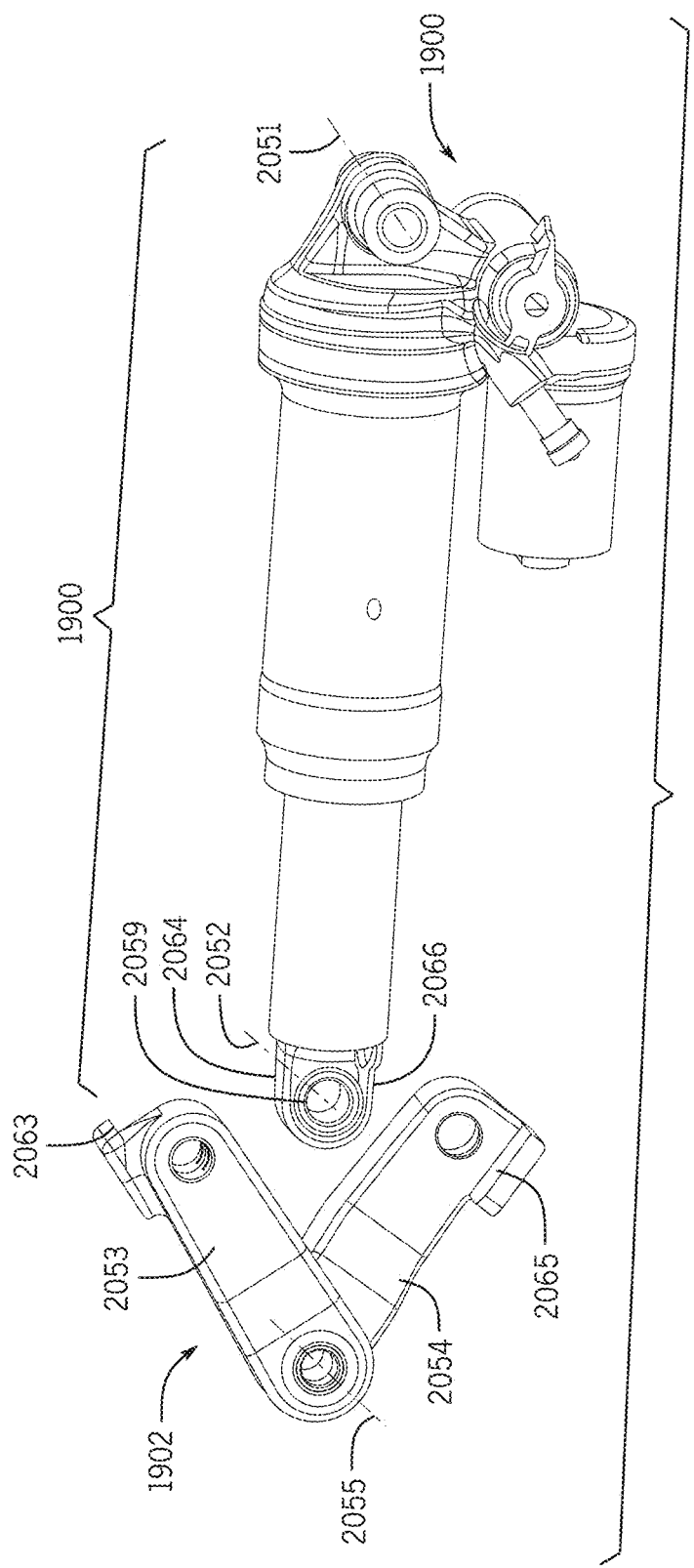
FIG. 12E shows an isometric perspective view of the shock of FIG. 16A with the extension bodies in an open position.

In the embodiment shown in FIGS. 12A-E, a shock extension 1902 for a shock or damper 1900 may be comprised of two bodies 2053, 2054. FIG. 12A shows a side elevation view of the shock 1900, including the shock extension 1902, with two bodies in the closed position. The shock 1900 may include a shock body 2050 with a front shock axis 2051 and a rear shock axis 2052. The extension 1902 may include extension body 2053 and extension body 2054 pivotally coupled to about an effective shock axis 2055. In various embodiments, the extension 902 may be a separate component from the shock body 2050. Alternatively, it is contemplated that the two components may be a single, integral component. As shown, extension body 2053 and extension body 2054 are coupled to the shock body 2050 by a fastener 2060. The fastener 2060 can be any attachment mechanism that suitably connects the extension bodies. For example, a bolt, machine screw, pin, or the like may be used. In this example, fastener 2060 has a flexible collet head. Collet axle wedge 2061 is driven into the flexible collet head of 2060 by machine screw 2062. Collet wedge 2061 then expands the collet head of fastener 2060 outward when machine screw 2062 is tightened in order to prevent loosening of fastener 2060 from extension bodies 2053 and 2054. In various embodiments, the front shock axis 2051 may extend substantially parallel to the effective shock axis 2055. The rear shock axis 2052 may extend substantially parallel to the effective shock axis 2055.

FIG. 12B shows cross section K-K is shown through the effective shock axis 2055 of FIG. 12A. As shown in the cross section, the extension body 2053 may house a bearing or bushing 2056 and extension body 2054 may house a bearing or bushing 2057. In the depicted embodiment, one or more spacers 2058 are positioned outside of the bearings 2056 and 2057.

The clamping force of the bolt 2060 may create friction between the extension body 2053, the extension body 2054, and the shock body 2050, which may inhibit the shock body 2050 from rotating about the rear shock axis 2052 relative to extension body 2053 and the extension body 2054.

FIG. 12C shows a top plan view of the shock 1900 of FIG. 12A with the shock extension bodies 2053, 2054 in the closed position. FIG. 12D shows cross section L-L is shown through rear shock axis 2052 of FIG. 12C where bolt 2060 secures extension body 2053 and extension body 2054 to the shock body 2050. As shown, a spacer 2059 may be positioned in-between the extension body 2053 and extension body 2054 and may reduce the rear shock eyelet ID to receive the bolt 2060; however, it is contemplated that spacer 2059 may be omitted such that the size of the bolt 2060 may be increased. The spacer 2059 may be an extension of the shock body 2050. When the shock 1900 is coupled to a suspension linkage assembly via the front shock axis 2051 and the effective shock axis 2055, cantilevered tab 2063 extending from extension body 2053 engages the top of a shock mounting surface 2064 and cantilevered tab 2065 extending from the second extension body 2054 engages the bottom of the shock mounting surface 2066, limiting relative rotation between shock and the first and second extension bodies. Therefore, the shock 2900 may be constrained such that the shock body 2050 cannot rotate about the rear shock axis 2052 relative to extension body 2053 and extension body 2054.

FIG. 12E shows a perspective view of the shock 1900 of FIG. 12A with the shock extension bodies 2053, 2054 in the open position. In this example, extension body 2053 and extension body 2054 are rotated open about the effective shock axis 2055 to receive the shock body 2050. As shown, extension body 2053 and extension body 2054 are positioned adjacent to one another along the effective shock axis 2055. As shown, the extension bodies 2053, 2054 may each have an aperture defined within a free end of each extension body 2053, 2054. The end of the shock body 2050, including the rear shock axis 2052, may also define an aperture. As shown, the spacer 2059 defines the aperture. Each aperture on the extension bodies 2053, 2054 and the spacer 2059 may be aligned at the rear shock axis 2052. When the extension bodies 2053, 2054 are in the closed position with the spacer 2059 therebetween, the apertures may receive the bolt 2060, coupling the extension bodies 2053, 2054 with the shock body 2050.

It is contemplated that the same assembly method 550 of FIG. 7 may be used with the shocks 600, 700, 800 and/or shock extensions 602, 702, 802 of FIGS. 8A-12E. The shocks 600, 700, 800 may be easily installed in the suspension linkage system 300 without disassembling the linkage system.

The shock extensions 500, 600, 700, 800 depicted in FIGS. 6A-C and FIGS. 8A-12E are not limited to the configurations of the suspension systems 300, 400 shown in FIGS. 4A-G and FIGS. 5A-B. The same advantages of using shock extensions 500, 600, 700, 800, or similar shock extensions, apply with other suspension linkage designs, as well as when coupled to other locations in the suspension system relative to the seat tube.

FIGS. 13-16 show various embodiments of different positioning of a shock extension body relative to a seat tube in a suspension system. A seat-tube can be described as uninterrupted or interrupted. An uninterrupted seat-tube allows a seat post to be fully inserted into the seat-tube above the lower front triangle without obstruction. In other words, the seat-tube body extends to intersect the lower front triangle.

Figure 13B:
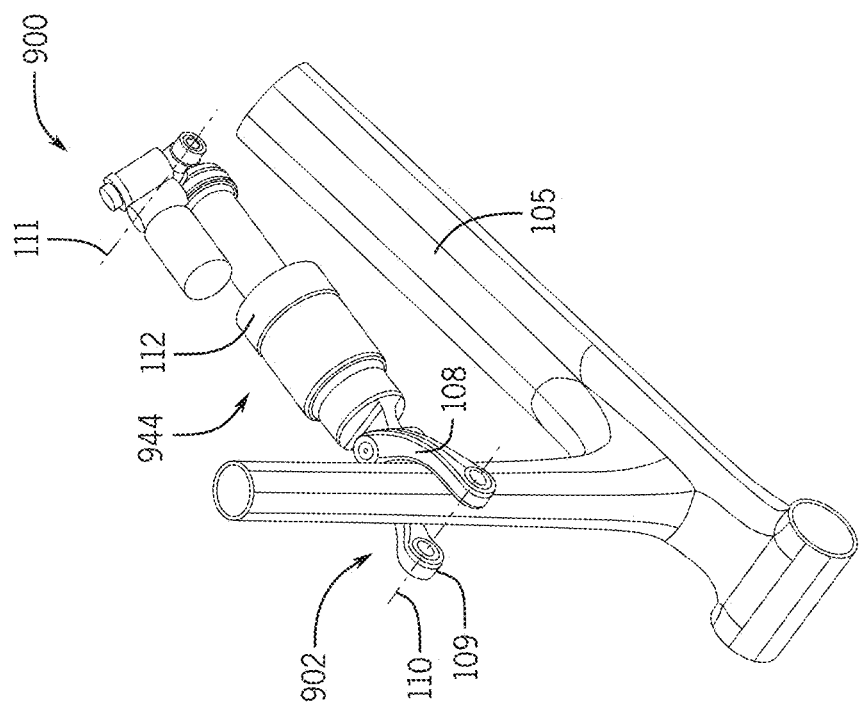
FIG. 13B shows an isometric view of a suspension system with a multi-body shock or damper extension in the extended state positioned behind a portion of uninterrupted seat tube.
Figure 13A:
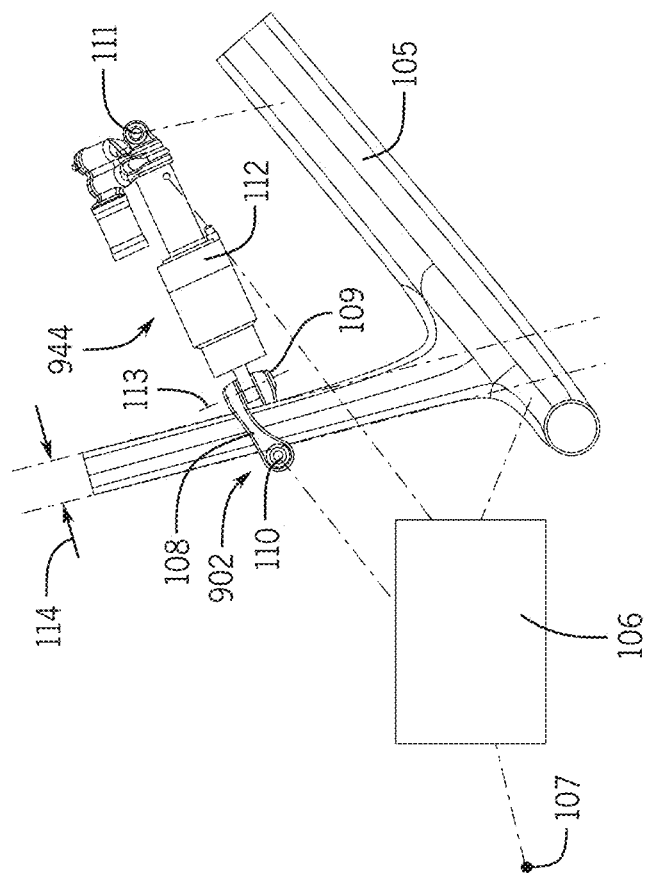
FIG. 13A shows a side elevation view of a suspension system with a multi-body shock or damper extension in the extended state positioned behind a portion of uninterrupted seat tube.
Figure 14B:
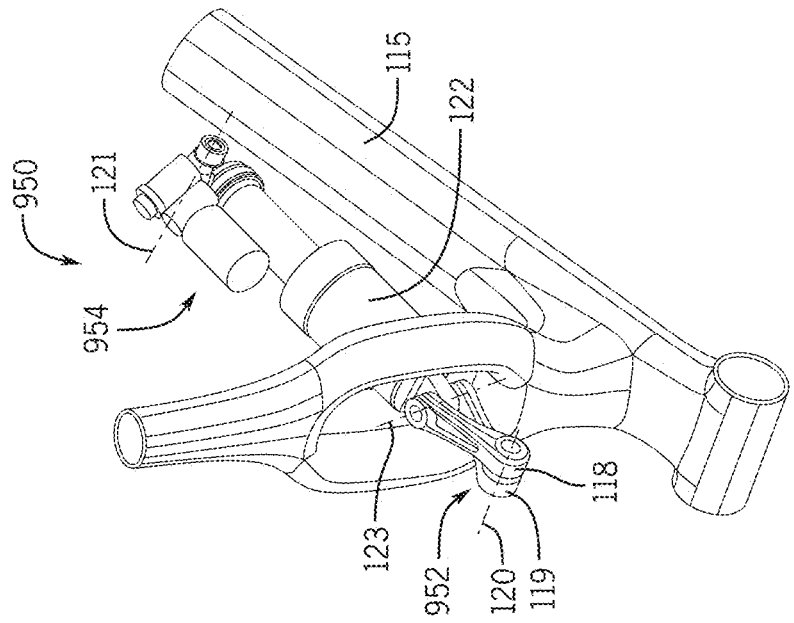
FIG. 14B shows an isometric view of a suspension system with a multi-body shock or damper extension in the extended state positioned behind a portion of interrupted seat tube.
Figure 15B:
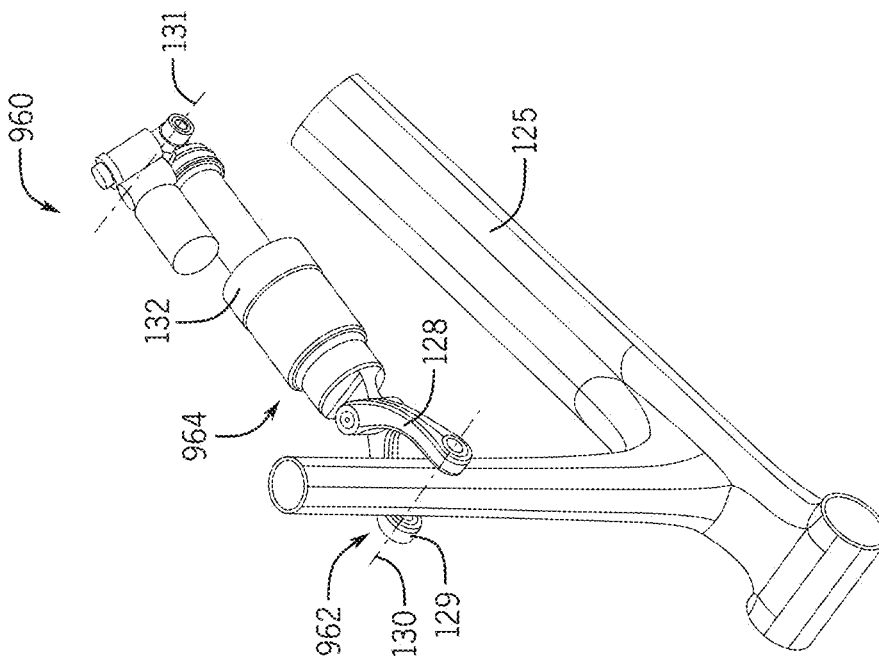
FIG. 15B shows an isometric view of a suspension system with a multi-body shock or damper extension in the extended state positioned within a portion of uninterrupted seat tube.

Suspension linkages may straddle this tube. An interrupted seat-tube has a bend or split, or cavity prior to intersecting the lower front triangle obstructing a seat post prior to intersecting the lower front triangle. Suspension linkages or a shock or a damper may reside within the space created by the bend, split or cavity. This can best be seen in isometric views shown in FIGS. 13B, 14B, 15B and 16B. FIGS. 13B and 15B are examples of uninterrupted seat-tubes. FIGS. 14B and 16B are examples of interrupted seat-tubes since the tube splits in the center to allow room for suspension linkage or a shock or damper. FIG. 13A shows an isolated side elevation view of a suspension system 900 with a multi-body shock or damper extension 902 in the extended state positioned behind a portion of an uninterrupted seat tube. FIG. 13B shows an isolated isometric view of a suspension system 900 with a multi-body shock or damper extension 902 in the extended state positioned behind a portion of an uninterrupted seat tube. The suspension system 900 shown includes a front triangle body 105, a seat tube 114, a shock or damper body 112 with a rear shock axis 111, and a shock extension 902 with an effective shock axis 110. The shock extension 902 may include an upper extension body 108 and a lower extension body 109. A block diagram 106 represents an operative connection of a driven wheel axis at the extended state 107 to the front triangle body 105 and the effective shock axis 110. The rear shock axis 111 may be operatively coupled to either the front triangle body 105 or the block diagram 106. In the depicted embodiment, the upper extension body 108 and the lower extension body 109 are pivotally connected about rear shock axis 113 and a portion of the front triangle body 105 is in between the two extension bodies 108, 109. When viewed from a normal perspective of the wheel axis 107, a portion of the extension bodies 108, 109 may be located behind a portion of uninterrupted seat tube 114 if virtually extended in both directions axially. In particular, the effective shock axis 110 may be located behind the seat tube 114.

Figure 14A:
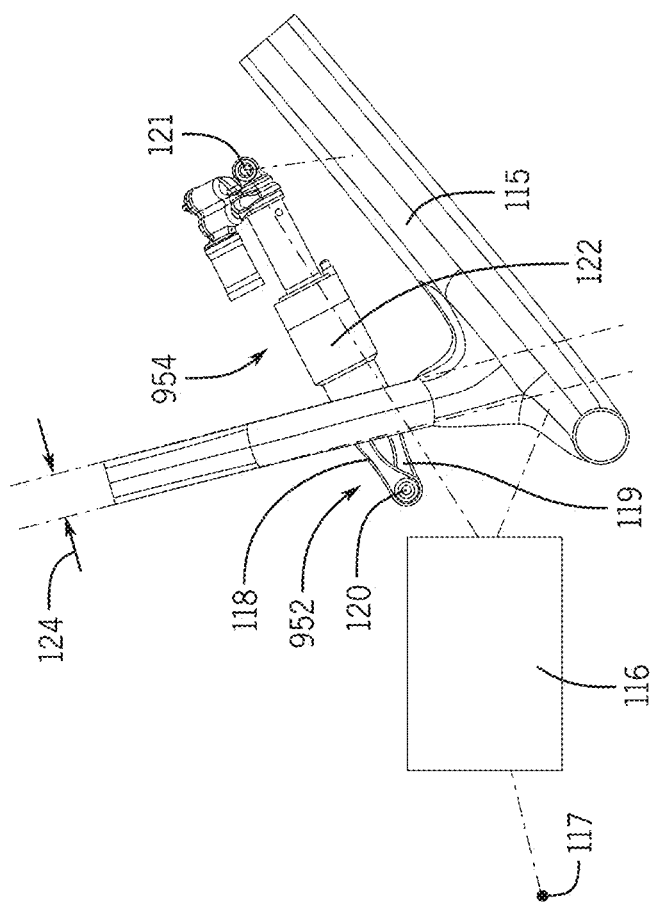
FIG. 14A shows a side elevation view of a suspension system with a multi-body shock or damper extension in the extended state positioned behind a portion of interrupted seat tube.

FIG. 14A shows an isolated side elevation view of another embodiment of a suspension system 950 with a multi-body shock or damper extension 952 in the extended state positioned behind a portion of seat tube 124. FIG. 14B shows an isolated isometric view of suspension system 952 in the extended state positioned behind a portion of seat tube 124. The suspension system 950 includes a front triangle body 115, a seat tube 124, and a shock or damper 954. The shock 954 includes a shock or damper body 122 with a rear shock axis 121 and a shock extension 952 with an effective shock axis 120. The shock extension 952 may include an upper extension body 118 and a lower extension body 119. A block diagram 116 represents an operative connection of a driven wheel axis at the extended state 117 to the front triangle body 115 and the effective shock axis 120. The rear shock axis 121 of the shock body 122 may be operatively coupled to either the front triangle body 115 or the block diagram 116. In the depicted embodiment, the upper extension body 118 and the lower extension body 119 are pivotally connected about rear shock axis 123. In one example, this connection is within the seat tube 124. Accordingly, the front triangle may include a seat tube 124 having an opening in line with the shock/dampener. When viewed from the perspective normal to driven wheel axis 117, the extension bodies 118, 119 may include portions located behind a portion of interrupted seat tube 124 if virtually extended in both directions axially.

Figure 15A:
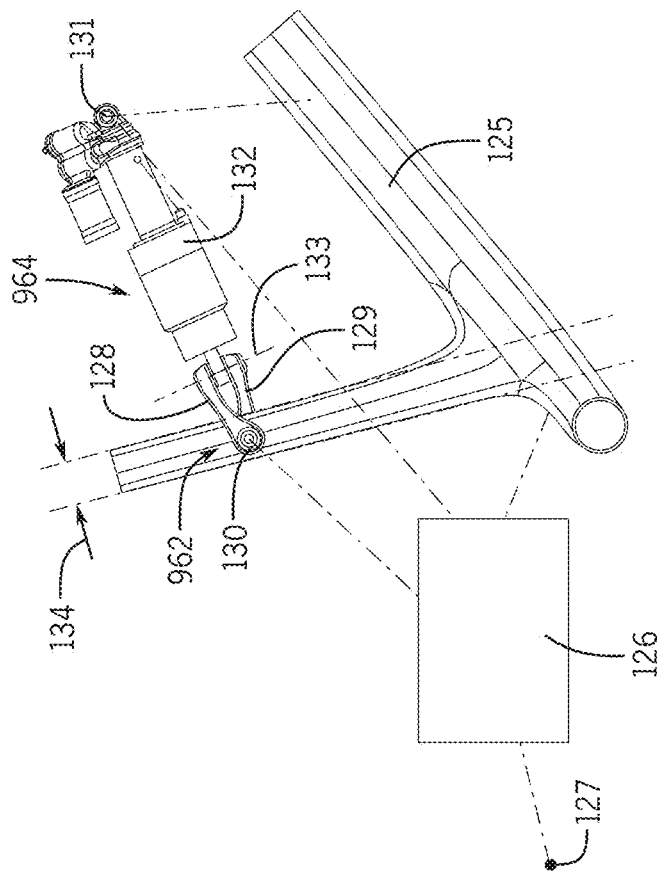
FIG. 15A shows a side elevation view of a suspension system with a multi-body shock or damper extension in the extended state positioned within a portion of uninterrupted seat tube.

FIG. 15A shows an isolated side elevation view of another embodiment of a suspension system 960 with a multi-body shock or damper extension 962 in the extended state positioned within a portion of uninterrupted seat tube 134. FIG. 15B shows an isolated isometric view of suspension system 962 in the extended state positioned within a portion of uninterrupted seat tube 134. The suspension system 960 includes a front triangle body 125, a seat tube 134, and a shock or damper 964. The shock 964 includes a shock or damper body 132 with a rear shock axis 131 and a shock extension 962 with an effective shock axis 130. The shock extension 962 may include an upper extension body 128 and a lower extension body 129. A block diagram 126 represents an operative connection of a driven wheel axis at the extended state 127 to the front triangle body 125 and the effective shock axis 130. The rear shock axis 131 of the shock body 132 may be operatively coupled to either the front triangle body 125 or the block diagram 126. In the depicted embodiment, the upper extension body 128 and the lower extension body 129 are pivotally connected about rear shock axis 133 and a portion of the front triangle body 125 seats in-between the two extension bodies 128, 129. When viewed from the perspective normal to driven wheel axis 127, the extension bodies 128, 129 may be located within a portion of seat tube 134 if virtually extended in both directions axially.

FIG. 16A shows an isolated side elevation view of another embodiment of a suspension system 970 with a multiple-body shock or damper extension 972 in the extended state positioned within a portion of interrupted seat tube. FIG. 16B shows an isolated isometric view suspension system 972 in the extended state positioned within a portion of interrupted seat tube. The suspension system 970 includes a front triangle body 135, a seat tube 144, and a shock or damper 974. The shock 974 includes a shock or damper body 142 with a rear shock axis 141 and a shock extension 972 with an effective shock axis 140. The shock extension 972 may include an upper extension body 138 and a lower extension body 139. A block diagram 136 represents an operative connection of a driven wheel axis at the extended state 137 to the front triangle body 135 and the effective shock axis 140. The rear shock axis 141 of the shock body 142 may be operatively coupled to either the front triangle body 135 or the block diagram 136. In the depicted embodiment, the upper extension body 138 and the lower extension body 139 are pivotally connected about rear shock axis 143 and are positioned within the seat tube 144. When viewed from the perspective normal to driven wheel axis 137, the extension bodies 138, 139 may be located within a portion of seat tube 144 if virtually extended in both directions axially.

Many of the components and bodies discussed above may comprise more than one body. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto may vary.

The above specifications, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A two-wheel vehicle suspension linkage system comprising:
    a suspended body, a link body, and a dynamic body, the dynamic body being coupled to the link body and defining an instantaneous velocity center (IVC);
    a shock coupled to the suspended body; and
    a shock extension coupled to the shock by a first pivot and coupled to the link body by a second pivot, wherein the IVC is positioned between the first pivot and the second pivot when the shock is in an extended state, wherein:
    the suspended body and the link body define a stationary instantaneous velocity center (SIVC); and the IVC is positioned above the SIVC when the shock is in the extended state and in front of the SIVC when the shock is in the compressed state.

2. A two-wheel vehicle suspension linkage system comprising:
    a shock assembly operably connected to two linkage bodies, the shock assembly comprising a shock and a shock extension assembly, the shock extension assembly contacting a top surface and a bottom surface of the shock;
    a first pivot extending through a first mounting axis and a second mounting axis of the shock extension assembly;
    a second pivot extending through a third mounting axis and a fourth mounting axis of the shock extension assembly and a first mounting axis of the shock; and
    a third pivot extending through a second mounting axis of the shock opposite the first mounting axis of the shock, wherein a first axis of the first pivot is non-parallel to a second axis of the second pivot and parallel to a third axis of the third pivot, wherein:
    the shock extension assembly comprises a first extension body and a second extension body,
    the first mounting axis and the third mounting axis are on the first extension body, and
    the second mounting axis and the fourth mounting axis are on the second extension body.

3. The vehicle suspension linkage system of claim 2, wherein the first extension body is rotationally coupled to the second extension body by at least one of the first pivot or the second pivot.

4. The vehicle suspension linkage system of claim 2, wherein the first axis and the third axis are perpendicular to the second axis.

5. The vehicle suspension linkage system of claim 2, wherein the first axis and the third axis are oblique to the second axis.

6. The vehicle suspension linkage system of claim 2, wherein the shock extension assembly is configured to be coupled to an accessory tool.

7. The vehicle suspension linkage system of claim 2, wherein the shock extension assembly comprises a first cantilevered tab and a second cantilevered tab configured to contact the top surface and the bottom surface of the shock.

8. A two-wheel vehicle suspension linkage system comprising:
a suspended body comprising a seat tube;
a dynamic body;
a link body coupled to the suspended body and the dynamic body, wherein the link body and the dynamic body define an instantaneous velocity center (IVC); and
a shock assembly coupled to the suspended body at a first pivot and coupled to the link body at a second pivot, wherein the second pivot is positioned in front of the seat tube, wherein:
the shock assembly comprises a shock and a shock extension assembly, and
the shock is coupled to the shock extension assembly by a third pivot.

9. The vehicle suspension linkage system of claim 8, wherein the first pivot is positioned in front of the second pivot.

10. The vehicle suspension linkage system of claim 8, wherein a first axis of the first pivot is parallel to a second axis of the second pivot and non-parallel to a third axis of the third pivot.

11. The vehicle suspension linkage system of claim 8, wherein:
the shock extension assembly comprises a first extension body and a second extension body; and
the first pivot and the third pivot extend through the first extension body and the second extension body.

12. The vehicle suspension linkage system of claim 8, wherein:
the shock extension assembly comprises a first extension body and a second extension body; and
the first extension body is pivotally coupled to the second extension body by the first pivot or the third pivot.

13. The vehicle suspension linkage system of claim 8, wherein the third pivot is positioned between the first pivot and the second pivot when the shock is in an extended state.

14. A two-wheel vehicle suspension linkage system comprising:
a suspended body having a seat tube, a link body, and a dynamic body, the dynamic body being coupled to the link body and defining an instantaneous velocity center (IVC);
a shock coupled to the suspended body; and
a shock extension coupled to the shock by a first pivot and coupled to the link body by a second pivot, wherein the suspended body and the link body define a stationary instantaneous velocity center (SIVC); and
the IVC is positioned above the SIVC and in front of the seat tube when the shock is in an extended state.

15. The vehicle suspension linkage of claim 14, wherein:
the IVC is a pivotal connection defining a first axis; and
the first pivot defines a second axis non-parallel to the first axis.

16. The vehicle suspension linkage of claim 14, wherein the second pivot defines a third axis parallel to the first axis.

17. The vehicle suspension linkage of claim 14, wherein a first axis of the first pivot is non-parallel to a second axis of the second pivot.

18. The vehicle suspension linkage of claim 14, wherein a first axis of the first pivot is perpendicular to a second axis of the second pivot.

19. The two-wheel vehicle suspension linkage system of claim 14, wherein the IVC is positioned in front of the SIVC when the shock is in a compressed state.

20. The two-wheel vehicle suspension linkage system of claim 14, wherein the SIVC is positioned in front of the seat tube.

21. A two-wheel vehicle suspension linkage system comprising:
a suspended body, a link body, and a dynamic body, the dynamic body being coupled to the link body and defining an instantaneous velocity center (IVC);
a shock coupled to the suspended body; and
a shock extension coupled to the shock by a first pivot and coupled to the link body by a second pivot, wherein the IVC is positioned between the first pivot and the second pivot when the shock is in an extended state, the suspended body and the link body define a stationary instantaneous velocity center (SIVC); and the IVC is positioned between the SIVC and the first pivot when the shock is in the compressed state.

22. A two-wheel vehicle suspension linkage system comprising:
a suspended body, a link body, and a dynamic body, the dynamic body being coupled to the link body and defining an instantaneous velocity center (IVC);
a shock coupled to the suspended body; and
a shock extension coupled to the shock by a first pivot and coupled to the link body by a second pivot, wherein:
the IVC is positioned between the first pivot and the second pivot when the shock is in an extended state, the second pivot is positioned below the first pivot and above the IVC when the shock is in the compressed state,
the IVC is positioned behind the first pivot and in front of the second pivot when the shock is in the compressed state, and
the IVC is located above the SIVC when the shock is in the compressed state.

23. A two-wheel vehicle suspension linkage system comprising:
a suspended body, a link body, and a dynamic body, the dynamic body being coupled to the link body and defining an instantaneous velocity center (IVC);
a shock coupled to the suspended body; and
a shock extension coupled to the shock by a first pivot and coupled to the link body by a second pivot, wherein:
the IVC is positioned between the first pivot and the second pivot when the shock is in an extended state,
the IVC is positioned below the first pivot and the second pivot when the shock is in a compressed state, and
the IVC is located above the SIVC when the shock is in the compressed state.

24. A two-wheel vehicle suspension linkage system comprising:
a suspended body, a link body, and a dynamic body, the dynamic body being coupled to the link body and defining an instantaneous velocity center (IVC);
a shock coupled to the suspended body; and
a shock extension coupled to the shock by a first pivot and coupled to the link body by a second pivot, wherein the IVC is positioned between the first pivot and the second pivot when the shock is in an extended state, the suspended body and the link body define a stationary instantaneous velocity center (SIVC); and the SIVC is positioned in front of second pivot when the shock is in the extended state and behind the second pivot when the shock is in the compressed state.

25. A two-wheel vehicle suspension linkage system comprising:

a suspended body, a link body, and a dynamic body, the dynamic body being coupled to the link body and defining an instantaneous velocity center (IVC);

a shock coupled to the suspended body; and a shock extension coupled to the shock by a first pivot and coupled to the link body by a second pivot, wherein:

the IVC is positioned between the first pivot and the second pivot when the shock is in an extended state, the shock extension comprises a first extension body and a second extension body;

the first extension body and the second extension body comprise first ends coupled to the shock by the first pivot; and the first extension body and the second extension body comprise second ends coupled to the link body by the second pivot.

26. A two-wheel vehicle suspension linkage system comprising:

a suspended body having a seat tube, a link body, and a dynamic body, the dynamic body being coupled to the link body and defining an instantaneous velocity center (IVC);

a shock coupled to the suspended body; and a shock extension coupled to the shock by a first pivot and coupled to the link body by a second pivot, wherein the suspended body and the link body define a stationary instantaneous velocity center (SIVC); and the IVC is positioned in front of the seat tube when the shock is in an extended state; and the dynamic body is a swingarm comprised of a rigidly connected chain stay and seat stay.

27. The two-wheel vehicle suspension linkage system of claim 26, wherein the SIVC is positioned in front of the seat tube.

* * * * *